(12) United States Patent
Fox

(10) Patent No.: US 11,100,581 B2
(45) Date of Patent: Aug. 24, 2021

(54) SYSTEM AND METHOD FOR PORTFOLIO SYNCHRONIZATION

(71) Applicants: Lawrence J. Wert, Chicago, IL (US); Richard D. Kincaid, Chicago, IL (US); James O. Myers, Chicago, IL (US)

(72) Inventor: Joseph J. Fox, Buffalo Grove, IL (US)

(73) Assignees: Lawrence J. Wert, Chicago, IL (US); Richard D. Kincaid, Chicago, IL (US); James O. Myers, Chicago, IL (US)

( * ) Notice: Subject to any disclaimer, the term of this patent is extended or adjusted under 35 U.S.C. 154(b) by 77 days.

(21) Appl. No.: 16/367,596

(22) Filed: Mar. 28, 2019

(65) Prior Publication Data

US 2019/0228470 A1 Jul. 25, 2019

Related U.S. Application Data

(63) Continuation of application No. 15/618,739, filed on Jun. 9, 2017, now Pat. No. 10,290,057, which is a continuation of application No. 14/703,810, filed on May 4, 2015, now Pat. No. 9,679,335, which is a continuation-in-part of application No. 13/917,440, filed on Jun. 13, 2013, now Pat. No. 10,181,156, which is a continuation-in-part of application No. 13/917,474, filed on Jun. 13, 2013, now abandoned.

(60) Provisional application No. 61/988,086, filed on May 2, 2014, provisional application No. 61/659,103, filed on Jun. 13, 2012.

(51) Int. Cl.
*G06Q 40/04* (2012.01)

(52) U.S. Cl.
CPC .................................. *G06Q 40/04* (2013.01)

(58) Field of Classification Search
USPC ....................................................... 705/35, 37
See application file for complete search history.

(56) References Cited

U.S. PATENT DOCUMENTS

| 5,101,353 | A  | 3/1992  | Lupien et al. |
| 6,236,980 | B1 | 5/2001  | Reese |
| 7,424,303 | B2 | 9/2008  | Al-Sarawi |
| 7,716,119 | B2 | 5/2010  | Cha |
| 7,840,480 | B2 | 11/2010 | Kim-E |

(Continued)

OTHER PUBLICATIONS

Whom to Follow on Social Trading Services? A System to Support Discovering Expert Traders Lee and Ma The tenth international conference on digital information management (Year: 2015).*

(Continued)

*Primary Examiner* — William E Rankins
(74) *Attorney, Agent, or Firm* — Barich IP Law Group

(57) ABSTRACT

A system and method for automated securities portfolio synchronization is provided. The system includes a lead trader account database, a follower account database, and a trade determination system. A follower provides a lead trader identification which is used to retrieve a lead trader portfolio from the lead trader account database for display to the Follower. The contents of the lead trader portfolio are compared to securities already owned by the follower and to a list of securities not to be purchased that is retrieved from the follower account database. The follower may then make adjustments to the lead trader portfolio and synchronize their portfolio to that of the lead trader.

1 Claim, 32 Drawing Sheets

(56) References Cited

U.S. PATENT DOCUMENTS

| | | | |
|---|---|---|---|
| 7,844,538 B2 * | 11/2010 | Wallman | G06Q 40/04 |
| | | | 705/37 |
| 8,069,106 B2 | 11/2011 | Waelbroeck et al. | |
| 2002/0059127 A1 | 5/2002 | Brown | |
| 2003/0120575 A1 | 6/2003 | Wallman | |
| 2004/0111352 A1 | 6/2004 | Kim | |
| 2004/0210511 A1 | 10/2004 | Waelbroeck et al. | |
| 2005/0004838 A1 | 1/2005 | Perkowski | |
| 2005/0192888 A1 | 9/2005 | Lennane | |
| 2005/0222938 A1 | 10/2005 | Treacy et al. | |
| 2006/0265309 A1 | 11/2006 | Sweeting et al. | |
| 2008/0004894 A1 | 1/2008 | Son | |
| 2009/0094152 A1 | 4/2009 | Lopez | |
| 2010/0023459 A1 | 1/2010 | Sundby | |
| 2011/0166982 A1 | 7/2011 | Cole et al. | |
| 2012/0022989 A1 | 1/2012 | Vasinkevich | |
| 2013/0006827 A1 | 1/2013 | Kaus | |
| 2013/0060672 A1 | 3/2013 | Assia | |
| 2013/0218860 A1 | 8/2013 | Franco | |
| 2013/0268423 A1 | 10/2013 | Giles | |

OTHER PUBLICATIONS

PCT International Search Report in International Application No. PCT/US13/45626 dated Nov. 22, 2013.
PCT Written Opinion of the International Searching Authority in International Application No. PCT/US13/45626 dated Nov. 22, 2013.

* cited by examiner

1800

1802 Buying Power — Daily Gain/Loss — 1812 The Markets — 1814

| | | | | |
|---|---|---|---|---|
| CASH: | $ 23,016.15 | UNREALIZED GAIN/LOSS: | 0.05 | DOW 12,820.79 104.86 0.82% |
| MARGIN: | $ 53,016.15 | REALIZED GAIN/LOSS: | -165.80 | S&P 1,370.41 11.82 0.87% |
| DAY TRADING: | $113,016.15 | TOTAL: | -165.75 | NASDAQ 3,015.55 24.33 0.81% |
| CURRENT ACCOUNT VALUE: | $ 29,834.55 | | | |
| START OF DAY ACCOUNT VALUE: | $ 30,000.00 | | | |

1804 Trade Entry | Add | Hide
Trading Style: Share for Share

| SYMBOL | Click "O" for options | LAST | CHANGE | BID | ASK | SHARES | ORDER | PRICE TYPE | ENTRY | STOP | TARGET | SUBMIT | CANCEL |
|---|---|---|---|---|---|---|---|---|---|---|---|---|---|
| NEE | ☐ | 62.35 | 0.10 | 62.35 | 62.36 | 100 | Buy ▼ | Limit Day ▼ | 62.35 | 62.85 | 63.75 | ☐ | ☐ |

SAVE

1806 Open Orders | Hide                                                                                 ☑ Show All

| SYMBOL | QTY | FILLED | LAST | CHANGE | BID | ASK | ORDER TYPE | PRICE TYPE | PRICE | STOP | STOP LIMIT | TIME FORCE | STATUS | UPDATE | CANCEL |
|---|---|---|---|---|---|---|---|---|---|---|---|---|---|---|---|
| GE | 30 | 0 | 19.09 | 0.35 | 19.09 | 19.10 | SELL | STOP | 18.25 | 18.25 | none | GTC | Open | ☐ | ☐ |
| GE | 30 | 0 | 19.09 | 0.35 | 19.09 | 19.10 | SELL | LIMIT | 21.21 | | none | GTC | Open | ☐ | ☐ |
| MSFT | 25 | 0 | 30.39 | -0.08 | 30.39 | 30.40 | SELL | STOP | 27.50 | 27.50 | none | GTC | Open | ☐ | ☐ |
| MSFT | 25 | 0 | 30.39 | -0.08 | 30.39 | 30.40 | SELL | LIMIT | 33.40 | | none | GTC | Open | ☐ | ☐ |

1808 Current Positions

| SYMBOL | QTY | LAST | CHANGE | BID | ASK | ENTRY | STOP | STOP LIMIT | TARGET | UPDATE | LOSS/GAIN | CLOSE MKT |
|---|---|---|---|---|---|---|---|---|---|---|---|---|
| GE | 30 | 19.09 | 0.35 | 19.09 | 19.10 | 19.13 | 18.25 | none | 21.21 | ☐ | -1.20 | ☐ |
| MSFT | 25 | 30.39 | -0.08 | 30.39 | 30.40 | 30.34 | 27.50 | none | 33.40 | ☐ | 1.25 | ☐ |

1810 Daily Transactions | Hide                                                               ☐ Show Canceled Orders

| TIME | SYMBOL | QTY | FILLED | TYPE | PRICE | AVG PRICE | AMOUNT | STATUS | TIF |
|---|---|---|---|---|---|---|---|---|---|
| 13:34:59 | C | 35 | 35 | MARKET SELL | $33.65 | $33.66 | $1,178.10 | Filled | DAY |
| 13:34:43 | C | 35 | 35 | MARKET BUY | $33.65 | $33.65 | $1,177.75 | Filled | DAY |
| 13:31:54 | MSFT | 25 | 25 | MARKET BUY | $30.34 | $30.34 | $758.50 | Filled | DAY |
| 13:31:34 | GE | 30 | 30 | MARKET BUY | $19.13 | $19.13 | $573.90 | Filled | DAY |
| 13:31:22 | GE | 50 | 50 | MARKET SELL | $19.14 | $19.14 | $957.00 | Filled | DAY |
| 13:31:19 | C | 100 | 100 | MARKET SELL | $33.75 | $33.74 | $3,374.00 | Filled | DAY |
| 13:30:39 | MSFT | 30 | 30 | MARKET SELL | $30.39 | $30.39 | $911.70 | Filled | DAY |
| 13:24:38 | C | 100 | 100 | MARKET BUY | $33.77 | $33.77 | $3,377.00 | Filled | DAY |

| Carrier 🛜 ❄ | | 4:14 PM | | | | |
|---|---|---|---|---|---|---|
| [Back] | | Ditto Trade : My Watch List | | | | [Add Symbol] |
| Symbol | Last | Change | Bid | Ask | Volume | Trade |
| D | 57.73 | 0.11 | 57.43 | 58.17 | 7.42M | ☐ |
| GOOG | 881.27 | 7.95 | 879.51 | 880.50 | 2.26M | ☐ |
| SPW | 78.25 | 0.44 | 74.29 | 82.31 | 0.29M | ☐ |
| TA | 11.40 | 0.35 | 10.75 | 11.40 | 0.25M | ☐ |
| HUBG | 37.30 | -0.25 | 33.98 | 40.56 | 0.17M | ☐ |
| DJIA 15,409.39 ▼ 106.29 (0.69%) | | NASDAQ 3,48.89 29.75 (0.86%) | | | S&P 500 1,660.06 10.46 (0.63%) | |

2602 → (Symbol column)
2604 → (DJIA row)
2606 → (Trade column)

| Carrier 🛜 ❄ | | | 4:13 PM | | | | |
|---|---|---|---|---|---|---|---|
| ◁ Back | | Ditto Trade : Order Status | | | | | Add Symbol |
| Status | Symbol | Trade | Qty | Price | Time Force | Date Time | Cancel |
| Open | GOOG | BUY LIMIT | 25 | 800.00 | DAY | 05/28/2013 16:12:05 ET | ☐ |
| Filled | P | SELL MARKET | 1000 | 16.91 | DAY | 05/28/2013 00:00:00 ET | |
| Filled | P | BUY MARKET | 1000 | 16.92 | DAY | 05/28/2013 00:00:00 ET | |

2702 → (rows)
2704 → (Cancel column)

| Carrier 🛜 ❄ | | 4:11 PM | | |
|---|---|---|---|---|
| ◁ Back | | Ditto Trade : Alert History | | Delete All |
| Company | Symbol | Order Type | Alert Type | Date |
| Master Card | MA | Buy | Trade Alert | 05/28/2013 15:56:57 ET |
| VISA | V | Buy | Trade Alert | 05/28/2013 15:48:58 ET |
| SONY | SNE | Sell | Trade Alert | 05/28/2013 15:27:42 ET |

2802 → (rows)

FIG. 28

SYSTEM AND METHOD FOR PORTFOLIO SYNCHRONIZATION

The present application is a continuation of U.S. patent application Ser. No. 15/618,739, filed Jun. 9, 2017, entitled "SYSTEM AND METHOD FOR PORTFOLIO SYNCHRONIZATION," which is a continuation of U.S. patent application Ser. No. 14/703,810, filed May 4, 2015, entitled "SYSTEM AND METHOD FOR PORTFOLIO SYNCHRONIZATION," now U.S. Pat. No. 9,679,335, which claims the benefit of U.S. Provisional Application No. 61/988,086, filed May 2, 2014, entitled "SYSTEM AND METHOD FOR TRADING SYNCHRONIZATION," and is a continuation-in-part of U.S. patent application Ser. No. 13/917,440, filed Jun. 13, 2013, entitled "SYSTEM AND METHOD FOR AUTOMATED TRADE REPLICATION TRADE BUNDLING, AND DETACHMENT," now U.S. Pat. No. 10,181,156, and U.S. patent application Ser. No. 13/917,474, filed Jun. 13, 2013, entitled "SYSTEM AND METHOD FOR AUTOMATED MOBILE ALERT-BASED TRADING MOBILE TRADE REPLICATION AND DETACHMENT," both of which claim the benefit of U.S. Provisional Application No. 61/659,103, filed Jun. 13, 2012, all of which are hereby incorporated by reference in their entirety.

BACKGROUND

Generally, the present invention relates to systems and methods for securities trading. More specifically, the present invention relates to systems and method for automated securities trading.

Individuals trading securities often seek advice and guidance with regard to particular trades. Advice may be provided directly to the individuals by brokers, advisors, newsletters, or advisory services, for example. When using one or more of these sources of advice or guidance, the individual trading securities typically must first obtain the source of information and then determine and execute their own individual trade based on the information. Unfortunately, the amount of time this requires may result in a significant enough time lag to adversely impact the financial opportunity presented by the source of advice or guidance. Further, in today's fast-trading environment, a delay of seconds may be sufficient for a financial opportunity presented by a trade to significantly degrade.

On the other end of the spectrum from individual trading are pooled trading funds wherein the trades may be executed by someone other than the individual, such as by the manager of a hedge fund, for example. A specialized manager may have greater skill at securities trading than the individual and may thus be able to deliver more profitable trades than the individual may achieve on their own. However, with such managed funds, the individual owning the shares often does not have input or insight into the trading process and their ability to manage their own portfolio is extremely minimal.

BRIEF DESCRIPTION OF THE DRAWINGS

FIG. 18 is an alternative embodiment of a Lead Trader Dashboard.

FIG. 26 is an embodiment of a Mobile Watch List Dashboard.

FIG. 27 is an embodiment of a Mobile Order Status Dashboard.

FIG. 28 is an embodiment of a Mobile Alert History Dashboard.

Figure 1:
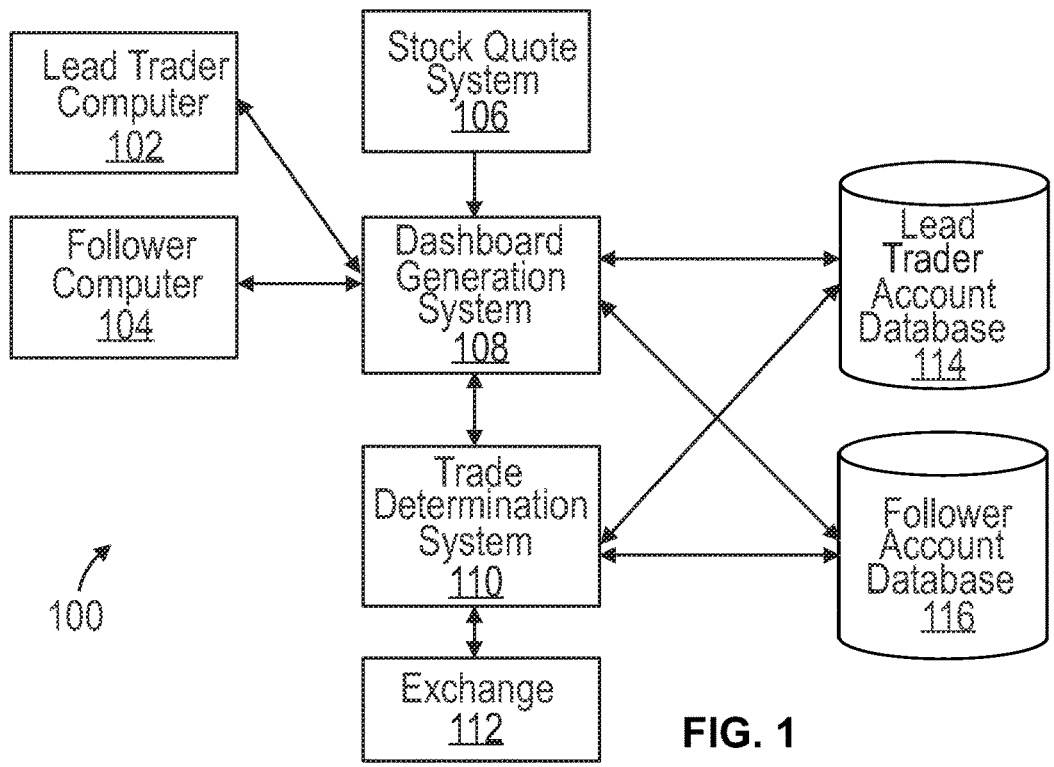
FIG. 1 illustrates an embodiment of a system for automated trade bundling.

The following description of certain embodiments will be better understood when read in conjunction with the appended drawings. For the purposes of illustration, certain embodiments are shown in the drawings. It should be understood, however, that the claims are not limited to the embodiments shown in the attached drawings.

SUMMARY OF INVENTION

In one embodiment, a system and method for automated securities trading may include a Lead Trader account database, a follower account database, and a trade determination system. Trade information may be received from a Lead Trader and a listing of followers for the Lead Trader is retrieved from the lead account database. For each Follower, their account at the follower account database may be accessed to confirm that they desire to participate in the Lead Trader's trade and that they have enough funds to do so. The Lead Trader and follower traders are then grouped together and traded as a single trade. The traded shares are then provided to the Lead Trader and followers at the average price of the trade.

In one embodiment, a system for automated trade bundling allows Followers to attach to Lead Traders and to follow the trades made by the Lead Traders. A Lead Trader must register before Followers are permitted to follow trades made by the Lead Trader. Additionally, Followers must register before they are permitted to follow trades made by the Lead Trader.

After Lead Traders are registered, they may be made available for following by Followers. After Followers are registered, they may request to follow trades made by Lead Traders. Additionally, Followers may be approved by a Lead Trader before they are permitted to follow trades made by the Lead Trader. After a Follower is approved, the Follower may begin following trades made by the Lead Trader.

When a Lead Trader submits a trade, the system may determine a list of Followers who are following the Lead Trader. Then, for each Follower, the system may determine if the Follower is fully following the Lead Trader. If not, then the system may generate and send a message to the Follower that the Lead Trader is making a trade and that the Follower is not participating in that trade.

If the Follower is fully following the Lead Trader, the system may then determine if the Follower has chosen to follow trades involving the particular security being traded by the Lead Trader. If not, then the system may generate and send a message to the Follower that the Lead Trader is making a trade and that the Follower is not participating in that trade.

If the Follower is following trades involving the particular security being traded by the Lead Trader, then the system may determine if the Follower is permitted to trade the security being traded by the Lead Trader. In some circumstances, Followers may not be able to trade certain securities, like options, for example. If the Follower is not permitted to trade the security being traded by the Lead Trader, then the system may generate and send a message to the Follower that the Lead Trader is making a trade and that the Follower is not participating in that trade.

If the Follower is permitted to trade the security being traded by the Lead Trader, then the system may determine how many shares the Follower will be able to trade. The Follower may elect to follow the Lead Trader share-for-share or percent-for-percent. Under the share-for-share method, the Follower has elected to trade the same number of shares as the Lead Trader. When the Follower has elected to follow the Lead Trader share-for-share, the system may determine how much the trade would cost the Follower and then determine if the Follower has enough money in his or her account to participate in the trade. If the Follower does not have enough money to participate, the system may reduce the number of shares the Follower trades based on the Follower's available account balance. If the Follower has enough money to participate, then the Follower will trade the same number of shares as the Lead Trader.

Under the percent-for-percent method, the Follower has elected to trade a percentage of their available account balance that is equal to the percentage of the Lead Trader's available account balance that the Lead Trader is trading. Under the percent-for-percent method, the system may first determine what percentage of the Lead Trader's available account balance the Lead Trader is trading. Then, the system may apply that percentage to the Follower's available account balance to determine how many shares the Follower will be trading.

The system may then determine the number of shares that each Follower following the Lead Trader will be trading. At that point, the system adds up the number of shares each Follower will be trading and then adds that sum to the number of shares that the Lead Trader is trading. The system then transmits the total trade to an Exchange for execution.

The shares traded on an Exchange may be traded at different times and thus possibly at different prices. The Exchange may send a message back to notify the system that the trade has occurred, to identify what security was traded, how many shares were traded, and at what price they were traded.

The system may receive the message and then may determine the average price of the shares traded. To do this, the system may add up the price at which each share was traded and then divide that by the total number of shares traded.

After the system has determined the average price of the shares traded, the system may store the number of shares traded for each Follower along with the average share price in the Follower's account, which may be stored in a database. The system may also store the number of shares traded by the Lead Trader and the average share price in the Lead Trader's account, which may also be stored in a database.

The system may also allow a Follower to duplicate and/or synchronize the portfolio of a selected Lead Trader. To do this, a Follower may first request to duplicate and/or synchronize the portfolio of a Lead Trader. The system may then retrieve the identity and number of shares held by the Lead Trader from the Lead Trader's account. The system may then determine the value of the Lead Trader's portfolio by multiplying the number of shares by the current share price for each security held by the Lead Trader. The system may then determine if the Follower has enough money to duplicate and/or synchronize the Lead Trader's portfolio. If the Follower does not have enough money to duplicate and/or synchronize the Lead Trader's portfolio, the system may generate and send a message to the Follower. If the Follower has enough money to duplicate and/or synchronize the Lead Trader's portfolio, the system may submit a trade to the Exchange. The trade may be executed on the Exchange. After the trade is executed, the Exchange may transmit a message back to the system including the identity of the security or securities traded, the number of each security traded, and the price of each security traded.

The system may receive the message from the Exchange and may then store the identity of each security traded, the number of shares traded for each security, and the price of each security traded in the Follower's account.

After the system has determined the average price of the shares traded, the system may store the number of shares traded for each Follower along with the average share price in the Follower's account, which may be stored in a database. The system may also store the number of shares traded by the Lead Trader and the average share price in the Lead Trader's account, which may also be stored in a database.

The system may also include a mobile trading platform which may alert Mobile Followers that a Lead Trader the Mobile Follower is following has made a trade that the Mobile Follower did not participate in. The Trade Determination System may then determine how many shares of the traded security the Mobile Follower would have traded if the Mobile Follower had participated in the trade. The Trade Determination System then sends the information to the Mobile Trade Determination System which generates a mobile interface that is sent to the Mobile Follower Device. The Mobile Follower device may display the mobile interface to allow the Mobile Follower to view the parameters of the trade.

After the Mobile Follower has viewed the parameters of the trade, the Mobile Follower may elect to ignore the trade, accept the trade, or modify the trade. If the Mobile Follower elects to ignore the trade, the Mobile Follower may simply enter an ignore indicator into the Mobile Follower Device. No trade will occur for the Mobile Follower.

If the Mobile Follower elects to accept the trade, then the Mobile Follower may simply enter an accept indicator into the Mobile Follower Device. The Mobile Follower Device may then transmit the accepted trade parameters to the Mobile Trade Determination System. The Mobile Trade Determination System may then receive the accepted trade parameters and may retrieve any mobile account settings for the Mobile Follower. The Mobile Trade Determination System may then transmit the accepted trade parameters and any mobile account settings for the Mobile Follower to the Trade Determination System. The Trade Determination System may receive the accepted trade parameters and any mobile account settings from the Mobile Trade Determination System.

The Trade Determination System may then transmit the accepted trade parameters and any mobile account settings to an Exchange for execution. The Exchange may receive the accepted trade parameters from the Trade Determination System. After the trade is executed on the Exchange, the Exchange may transmit a message to the Trade Determination System including the identity of the security traded, the number of shares traded, and the price of each share traded. The Trade Determination System may receive the message from the Exchange.

The Trade Determination System may then access the Mobile Follower's account in the Follower Account Database using the Mobile Follower identification. The Trade Determination System may then transmit the identity of the security traded, the number of shares traded, and the price of each share traded to the Follower Account Database.

DETAILED DESCRIPTION

FIG. 1 illustrates an embodiment of a system for automated trade bundling 100. The system for automated trade bundling 100 may include a Lead Trader Computer 102, a Follower Computer 104, a Stock Quote System 106, a Dashboard Generation System 108, a Trade Determination System 110, an Exchange 112, a Lead Trader Account Database 114, and a Follower Account Database 116.

The Lead Trader Computer 102 may be in communication with the Dashboard Generation System 108. The Follower Computer 104 may be in communication with the Dashboard Generation System 108. The Stock Quote System 106 may be in communication with the Dashboard Generation System 108. The Trade Determination System 110 may be in communication with the Dashboard Generation System 108. The Exchange 112 may be in communication with the Trade Determination System 110. The Lead Trader Account Database 114 may be in communication with the Dashboard Generation System 108. The Follower Account Database 116 may be in communication with the Dashboard Generation System 108. The Lead Trader Account Database 114 may be in communication with the Trade Determination System 110. The Follower Account Database 116 may be in communication with the Trade Determination System 110.

In operation, a Lead Trader (not shown) may enter trade parameters including a share identification that identifies the specific security to be traded by the Lead Trader, a Lead Trader share number representing the number of shares to be traded by the Lead Trader, and a Lead Trader share price of the security to be traded into the Lead Trader Computer 102. The Lead Trader Computer 102 may transmit the share identification, Lead Trader share number, Lead Trader share price, and Lead Trader identification to the Dashboard Generation System 108. The Dashboard Generation System 108 may receive the share identification, Lead Trader share number, Lead Trader share price, and Lead Trader identification from the Lead Trader Computer 102.

The Dashboard Generation System 108 may transmit the share identification, Lead Trader share number, Lead Trader share price, and Lead Trader identification to the Trade Determination System 110. The Trade Determination System 110 may receive the share identification, Lead Trader share number, Lead Trader share price, and Lead Trader identification from the Dashboard Generation System 108.

In one or more embodiments, the Dashboard Generation System 108 may use the share identification to retrieve the Lead Trader share price from the Stock Quote System 106. The Dashboard Generation System 108 may then transmit the Lead Trader share price to the Trade Determination System 110.

The Trade Determination System 110 may then use the Lead Trader identification to identify a list of Follower identifications associated with the Lead Trader identification in the Lead Trader Account Database 114. The Trade Determination System 110 may then retrieve the list of Follower identifications associated with the Lead Trader identification from the Lead Trader Account Database 114. The list of Follower identifications associated with the Lead Trader identification in the Lead Trader Account Database 114 may include one or more Follower identifications.

The Trade Determination System 110 identifies the first Follower identification on the list of Follower identifications associated with the Lead Trader identification. For the first Follower identification on the list, the Trade Determination System 110 may use the Follower identification to access a Follower account associated with said first Follower identification in the Follower Account Database 116. The Trade Determination System 110 may then retrieve a full follow indicator associated with said first Follower identification from the Follower Account Database 116.

If the full follow indicator indicates that full following is not set for the first Follower identification, the Trade Determination System 110 may generate an electronic message for the first Follower identification. For example, when the Trade Determination System 110 determines that the full follow indicator is set to off, the Trade Determination System 110 uses the first Follower identification to retrieve an e-mail address associated with the first Follower identification in the Follower Account Database 116. The Trade Determination System 110 then forms an e-mail message by combining predetermined text with the share identification, Lead Trader share number, Lead Trader share price, and Lead Trader identification. In one embodiment, the predetermined text may state that the Follower is not participating in this trade because the Follower is not fully following the Lead Trader. The Trade Determination System 110 may then send the electronic message to an e-mail address associated with the first Follower identification.

In one or more alternative embodiments, the Trade Determination System 110 may also then add the first Follower identification to a Non-Following Follower list.

If the full follow indicator indicates that full following is set for the first Follower identification, the Trade Determination System 110 then retrieves an authorized security type indicator associated with the first Follower identification in the Follower Account Database 116.

The Trade Determination System 110 then determines if the authorized security type indicator indicates whether the first Follower identification is authorized or not to trade in a specific security type. For example, the authorized security type indicator may indicate that the first Follower account is not authorized to trade options. In one embodiment, the Trade Determination System 110 identifies whether a share identification includes five characters, as a typical option may.

If the authorized security type indicator indicates that the first Follower identification is not authorized to trade the security type associated with the share identification, then the Trade Determination System 110 generates an electronic message for the first Follower identification. For example, when the Trade Determination System 110 determines that the authorized security type indicator indicates that the first Follower identification is not authorized to trade the security type associated with the share identification, the Trade Determination System 110 uses the first Follower identification to retrieve an e-mail address associated with the first Follower identification in the Follower Account Database 116. The Trade Determination System 110 then forms an e-mail message by combining predetermined text with the share identification, Lead Trader share number, Lead Trader share price, and Lead Trader identification. In one embodiment, the predetermined text states that the trade was not performed because it was directed to a non-authorized security type. The Trade Determination System 110 may then send the electronic message to an e-mail address associated with the first Follower identification.

If the authorized security type indicator indicates that the first Follower identification is authorized to trade the security type associated with the share identification, then the Trade Determination System 110 retrieves a list of deselected individual share identifications associated with the first Follower identification in the Follower Account Database 116. The Trade Determination System 110 then determines if the share identification matches any of the deselected individual share identifications on the list.

If the share identification matches any of the deselected individual share identifications on the list, the Trade Determination System 110 generates an electronic message for the first Follower identification. For example, when the Trade Determination System 110 determines that the share identification matches one of the deselected individual share identifications on the list, the Trade Determination System 110 uses the first Follower identification to retrieve an e-mail address associated with the first Follower identification in the Follower Account Database 116. The Trade Determination System 110 then forms an e-mail message by combining predetermined text with the share identification, Lead Trader share number, Lead Trader share price, and Lead Trader identification. In one embodiment the predetermined text states that the Follower is not participating in this trade because the security being traded by the Lead Trader was on the Follower's list of deselected shares. The Trade Determination System 110 may then send the electronic message to an e-mail address associated with the first Follower identification.

If the share identification does not match any of the deselected individual share identifications on the list, the Trade Determination System 110 may retrieve the available Follower account balance associated with the first Follower identification in the Follower Account Database 116.

The Trade Determination System 110 may retrieve a share calculation method indicator associated with the first Follower identification from the Follower Account Database 116. The share calculation method indicator may indicate whether the first Follower account is set to trade share-for-share or percent-for-percent.

In one or more embodiments where the share calculation method indicator associated with the first Follower identification is share-for-share, the Trade Determination System 110 may set an initial Follower share number equal to the Lead Trader share number.

The Trade Determination System 110 then multiplies the initial Follower share number by the Lead Trader share price to determine the Follower trade total price.

The Trade Determination System 110 then compares the available Follower account balance to the Follower trade total price.

If the Trade Determination System 110 determines that the available Follower account balance is greater than or equal to the Follower trade total price, then the Trade Determination System 110 may set an approved Follower share number equal to the initial Follower share number.

If the Trade Determination System 110 determines that the available Follower account balance is less than the Follower trade total price, then the Trade Determination System 110 may divide the available Follower account balance by the Lead Trader share price to determine a reduced Follower share number. The Trade Determination System 110 may then set the approved Follower share number equal to the reduced Follower share number.

In one or more embodiments where the share calculation method is percent-for-percent, the Trade Determination System 110 may retrieve the available Lead Trader account balance associated with the Lead Trader identification from the Lead Trader Account Database 114. The Trade Determination System 110 may then multiply the Lead Trader share number by the Lead Trader share price to determine a Lead Trader trade value. The Trade Determination System 110 may then divide the Lead Trader trade value by the available Lead Trader account balance to determine the Lead Trader trade percentage.

After the Trade Determination System 110 has determined the Lead Trader trade percentage, the Trade Determination System 110 may then multiply the available Follower account balance by the Lead Trader trade percentage to determine the Follower account trade value.

The Trade Determination System 110 may then divide the Follower account trade value by the Lead Trader share price to determine the approved Follower share number.

In one or more embodiments where multiple Follower identifications associated with the Lead Trader identification in the Lead Trader Account Database 114, the Trade Determination System 110 may then perform one or more of the functions described above for each Follower identification associated with the Lead Trader identification in the Lead Trader Account Database 114. In an embodiment, a participating Follower identification list is generated and may include each Follower identification that has an approved Follower share number not equal to zero.

After the Trade Determination System 110 has determined the approved Follower share number for each Follower identification on the participating Follower identifications list, the Trade Determination System 110 may determine the total trade share number. To do this, in one or more embodiments the Trade Determination System 110 sums the approved Follower share number for each Follower identification on the participating Follower identifications list to determine a total approved Follower share number.

After the Trade Determination System 110 has determined the total approved Follower share number, the Trade Determination System 110 may add the Lead Trader share number to the total approved Follower share number to determine the total trade share number.

After the Trade Determination System 110 has determined the total trade share number, the Trade Determination System 110 may transmit the share identification and total trade share number to the Exchange 112. In one or more embodiments, the Exchange may include the New York Stock Exchange, American Stock Exchange, NASDAQ, or any other exchange that facilitates securities trading.

After the trade has been executed at the Exchange 112, the Exchange 112 may send a notification back to the Trade Determination System 110 that the trade has been completed. The message from the Exchange 112 may include the total number of shares traded and the traded share price for each share traded.

The Trade Determination System 110 may receive the message from the Exchange 112 that may include the total number of shares traded and the traded share price for each share traded.

In some instances, all of the shares in the total trade share number may not be traded at the same time at the Exchange, so the shares may have been traded at different prices. The Trade Determination System 110 then determines the average traded share price by multiplying the number of shares traded by the traded share price for each trade, adding them together, and then dividing by the total number of shares traded.

In an alternative embodiment, the Trade Determination System 110 may determine the average traded share price by adding up the traded share price for each share traded and then dividing by the total number of shares traded.

After the average traded share price has been determined, for each Follower identification on the participating Follower identifications list, the Trade Determination System 110 may locate the Follower account in the Follower Account Database 116 using the Follower identification and may store the approved Follower share number and the average traded share price in the Follower Account Database 116 for each Follower identification.

The Trade Determination System 110 may also locate the Lead Trader account in the Lead Trader Account Database 114 using the Lead Trader identification and may store the Lead Trader share number and average traded share price to the Lead Trader Account Database 114.

In an embodiment, after the Trade Determination System 110 has stored the Lead Trader share number and average share price in the Lead Trader Account Database 114, the Trade Determination System 110 may generate an electronic message to alert Followers that the Lead Trader completed the trade. For each Follower identification associated with the Lead Trader identification in the Lead Trader Account Database 114, the Trade Determination System 110 retrieves an e-mail address associated with each Follower identification from the Follower Account Database 116. The Trade Determination System 110 may then generate an electronic message with predetermined text along with the share identification and average traded share price. The predetermined text may state that the Lead Trader has just traded a security.

Figure 20:
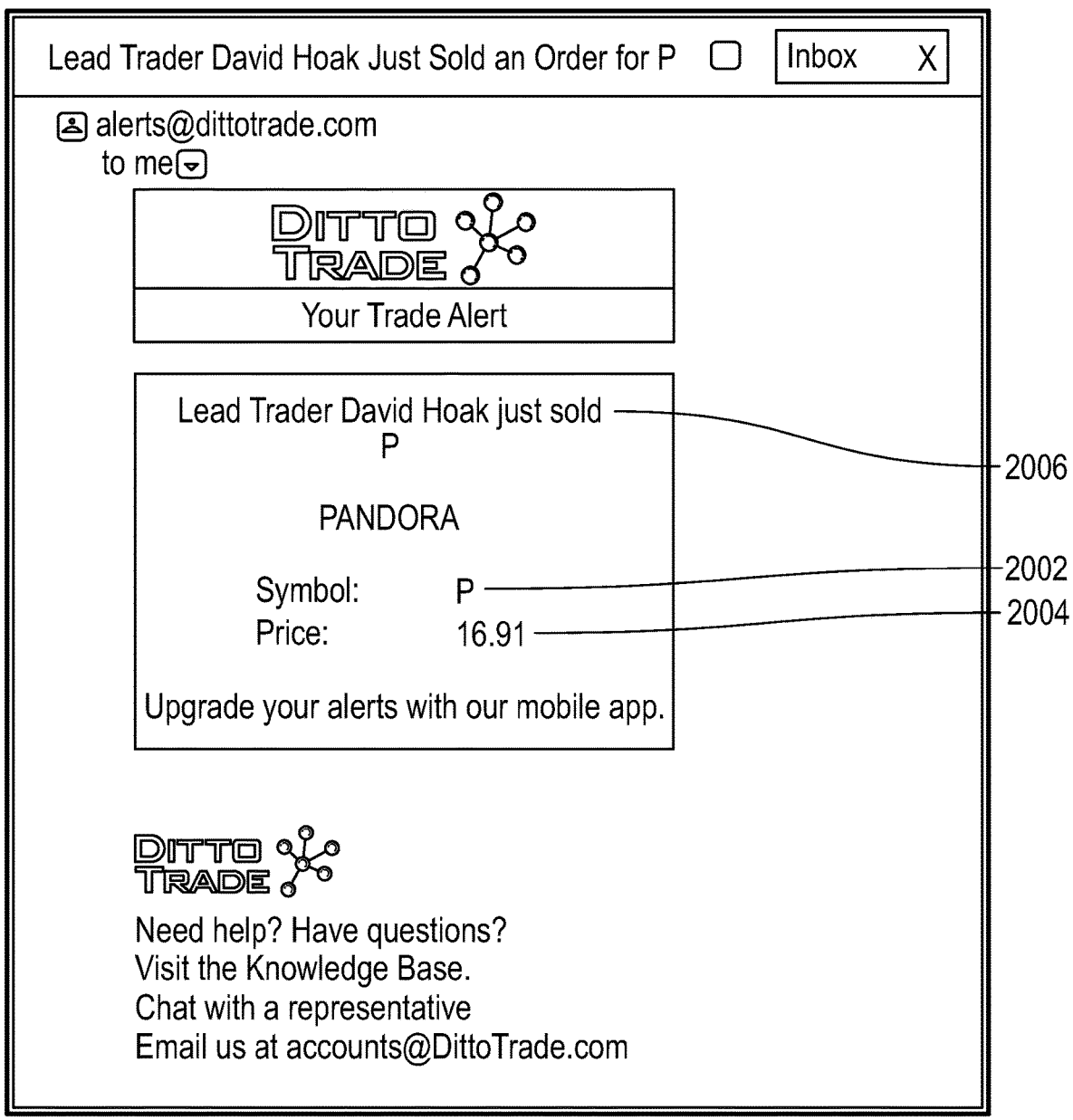
FIG. 20 is an embodiment of an electronic message.

FIG. 20 is an embodiment of an electronic message 2000. Electronic message 2000 includes a share identification 2002, the average traded share price 2004, and predetermined text 2006.

Figure 2:
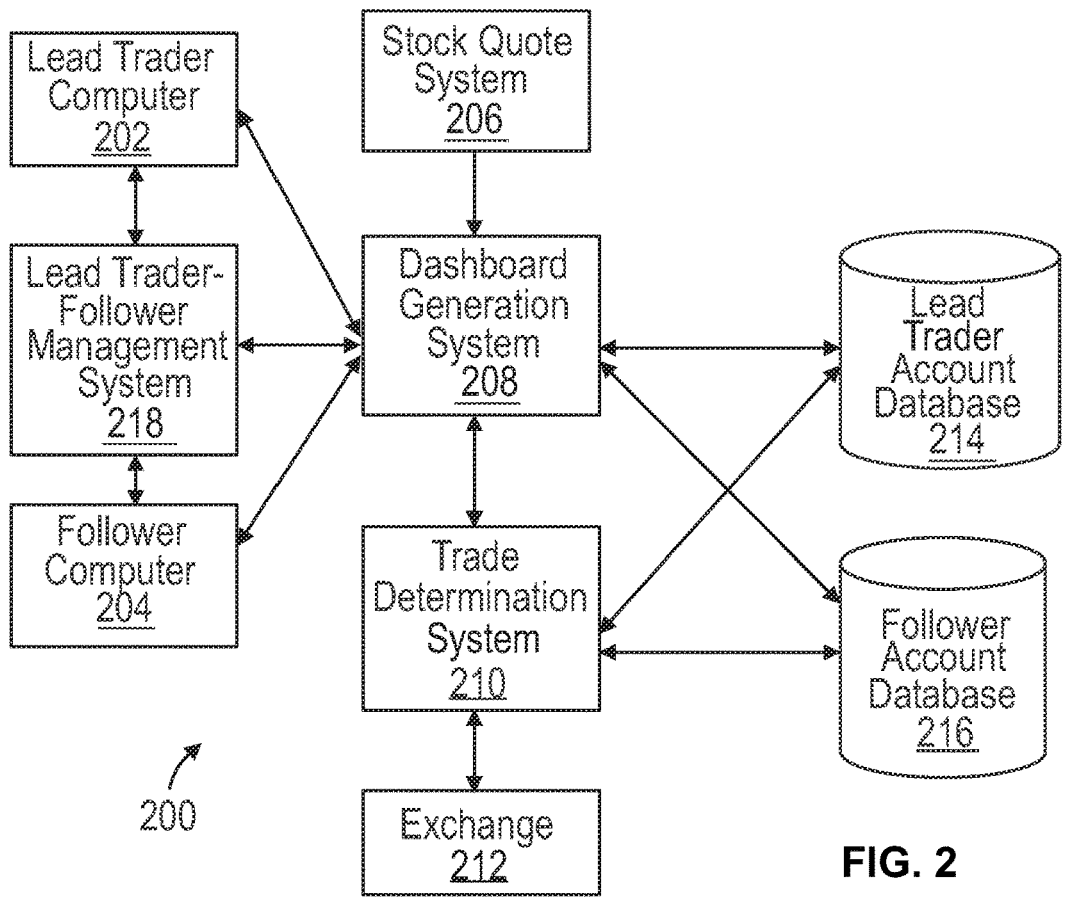
FIG. 2 illustrates an alternative embodiment of a system for automated trade bundling.

FIG. 2 illustrates an alternative embodiment of a system for real-time trade bundling 200. System 200 may include a Lead Trader Computer 202, a Follower Computer 204, a Stock Quote System 206, a Dashboard Generation System 208, a Trade Determination System 210, an Exchange 212, a Lead Trader Account Database 214, a Follower Account Database 216, and a Lead Trader-Follower Management System 218.

The Lead Trader Computer 202 may be in communication with the Dashboard Generation System 208. The Follower Computer 204 may be in communication with the Dashboard Generation System 208. The Stock Quote System 206 may be in communication with the Dashboard Generation System 208. The Trade Determination System 210 may be in communication with the Dashboard Generation System 208. The Exchange 212 may be in communication with the Trade Determination System 210. The Lead Trader Account Database 214 may be in communication with the Dashboard Generation System 208. The Follower Account Database 216 may be in communication with the Dashboard Generation System 208. The Lead Trader Account Database 214 may be in communication with the Trade Determination System 210. The Follower Account Database 216 may be in communication with the Trade Determination System 210. The Lead Trader Computer 202 may be in communication with the Lead Trader-Follower Management System 218. The Follower Computer 204 may be in communication with the Lead Trader-Follower Management System 218. The Lead Trader-Follower Management System 218 may be in communication with the Dashboard Generation System 208.

In operation, a Lead Trader may register through the Lead Trader-Follower Management System 218. To do this, the Lead Trader may enter Lead Trader registration information including Lead Trader name, Lead Trader contact information including a Lead Trader e-mail address, and a Lead Trader account password into the Lead Trader Computer 202.

The Lead Trader Computer 202 may then transmit the Lead Trader registration information to the Lead Trader-Follower Management System 218. The Lead Trader-Follower Management System 218 may receive the Lead Trader registration information from the Lead Trader Computer 202. The Lead Trader registration information may be reviewed and approved in the Lead Trader-Follower Management System 218. For example, approval may include verifying the identity of the Lead Trader, verifying licenses of the Lead Trader, and/or verifying capital requirement compliance with the Lead Trader.

After the Lead Trader has been approved, the Lead Trader-Follower Management System 218 may transmit the Lead Trader registration information to the Dashboard Generation System 208. In one or more embodiments, the Lead Trader-Follower Management System 218 may generate a Lead Trader identification which may uniquely identify the Lead Trader. In one or more embodiments, the Lead Trader-Follower Management System 218 may transmit a Lead Trader identification to the Dashboard Generation System 208. In one or more embodiments, the Lead Trader-Follower Management System 218 may transmit a Lead Trader identification along with the Lead Trader registration information to the Dashboard Generation System 208.

The Dashboard Generation System 208 may receive the Lead Trader registration information and/or Lead Trader identification from the Lead Trader-Follower Management System 218.

After the Dashboard Generation System 208 has received the Lead Trader registration information and/or Lead Trader identification, the Dashboard Generation System 208 may store the Lead Trader registration information and/or Lead Trader identification in the Lead Trader Account Database 214.

The Lead Trader-Follower Management System 218 may also generate an electronic message to notify the Lead Trader that the Lead Trader has been approved. The electronic message may be sent to the Lead Trader e-mail address. The electronic message may include a URL linking to a webpage that allows the Lead Trader to enter and/or edit Lead Trader profile information including a Lead Trader biography, Lead Trader trading strategies, or past Lead Trader returns, or other Lead Trader information.

The Lead Trader-Follower Management System 218 may make the Lead Trader available for following by making the Lead Trader profile viewable on a public website. In one or more embodiments, the website may include a link to request to follow the Lead Trader.

The Follower may identify a Lead Trader that the Follower wishes to follow. The Follower may enter a request to follow a Lead Trader into the Follower Computer 204. The Follower Computer 204 may transmit the request to follow a Lead Trader to the Lead Trader-Follower Management System 218. The Lead Trader-Follower Management System 218 may receive the request to follow a Lead Trader from the Follower Computer 204. Alternatively, the Follower may click the link to request to follow the Lead Trader on the website displayed on the Follower Computer 204.

In an alternative embodiment, a Follower may first register through the Dashboard Generation System 208. To proceed with registration, the Follower may enter a Follower registration request and Follower registration information into the Follower Computer 204. The Follower Computer 204 may transmit the Follower registration request and Follower registration information to the Dashboard Generation System 208. The Dashboard Generation System 208 may receive the Follower registration request from the Follower Computer 204. The Dashboard Generation System 208 may then generate a Follower identification for the new Follower.

After the Dashboard Generation System 208 has generated a Follower identification, the Dashboard Generation System 208 may transmit the new Follower identification to the Follower Account Database 216 along with Follower registration information.

After receiving the request to follow a Lead Trader, the Lead Trader-Follower Management System 218 may transmit the request to follow a Lead Trader to the Lead Trader Computer 202 for approval. The Lead Trader Computer 202 may receive the request to follow a Lead Trader from the Lead Trader-Follower Management System 218 and may display the request.

The Lead Trader may review the request to follow the Lead Trader on the Lead Trader Computer 202 and decide whether to approve or reject the request. The Lead Trader may then enter an approval indicator into the Lead Trader Computer 202. The approval indicator may indicate that the request to follow was approved or denied.

Lead Trader Computer 202 may then transmit the approval indicator to the Lead Trader-Follower Management System 218. The Lead Trader-Follower Management System 218 may receive the approval indicator.

If the approval indicator indicates that the request was denied by the Lead Trader, the Lead Trader-Follower Management System 218 may generate an electronic message such as an e-mail to the Follower that the Follower's request was denied.

If the approval indicator indicates that the request was approved by the Lead Trader, the Lead Trader-Follower Management System may transmit the Lead Trader identification and the Follower identification to the Dashboard Generation System 208. The Dashboard Generation System 208 may receive the Lead Trader identification and the Follower identification.

After the Dashboard Generation System 208 has received the Lead Trader identification and Follower identification, the Dashboard Generation System 208 may access the Lead Trader account in the Lead Trader Account Database 214 using the Lead Trader identification. The Dashboard Generation System 208 may then add the Follower identification to the list of Follower identifications associated the Lead Trader account in the Lead Trader Database 214.

The Dashboard Generation System 208 may also access the Follower account in the Follower Account Database 216 using the Follower identification. The Dashboard Generation System 208 may then add the Lead Trader identification to the list of Lead Trader identifications of Lead Traders the Follower is following in the Follower Account Database 216.

In another embodiment, a Lead Trader may be an Advisor. An Advisor is similar to a Lead Trader but differs in that the Advisor does not participate in trades but rather recommends trades to Followers.

A Follower may register to follow the advisory trading service. A Follower may enter an advisory trading indicator into the Follower Computer 204. The Follower Computer 104 may then transmit the advisory trading indicator and advisory trading Follower identification to the Dashboard Generation System 208.

The Dashboard Generation System 208 may receive the advisory trading indicator and advisory trading Follower identification from the Follower Computer 204. The Dashboard Generation System 208 then accesses the Follower account in the Follower Account Database 216 using the Follower identification and stores the advisory trading indicator in the Follower Account Database 216 and associates the advisory trading indicator with the advisory trading Follower identification.

In one embodiment, an Advisor may enter advisory trading information including advisory trading share identification, advisory trading share number, and advisory trading share price into an Advisor Computer. In this embodiment, Lead Trader Computer 302 may be an Advisor Computer. The Advisor Computer may then transmit the advisory trading information including advisory trading share identification, advisory trading share number, and advisory trading share price to the Trade Determination System 210.

In one embodiment, the Trade Determination System 210 may generate advisory trading information including advisory trading share identification, advisory trading share number, and advisory trading share price.

The Trade Determination System 210 may then access the Follower Account Database 216 and may retrieve an advisory trading Follower identification list including advisory trading Follower identifications associated with an advisory trading indicator in the Follower Account Database 216.

For a first advisory trading Follower identification, the Trade Determination System 210 may determine an approved advisory trading Follower share number. To do this, the Trade Determination System 210 may access the advisory trading Follower account in the Follower Account Database 216 using the first advisory trading Follower identification. The Trade Determination System 210 may then retrieve a full advisory trading follow indicator from the Follower Account Database 216 associated with the first advisory trading Follower identification.

If the full advisory trading follow indicator indicates that the first advisory trading Follower identification is not fully following advisory trading, then the Trade Determination System 210 may generate an electronic message for the first advisory trading Follower identification. For example, when the Trade Determination System 210 determines that the full advisory trading follow indicator is set to off, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. In one embodiment the predetermined text may state that advisory trading Follower is not participating in this advisory trade because the advisory trading Follower is not fully following advisory trading. The Trade Determination System 210 then transmits the electronic message to an e-mail address associated with the first advisory trading Follower identification.

If the full advisory trading follow indicator indicates that the advisory trading Follower is fully following advisory trading, then the Trade Determination System 210 may retrieve the authorized security type indicator associated with the first advisory trading Follower identification from the Follower Account Database 216.

If the authorized security type indicator indicates that the advisory trading Follower is not authorized to trade type of security associated with the advisory trading share identification, then the Trade Determination System 210 may generate an electronic message for the first advisory trading Follower. For example, when the Trade Determination System 210 determines that the advisory trading authorized security type indicator indicates that the advisory trading Follower is not authorized to trade type of security associated with the advisory trading share identification, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. In one embodiment the predetermined text may state that the advisory trading Follower is not participating in this advisory trade because the advisory Trading Follower is not authorized to trade the type of security being traded. The Trade Determination System 210 may then send the electronic message to an e-mail address associated with the first Follower identification.

If the advisory trading authorized security type indicator indicates that the advisory trading Follower is authorized to trade the type of security associated with the advisory trading share identification, then the Trade Determination System 210 may retrieve a list of deselected individual share identifications associated with the first advisory trading Follower identification in the Follower Account Database 216.

The Trade Determination System 210 may compare the advisory trading share identification to the list of deselected individual share identifications associated with the first advisory trading Follower identification. If the advisory trading share identification matches any of the deselected individual share identifications on the list, then the Trade Determination System 210 may generate an electronic message for the advisory trading Follower. For example, when the Trade Determination System 210 determines that the advisory trading share identification matches any of the deselected individual share identifications on the list, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. In one embodiment the predetermined text may state that advisory trading Follower is not following this advisory trade because the advisory trading share identification was on the list of deselected individual share identifications for the advisory trading Follower. The Trade Determination System 210 may then send the electronic message to an e-mail address associated with the first Follower identification.

If the advisory trading share identification does not match any of the deselected individual share identifications from the list, then the Trade Determination System 210 may determine approved advisory trading Follower share number for the first advisory trading Follower identification.

The Trade Determination System 210 may then retrieve the share calculation method indicator associated with the first advisory trading Follower identification in the Follower Account Database 216.

If the share calculation method indicator associated with the first advisory trading Follower identification indicates that the share calculation method is share-for-share, the Trade Determination System 210 may retrieve the initial advisory trading Follower share number associated with the first advisory trading Follower identification in the Follower Account Database 216.

The Trade Determination System 210 may then multiply the initial advisory trading Follower share number by the advisory trading share price to determine the advisory trading Follower trade total price.

The Trade Determination System 210 may then compare the available advisory trading Follower account balance to the advisory trading Follower trade total price.

If the available advisory trading Follower account balance is less than the advisory trading Follower trade total price, then the Trade Determination System 210 may divide the available advisory trading Follower account balance by the advisory trading share price to determine a reduced advisory trading Follower share number. The Trade Determination System 210 may then set the approved advisory trading Follower share number equal to the reduced advisory trading Follower share number.

If the advisory trading share calculation indicator associated with the first advisory trading Follower identification indicates that the share calculation method is percent-for-percent, then the Trade Determination System 210 may retrieve the advisory trading share percentage associated with the first advisory trading Follower identification in the Follower Account Database 216.

The Trade Determination System 210 may then multiply the available advisory trading Follower account balance by the advisory trading share percentage to determine the advisory trading Follower account trade value.

The Trade Determination System 210 may then divide the advisory trading Follower account trade value by the advisory trading share price to determine the approved advisory trading Follower share number.

If the advisory trading share calculation indicator associated with the first advisory trading Follower identification indicates that the share calculation method is dollar-for-dollar, then the Trade Determination System 210 may retrieve the initial advisory trading trade amount associated with the first advisory trading Follower identification in the Follower Account Database 216.

The Trade Determination System 210 may then compare the available advisory trading Follower account balance associated with the first advisory trading Follower identification to the initial advisory trading trade amount associated with the first advisory trading Follower identification.

If the available advisory trading Follower account balance is less than the initial advisory trading trade amount, then the Trade Determination System 210 may set the approved advisory trading trade amount equal to the available advisory trading Follower account balance.

If the available advisory trading Follower account balance is greater than or equal to the initial advisory trading share amount, then the Trade Determination System 210 may set the approved advisory trading trade amount equal to the initial advisory trading trade amount.

The Trade Determination System 210 may then divide the approved advisory trading trade amount by the advisory trading share price to determine the approved advisory trading Follower share number.

In an embodiment where the advisory trading Follower identification list includes more than one advisory trading Follower identifications, the Trade Determination System 210 may determine the approved advisory trading Follower share number for each advisory trading Follower identification included in the advisory trading Follower identification list.

After the Trade Determination System 210 has determined the approved advisory trading Follower share number (using the share-for-share, percent-for-percent, or dollar-for-dollar calculation method) for each advisory trading Follower identification on the advisory trading Follower identification list, the Trade Determination System 210 may sum the approved advisory trading Follower share number associated with each advisory trading Follower identification from the advisory trading Follower identification list to determine the total advisory trading Follower share number.

The Trade Determination System 210 may then transmit the advisory trading share identification and total advisory trading Follower share number to the Exchange 212 for execution. In one or more embodiments, the Trade Determination System 210 may generate an electronic advisory trading message for each advisory trading Follower identification on the advisory trading Follower identification list, including the advisory trading share identification and the approved advisory trading share number sent to the Exchange 212. For example, the Trade Determination System 210 uses the first advisory trading Follower identification to retrieve an e-mail address associated with the first advisory trading Follower identification in the Follower Account Database 216. The Trade Determination System 210 then forms an e-mail message by combining predetermined text with the advisory trading share identification, advisory trading share number, and advisory trading share price. The Trade Determination System 210 may then send the electronic message to an e-mail address associated with the first advisory trading Follower identification.

The Exchange 212 may transmit an electronic message to the Trade Determination System 210 after the trade has been executed including the total advisory trading Follower share number and the total advisory trading trade price. The Trade Determination System 210 may then receive the electronic message from the Exchange 212 including the total advisory trading Follower share number and the total advisory trading trade price.

After receiving the message from the Exchange 212, the Trade Determination System 210 may then determine the average advisory trading share price. The Trade Determination System 210 determines the average advisory trading traded share price by multiplying the number of advisory trading shares traded by the traded share price for each trade, adding them together, and then dividing by the total number of shares traded.

In another embodiment, the Trade Determination System 210 may determine the average advisory trading share price by dividing the total advisory trading trade price by the total advisory trading Follower share number.

For the first advisory trading Follower identification, the Trade Determination System 210 may access the advisory trading Follower account in the Follower Account Database 216 using the first advisory trading Follower identification and may store the approved advisory trading Follower share number associated with the first advisory trading Follower identification and average advisory trading share price in the Follower Account Database 216.

In another embodiment, a Follower may request to duplication and/or synchronize the portfolio of a selected Lead Trader. In one embodiment, the Follower may select a Lead Trader and may enter a portfolio duplication and/or Synchronization request indicator into Follower Computer 204. The Follower Computer 204 may transmit the duplication and/or synchronization request indicator, duplication and/or synchronization Lead Trader identification, and duplication and/or synchronization Follower identification to the Lead Trader-Follower Management System 218. The Lead Trader-Follower Management System 218 may receive the duplication and/or synchronization request indicator, duplication and/or synchronization Lead Trader identification, and duplication and/or synchronization Follower identification from the Follower Computer 204. The Lead Trader-Follower Management System may transmit duplication and/or synchronization request indicator and duplication and/or synchronization Follower identification to the Lead Trader Computer 202 using the duplication and/or synchronization Lead Trader identification.

If the Lead Trader approves the request, the Lead Trader-Follower Management System 218 may generate an electronic message for the Follower that the request was approved and may transmit the electronic message as described above.

In another embodiment, the Lead Trader-Follower Management System 218 may transmit the duplication and/or synchronization request decision indicator, duplication and/or synchronization Lead Trader identification, and duplication and/or synchronization Follower identification to the Dashboard Generation System 208. The Dashboard Generation System 208 may then access the duplication and/or synchronization Follower account in the Follower Account Database 216 associated with the duplication and/or synchronization Follower identification and associate the duplication and/or synchronization request decision indicator and duplication and/or synchronization Lead Trader identification with the duplication and/or synchronization Follower identification in the Follower Account Database 216.

The Trade Determination System 210 may then access the duplication and/or synchronization Lead Trader account in the Lead Trader Account Database 214 using the duplication and/or synchronization Lead Trader identification. The Trade Determination System 210 may then retrieve Lead Trader portfolio share identifications and Lead Trader portfolio share numbers from the Lead Trader Account Database 214.

The Trade Determination System 210 may then retrieve a share quote from the Stock Quote System 206 for each Lead Trader portfolio share identification. In another embodiment, the Trade Determination System 210 may transmit the Lead Trader portfolio share identifications to the Dashboard Generation System 208. The Dashboard Generation System 208 may receive the Lead Trader portfolio share identifications. The Dashboard Generation System 208 may then retrieve a share quote from the Stock Quote System 206 for each Lead Trader portfolio share identification. Then the Dashboard Generation System 208 may transmit the Lead Trader portfolio share identifications and share quotes to the Trade Determination System 210.

For each Lead Trader portfolio share identification, the Trade Determination System 210 may multiply the Lead Trader portfolio share number by the share quote to determine the portfolio share cost.

The Trade Determination System 210 may then sum the portfolio share cost for each Lead Trader portfolio share identification to determine the Lead Trader portfolio value.

The Trade Determination System 210 may then retrieve the available duplication and/or synchronization Follower account balance associated with the duplication and/or synchronization Follower identification from the Follower Account Database 216.

The Trade Determination System 210 may then compare the available duplication and/or synchronization Follower account balance to the Lead Trader portfolio value. If the available duplication and/or synchronization Follower account balance is less than the Lead Trader portfolio value, the available duplication and/or synchronization Follower account balance is not sufficient. If the Trade Determination System 210 determines that the available duplication and/or synchronization Follower account balance is not sufficient, the Trade Determination System 210 may generate an electronic message. For example, the Trade Determination System 210 uses the duplication and/or synchronization Follower identification to retrieve an e-mail address associated with the duplication and/or synchronization Follower identification in the Follower Account Database 216. The Trade Determination System 210 then forms an e-mail message by combining predetermined text with the Lead Trader portfolio share identifications, share quote for each Lead Trader portfolio share identification, portfolio share cost, Lead Trader portfolio share number, and Lead Trader identification. In one embodiment the predetermined text may state that the available duplication and/or synchronization Follower account balance was not sufficient to fully duplicate and/or synchronize the Lead Trader portfolio. The Trade Determination System 210 may then send the electronic message to an e-mail address associated with the first duplication and/or synchronization Follower identification.

If the Trade Determination System 210 determines that the available duplication and/or synchronization Follower account balance is greater than or equal to the Lead Trader portfolio value, the Trade Determination System 210 may create a list of Follower portfolio share identifications including the Lead Trader portfolio share identifications. The list may further include the portfolio share number for each Follower portfolio share identification.

The Trade Determination System 210 may then transmit each Follower portfolio share identification and Follower portfolio share number to the Exchange 212 for execution.

After the trade has been executed on the Exchange 212, the Exchange 212 may transmit an electronic message to the Trade Determination System 210 including each Follower portfolio share identification traded, the Follower portfolio share number for each Follower portfolio share identification, and portfolio share price for each Follower portfolio share identification. The Trade Determination System 210 may receive the electronic message from the Exchange 212.

After the Determination System 210 has received the electronic message from the Exchange 212 that the trade has been completed, the Trade Determination System 210 may access the Follower account in the Follower Account Database 216 using the Follower identification and may store each Follower portfolio share identification, the Follower portfolio share number for each Follower portfolio share identification, and portfolio share price for each Follower portfolio share identification.

In one or more embodiments, a Follower may request to stop following a Lead Trader. A Follower may select a Lead Trader identification and may enter a stop following request indicator into the Follower Computer 204. The Follower Computer 204 may transmit the stop following request indicator to the Dashboard Generation System 208 along with the Follower identification and the Lead Follower identification. The Dashboard Generation System 208 may receive the Follower identification, Lead Trader identification, and stop following request indicator from the Follower Computer 204.

The Dashboard Generation System 208 may then access the Follower account in the Follower Account Database 216 using the Follower identification. The Dashboard Generation System 208 may then delete the Lead Trader identification associated with the Follower account that is equal to the Lead Trader identification specified with the stop following request indicator.

The Dashboard Generation System 208 may then access the Lead Trader account the Lead Trader Account Database 214 using the Lead Trader identification. The Dashboard Generation System 208 may then delete the Follower identification associated with the Lead Trader account that is equal to the Follower identification specified with the stop following request indicator.

In another embodiment, a Follower may elect to partially detach shares from a Lead Trader to keep in the Follower account for later trading. The Follower may enter a detach indicator into the Follower Computer 204 for a detached share identification along with a detached share number. The Follower Computer 204 may transmit the detached share identification and detached share number to the Dashboard Generation System 208. The Dashboard Generation System 208 may receive the detached share identification and detached share number from the Follower Computer 204. The Dashboard Generation System 208 may then locate the Follower account in the Follower Account Database 216 using the Follower identification. The Dashboard Generation System 208 may then decrease the number of shares associated with the Follower identification that the Lead Trader can control by the detached share number in the Follower Account Database 216.

Figure 3:
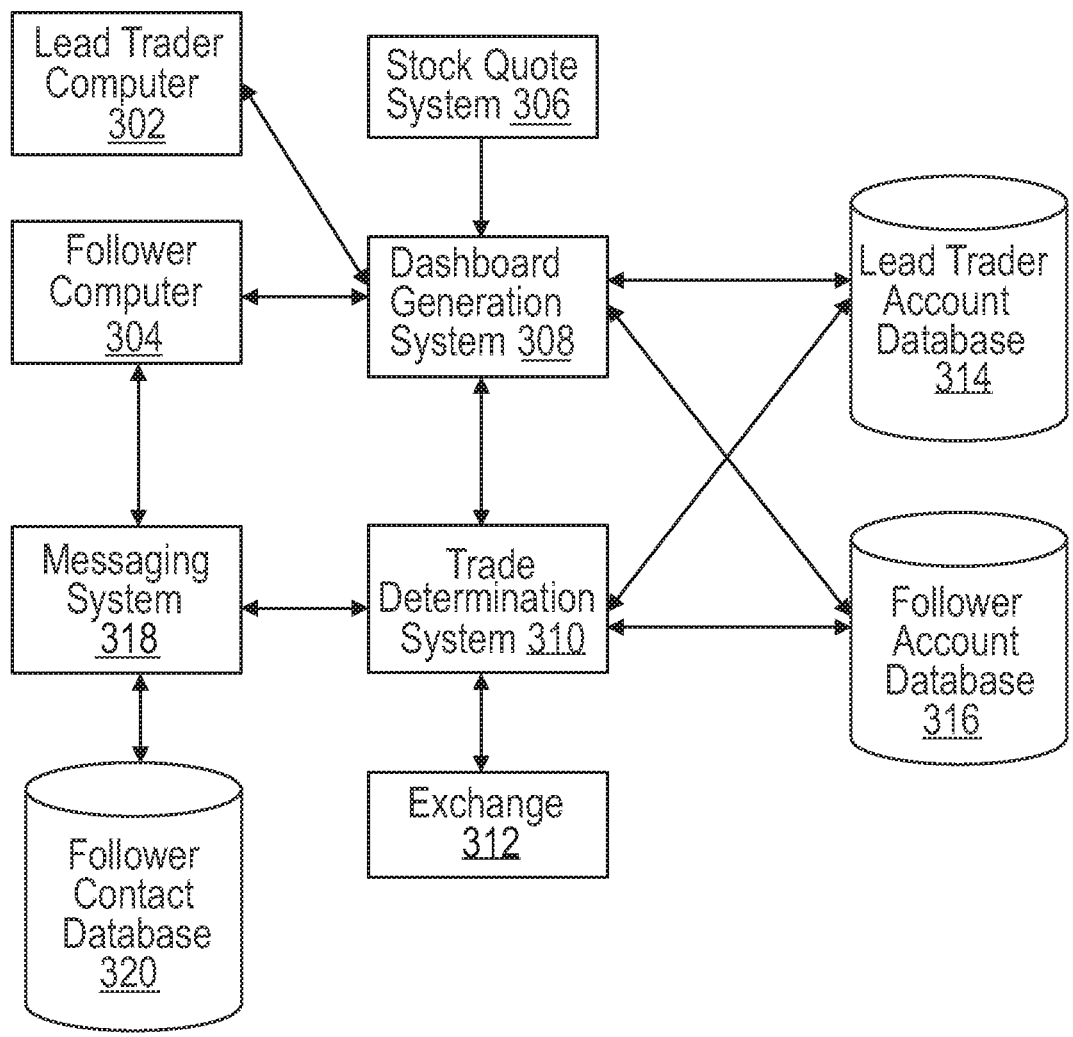
FIG. 3 illustrates an alternative embodiment of a system for automated trade bundling.

FIG. 3 illustrates an alternative embodiment of a system for real-time trade bundling 300. System 300 may include a Lead Trader Computer 302, a Follower Computer 304, a Stock Quote System 306, a Dashboard Generation System 308, a Trade Determination System 310, an Exchange 312, a Lead Trader Account Database 314, a Follower Account Database 316, and a Messaging System 318, and a Follower Contact Database 320.

The Lead Trader Computer 302 may be in communication with the Dashboard Generation System 308. The Follower Computer 304 may be in communication with the Dashboard Generation System 308. The Stock Quote System 306 may be in communication with the Dashboard Generation System 308. The Trade Determination System 310 may be in communication with the Dashboard Generation System 308. The Exchange 312 may be in communication with the Trade Determination System 310. The Lead Trader Account Database 314 may be in communication with the Dashboard Generation System 308. The Follower Account Database 316 may be in communication with the Dashboard Generation System 308. The Lead Trader Account Database 314 may be in communication with the Trade Determination System 310. The Follower Account Database 316 may be in communication with the Trade Determination System 310. The Follower Computer 304 may be in communication with the Messaging System 318. The Messaging System 318 may be in communication with the Follower Contact Database 320. The Messaging System 318 may be in communication with the Trade Determination System 310.

In operation, when the Trade Determination System 310 generates an electronic message, such as for example when a full follow indicator indicates that full following is not set for a Follower identification or when a share identification matches any of the deselected individual share identifications on a list associated with a Follower identification, the Trade Determination System 310 may transmit the electronic message to the Messaging System 318 along with a Follower identification.

The Messaging System 318 may receive the electronic message and Follower identification from the Trade Determination System 310.

After the Messaging System 318 has received the electronic message and Follower identification, the Messaging System 318 may access the Follower account in the Follower Contact Database 320 using the Follower identification. The Messaging System 318 may then retrieve the Follower contact information associated with the Follower identification in the Follower Contact Database 320. In one or more embodiments, the Follower contact information may include a Follower e-mail address.

After the Messaging System 318 has retrieved the Follower contact information associated with the Follower identification from the Follower Contact Database 320, the Messaging System 318 may transmit the electronic message to the Follower Computer 304.

The Follower Computer may receive the electronic message from the Messaging System 318 and may display the electronic message.

Figure 4:
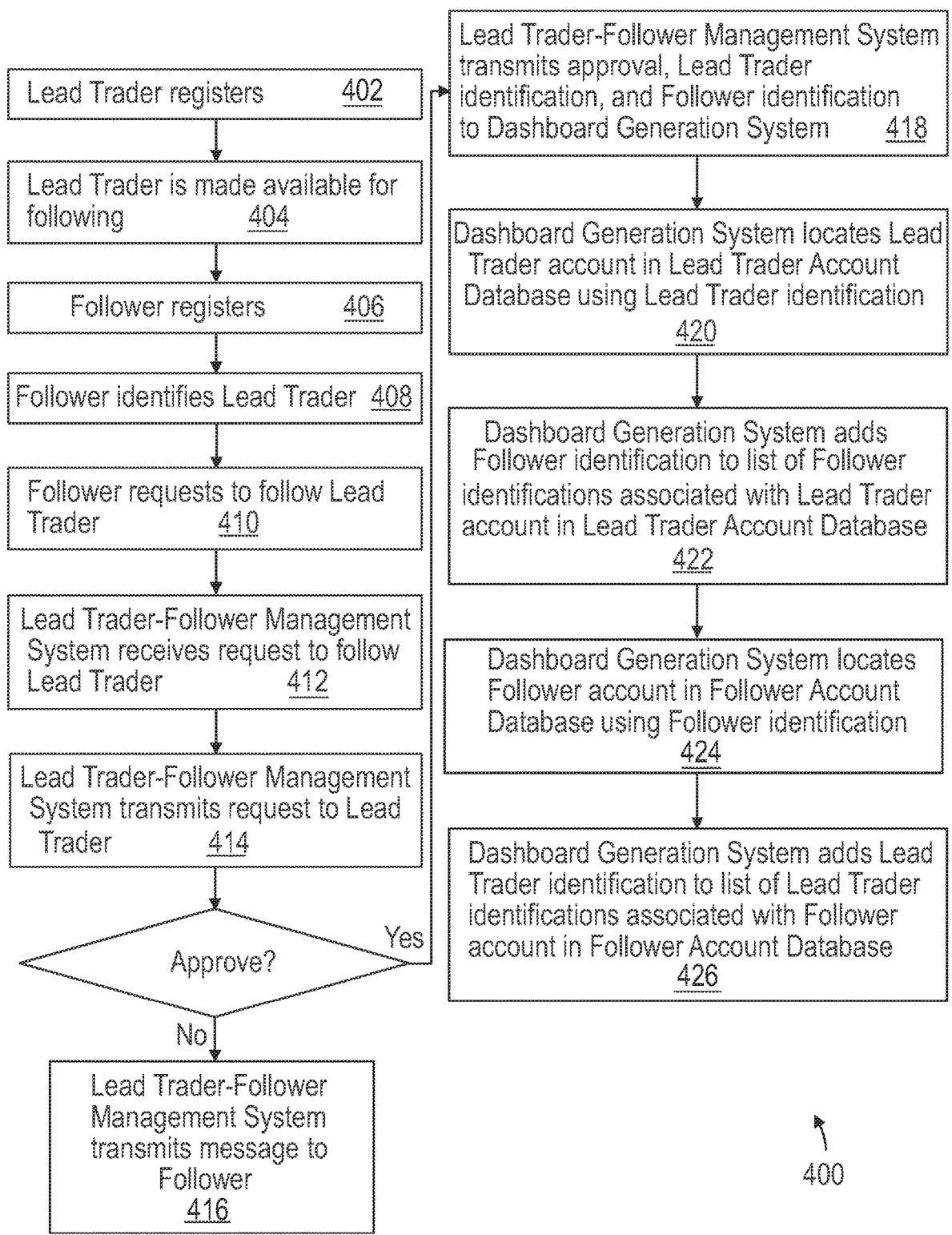
FIG. 4 is a flowchart of a Lead Trader-Follower Attachment Process.

FIG. 4 is a flowchart of a Lead Trader-Follower Attachment Process.

At 402, a Lead Trader registers. In one or more embodiments, the Lead Trader may enter registration information that may be transmitted to a Lead Trader-Follower Management System.

Then, at 404, after a Lead Trader has registered, the Lead Trader may be made available for following. In one or more embodiments, the Lead Trader may be identified in the Lead Trader-Follower Management System.

Then, at 406, a Follower registers. In one or more embodiments, the Follower may enter registration information that may be transmitted to a Lead Trader-Follower Management System.

Next, at 408, a Follower identifies a Lead Trader that the Follower wishes to follow. In one or more embodiments, the Follower may identify the Lead Trader in a Lead Trader-Follower Management System.

Next, at 410, after a Follower has identified a Lead Trader that the Follower wishes to follow, the Follower may request to follow the Lead Trader. In one or more embodiments, the Follower may enter a request into a Follower Computer. The Follower Computer may transmit the request to the Lead Trader-Follower Management System.

At 412, the Lead Trader-Follower Management System receives the Follower request to follow the Lead Trader. In one or more embodiments, the Lead Trader-Follower Management System may receive the request from the Follower Computer.

At 414, the Lead Trader-Follower Management System transmits the request to the Lead Trader. In one or more embodiments, the Lead Trader-Follower Management System may transmit the request to the Lead Trader Computer. The Lead Trader may then view the request on the Lead Trader Computer and may decide to approve or reject the request. In one or more embodiments, the Lead Trader may enter an approval indicator into the Lead Trader Computer.

If the Lead Trader denies the request, then at 416 the Lead Trader-Follower Management System transmits a message to the Follower. In one or more embodiments, the Lead Trader-Follower Management System may transmit an electronic message to the Follower Computer.

If the Lead Trader approves the request, then at 418 the Lead Trader-Follower Management System transmits the approval indicator, Lead Trader identification, and Follower identification to the Dashboard Generation System. The Dashboard Generation System may receive the approval indicator, Lead Trader identification, and Follower identification from the Lead Trader-Follower Management System.

At 420, the Dashboard Generation System locates the Lead Trader account in a Lead Trader Account Database using the Lead Trader identification.

At 422, the Dashboard Generation System adds the Follower identification to the list of Follower identifications associated with the Lead Trader account in the Lead Trader Account Database. The list of Follower identifications associated with the Lead Trader account in the Lead Trader Account Database may represent the Followers who are following the Lead Trader.

At 424, the Dashboard Generation System then locates the Follower account in the Follower Account Database using the Follower identification.

At 426, the Dashboard Generation System then adds the Lead Trader identification to the list of Lead Trader identifications associated with the Follower account in the Follower Account Database. The list of Lead Trader identifications associated with the Follower account in the Follower Account Database may represent the Lead Traders whom the Follower is following.

Figure 5:
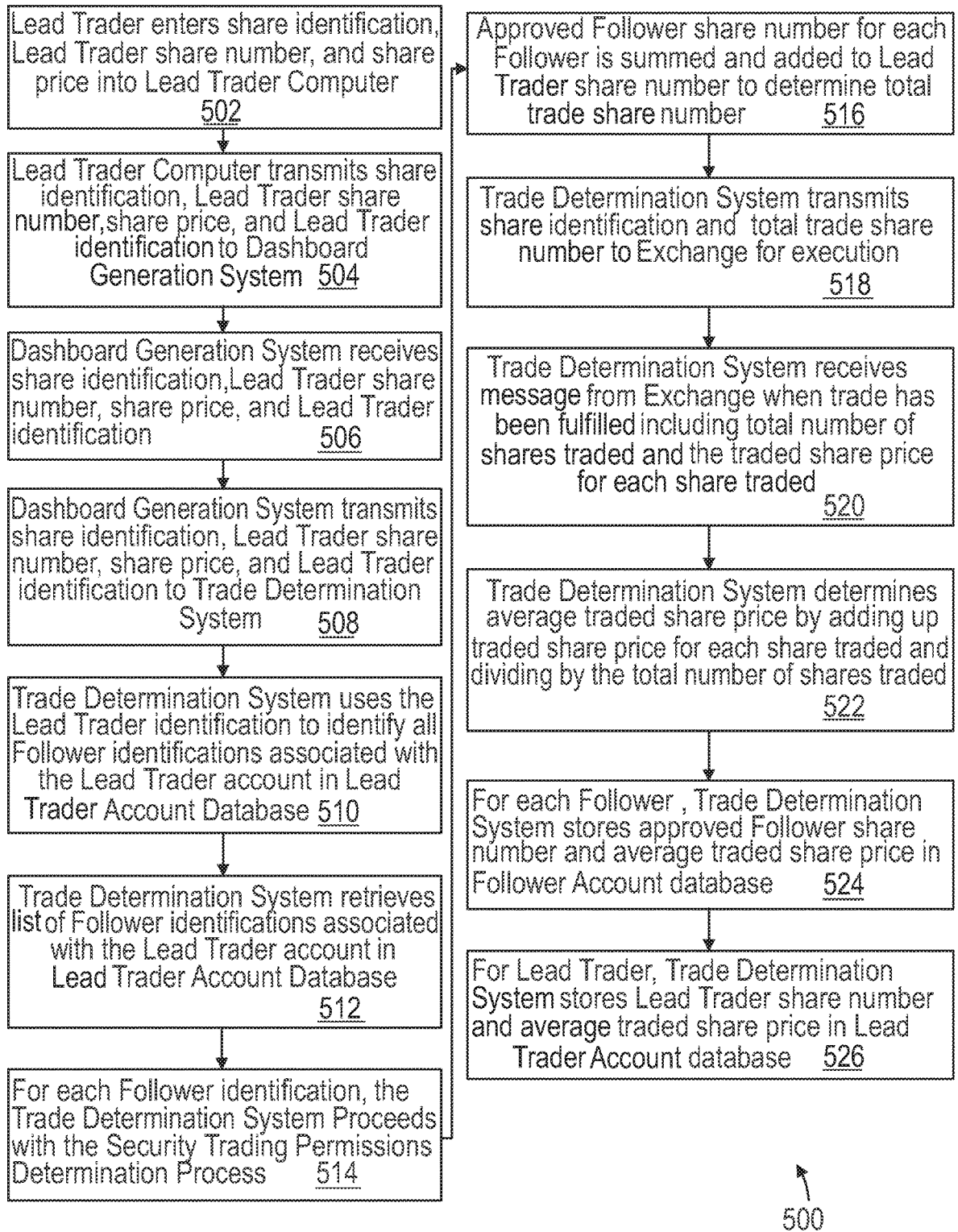
FIG. 5 is a flowchart of an Automated Trade Bundling Process.

FIG. 5 is a flowchart of a Real-Time Trade Bundling Process.

The process may begin at 502, where a Lead Trader enters a share identification, Lead Trader share number, and Lead Trader share price into a Lead Trader Computer. The share identification may identify the security the Lead Trader intends to trade.

At 504, the Lead Trader Computer transmits the share identification, Lead Trader share number, Lead Trader share price, and Lead Trader identification to the Dashboard Generation System.

At 506, the Dashboard Generation System receives the share identification, Lead Trader share number, Lead Trader share price, and Lead Trader identification from the Lead Trader Computer.

At 508, the Dashboard Generation System transmits the share identification, Lead Trader share number, Lead Trader share price, and Lead Trader identification to the Trade Determination System.

At 510, the Trade Determination System uses the Lead Trader identification to identify all Follower identifications associated with the Lead Trader account in the Lead Trader Account Database.

At 512, the Trade Determination System retrieves the list of Follower identifications associated with the Lead Trader account in the Lead Trader Account Database using the Lead Trader identification.

At 514, for each Follower identification on the list retrieved by the Trade Determination System at 512, the Trade Determination System proceeds with the Security Trading Permissions Determination Process (described below and with reference to FIG. 6).

At 516, the Trade Determination System sums the approved Follower share number for each Follower on the list retrieved by the Trade Determination System at 512 along with the Lead Trader share number to determine the total trade share number.

At 518, the Trade Determination System transmits the share identification and total trade share number to the Exchange for execution. After the trade has been executed at the Exchange, the Exchange may transmit an electronic message to the Trade Determination System that may include the total number of shares traded and the traded share price for each share traded.

At 520, the Trade Determination System receives the electronic message from the Exchange including the total number of shares and traded share price for each share traded.

As described above, because not all of the shares may be traded at the same time, and they may have been traded on the Exchange at different prices, at 522, the Trade Determination System determines the average traded share price by adding up the traded share price for each share and then dividing by the total number of shares traded.

At 524, for each Follower, the Trade Determination System stores the approved Follower share number and average traded share price in the Follower Account Database. In one or more embodiments, the Trade Determination System may use each Follower identification to access each Follower account in the Follower Account Database and then store the approved Follower share number and average traded share price for each Follower in the Follower Account Database.

At 526, for the Lead Trader, the Trade Determination System stores the Lead Trader share number and average traded share price in the Lead Trader Account Database. In one or more embodiments, the Trade Determination System may use the Lead Trader identification to access the Lead Trader account in the Lead Trader Account Database and then store the Lead Trader share number and average traded share price for the Lead Trader in the Lead Trader Account Database.

Figure 6:
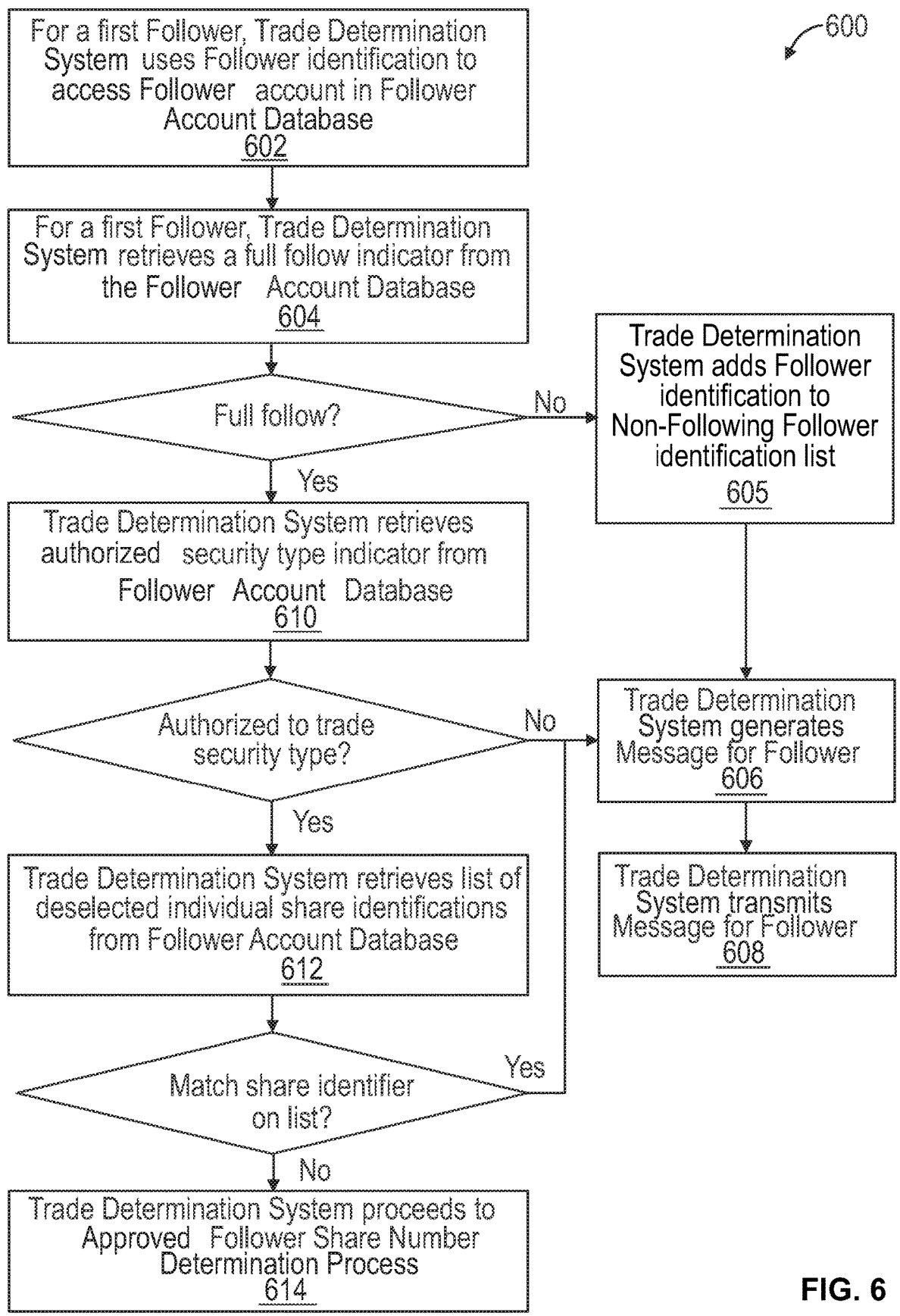
FIG. 6 is a flowchart of a Security Trading Permissions Determination Process.

FIG. 6 is a flowchart of a Security Trading Permissions Determination Process.

The Security Trading Permissions Determination Process may begin at 602 where, for a first Follower, the Trade Determination System accesses the Follower account in the Follower Account Database using the Follower identification.

At 604, for the first Follower, the Trade Determination System retrieves a full follow indicator associated with the Follower account from the Follower Account Database. The Trade Determination System then determines if the full follow indicator indicates whether the Follower is fully following the Lead Trader.

If the full follow indicator indicates that the Follower is not fully following the Lead Trader, then at 605 the Trade Determination System adds the Follower identification to a list of Non-Following Follower identifications.

After the Trade Determination System has added the Follower identification to the list of Non-Following Follower identifications, then at 606, the Trade Determination System generates an electronic message notifying the Follower that the Lead Trader is making a trade and that the Follower is not following that trade.

At 608, the Trade Determination System transmits the electronic message generated at 606 to the Follower. In one or more embodiments, the electronic message may be transmitted to the Follower Computer.

If the full follow indicator indicates that the Follower is fully following the Lead Trader, at 610, the Trade Determination System retrieves the authorized security type indicator associated with the Follower account in the Follower Account Database. The Trade Determination System then determines if the authorized security type indicator indicates whether the Follower is authorized to participate in a trade involving the security type associated with the share identification.

If the authorized security type indicator indicates that the Follower is not authorized to participate in a trade involving the security type associated with the share identification, then at 606, the Trade Determination System generates an electronic message notifying the Follower that the Lead Trader is making a trade and that the Follower is not following that trade.

At 608, the Trade Determination System transmits the electronic message generated at 606 to the Follower. In one or more embodiments, the electronic message may be transmitted to the Follower Computer.

If the authorized security type indicator that the Follower is authorized to participate in a trade involving the security type associated with the share identification, then at 612 the Trade Determination System retrieves a list of deselected individual share identifications associated with the Follower account in the Follower Account Database. The Trade Determination System then determines if the share identification matches any of the share identifications included in the list of deselected individual share identifications.

If the share identification matches any of the share identifications included in the list of deselected individual share identifications, then at 606, the Trade Determination System generates an electronic message notifying the Follower that the Lead Trader is making a trade and that the Follower is not following that trade.

At 608, the Trade Determination System transmits the electronic message generated at 606 to the Follower. In one or more embodiments, the electronic message may be transmitted to the Follower Computer.

If the share identification does not match any of the share identifications included in the list of deselected individual share identification, then at 614, the Trade Determination System proceeds to the Approved Follower Share Number Determination Process.

Figure 7:
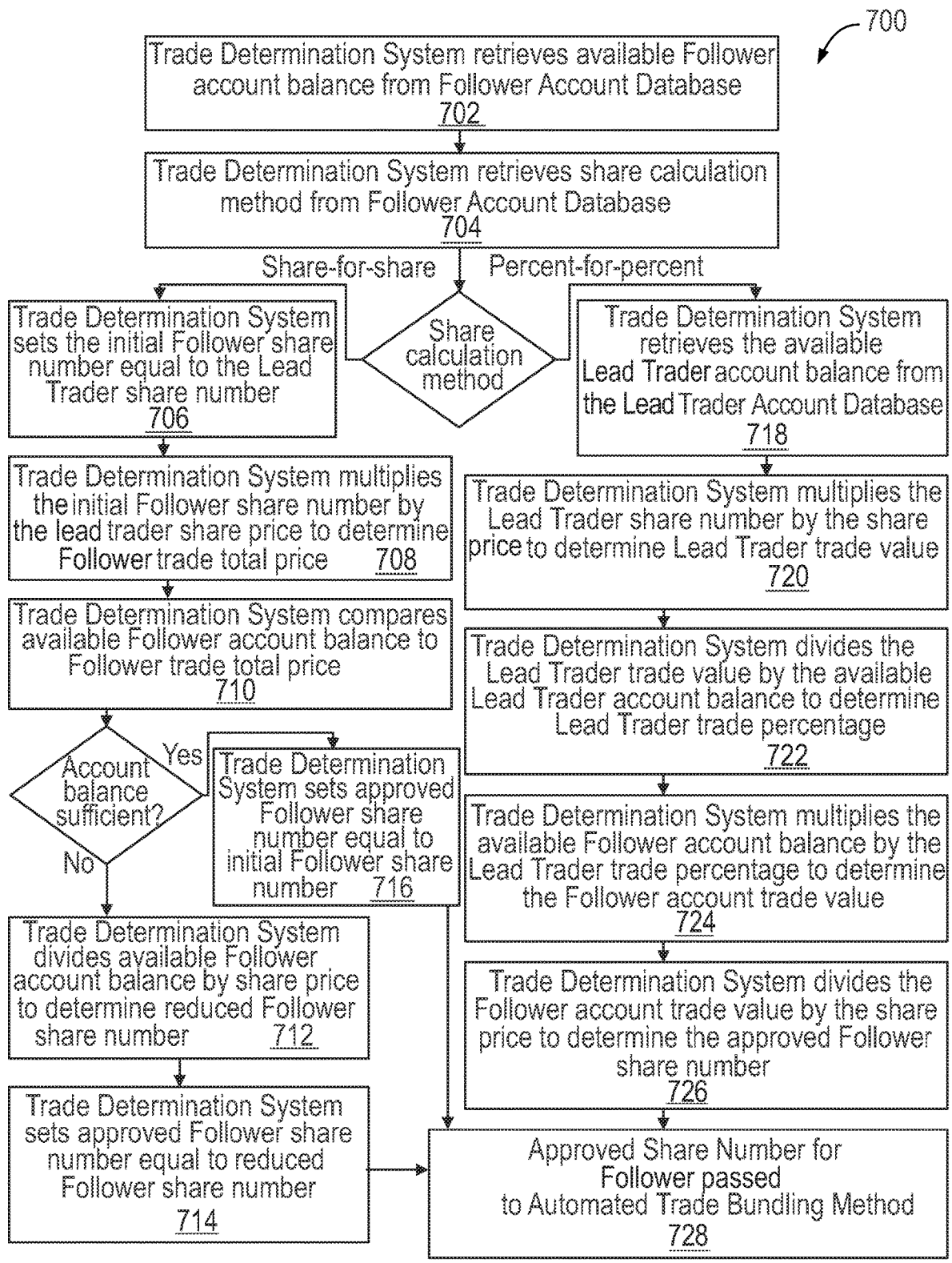
FIG. 7 is a flowchart of an Approved Follower Share Number Determination Process.

FIG. 7 is a flowchart of an Approved Follower Share Number Determination Process.

At 702, the Trade Determination System retrieves the available Follower account balance from the Follower Account database. In one or more embodiments, the Trade Determination System may use the Follower identification to access the Follower account in the Follower Account Database to retrieve the available Follower account balance.

At 704, the Trade Determination System retrieves the share calculation method indicator from the Follower Account Database. In one or more embodiments, the Trade Determination System may use the Follower identification to access the Follower account in the Follower Account Database to retrieve the share calculation method indicator. The Trade Determination System then determines whether the share calculation method indicator indicates share-for-share method or percent-for-percent method.

If the Trade Determination System determines that the share calculation method indicator indicates share-for-share, then at 706, the Trade Determination System sets the initial Follower share number equal to the Lead Trader share number.

Then at 708, the Trade Determination System multiplies the initial Follower share number by the Lead Trader share price to determine Follower trade total price.

At 710, the Trade Determination System compares the available Follower account balance to the Follower trade total price. The Trade Determination System then determines if the available Follower account balance is greater than or equal to the Follower total trade price, or if the available Follower account balance is less than the Follower trade total price.

If the Trade Determination System determines that the available Follower account balance is less than the Follower trade total price, then the available Follower account balance is not sufficient. At 712, the Trade Determination System divides the available Follower account balance by the Lead Trader share price to determine the reduced Follower share number.

Then at 714, the Trade Determination System sets the approved Follower share number equal to the reduced Follower share number.

Then, at 728, the approved Follower share number is passed to the Real-Time Trade Bundling Method (described above and with reference to FIG. 5).

If the Trade Determination System determines that the share calculation method indicator indicates share-for-share, then at 718, the Trade Determination System retrieves the available Lead Trader account balance from the Lead Trader Account Database. In one or more embodiments, the Trade Determination System may use the Lead Trader identification access the Lead Trader account in the Lead Trader Account Database and retrieve the available Lead Trader account balance.

At 720, the Trade Determination System multiplies the Lead Trader share number by the Lead Trader share price to determine the Lead Trader trade value.

At 722, the Trade Determination System divides the Lead Trader trade value by the available Lead Trader account balance to determine the Lead Trader trade percentage.

At 724, the Trade Determination System multiplies the available Follower account balance for the Follower by the Lead Trader trade percentage to determine the Follower account trade value.

At 726, the Trade Determination System divides the Follower account trade value by the Lead Trader share price to determine the approved Follower share number.

Then at 728, the approved Follower share number is passed to the Real-Time Trade Bundling Process (described above and with reference to FIG. 5).

Figure 8:
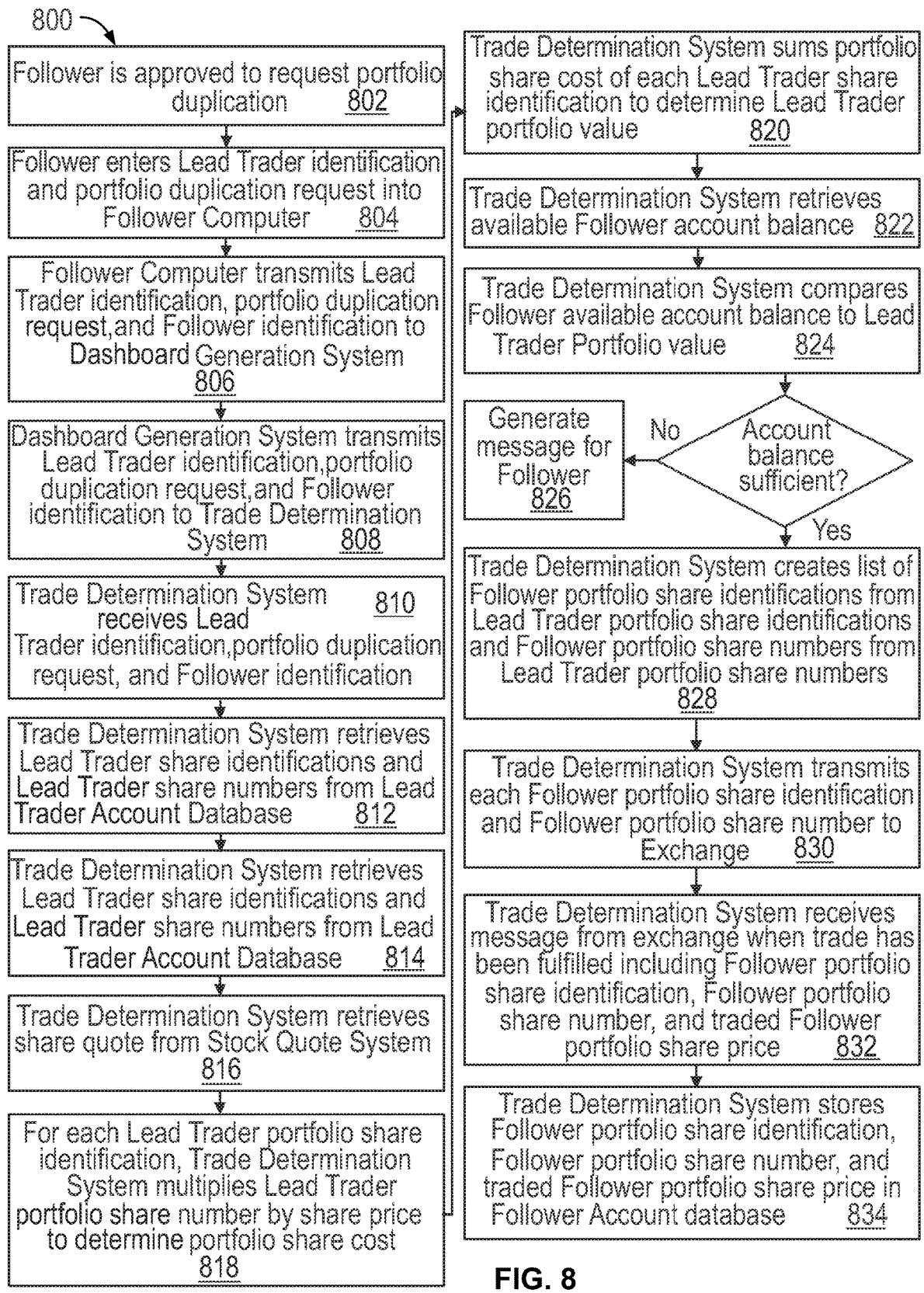
FIG. 8 is a flowchart of a Portfolio Duplication Process.

In one or more embodiments, a Follower may choose to duplicate the portfolio of a Lead Trader. FIG. 8 is a flowchart of a Portfolio Duplication Process.

At 802, a Follower is approved to request portfolio duplication.

At 804, the Follower enters a Lead Trader identification and portfolio duplication request into the Follower Computer.

At 806, the Follower Computer transmits the Lead Trader identification, portfolio duplication request, and Follower identification to the Dashboard Generation System.

At 808, the Dashboard Generation System transmits the Lead Trader identification, portfolio duplication request, and Follower identification to the Trade Determination System.

At 810, the Trade Determination System receives the Lead Trader identification, portfolio duplication request, and Follower identification.

At 812, the Trade Determination System accesses the Lead Trader account in the Lead Trader Account Database using the Lead Trader identification.

At 814, the Trade Determination System retrieves the Lead Trader portfolio share identifications and Lead Trader portfolio share numbers for the Lead Trader's portfolio from the Lead Trader Account Database.

At 816, the Trade Determination System retrieves a portfolio share price from the Stock Quote System for each Lead Trader portfolio share identification. In an alternative embodiment, the Trade Determination System may transmit a request to the Dashboard Generation System to retrieve the portfolio share price from the Stock Quote System. The request may include the Lead Trader portfolio share identifications. The Dashboard Generation System may receive the request including the Lead Trader portfolio share identifications. The Dashboard Generation System may then retrieve the portfolio share price for each Lead Trader portfolio share identification from the Stock Quote System using the Lead Trader portfolio share identifications. The Dashboard Generation System may then transmit the Lead Trader portfolio share identifications and portfolio share prices to the Trade Determination System.

At 818, for each Lead Trader portfolio share identification, the Trade Determination System multiplies the Lead Trader portfolio share number by the portfolio share price to determine the portfolio share cost.

At 820, the Trade Determination System sums the portfolio share cost of each Lead Trader portfolio share identification to determine the Lead Trader portfolio value.

At 822, the Trade Determination System retrieves the available Follower account balance. The Trade Determination System may retrieve the available Follower account balance from the Follower Account Database using the Follower identification.

At 824, the Trade Determination System compares the available Follower account balance to Lead Trader portfolio value.

If the available Follower account balance is less than the Lead Trader portfolio value, then the available Follower account balance is not sufficient for this trade, and at 826 the Trade Determination System generates an electronic message for the Follower. The electronic message may be sent to the Follower Computer.

If the available Follower account balance is greater than or equal to the Lead Trader portfolio value, then the available Follower account balance is sufficient for this trade, and at 828, the Trade Determination System may create a list of Follower portfolio share identifications including the Lead Trader portfolio share identifications. The list may further include a Follower portfolio share number for each Follower portfolio share identification equal to the Lead Trader portfolio share number for the corresponding Lead Trader portfolio share identification.

At 830, the Trade Determination System may then transmit each Follower portfolio share identification and Follower portfolio share number to the Exchange for trade execution. After the trade has been executed on the Exchange, the Exchange may transmit an electronic message to the Trade Determination System including each Follower portfolio share identification traded, the Follower portfolio share number for each Follower portfolio share identification, and traded Follower portfolio share price for each Follower portfolio share identification.

Then at 832, the Trade Determination System receives the electronic message from the Exchange including each Follower portfolio share identification traded, the Follower portfolio share number for each Follower portfolio share identification, and traded Follower portfolio share price for each Follower portfolio share identification.

At 834, after the Trade Determination System has received the electronic message from the Exchange, the Trade Determination System may access the Follower account in the Follower Account Database using the Follower identification and may store each Follower portfolio share identification, the Follower portfolio share number for each Follower portfolio share identification, and traded Follower portfolio share price for each Follower portfolio share identification.

Figure 9:
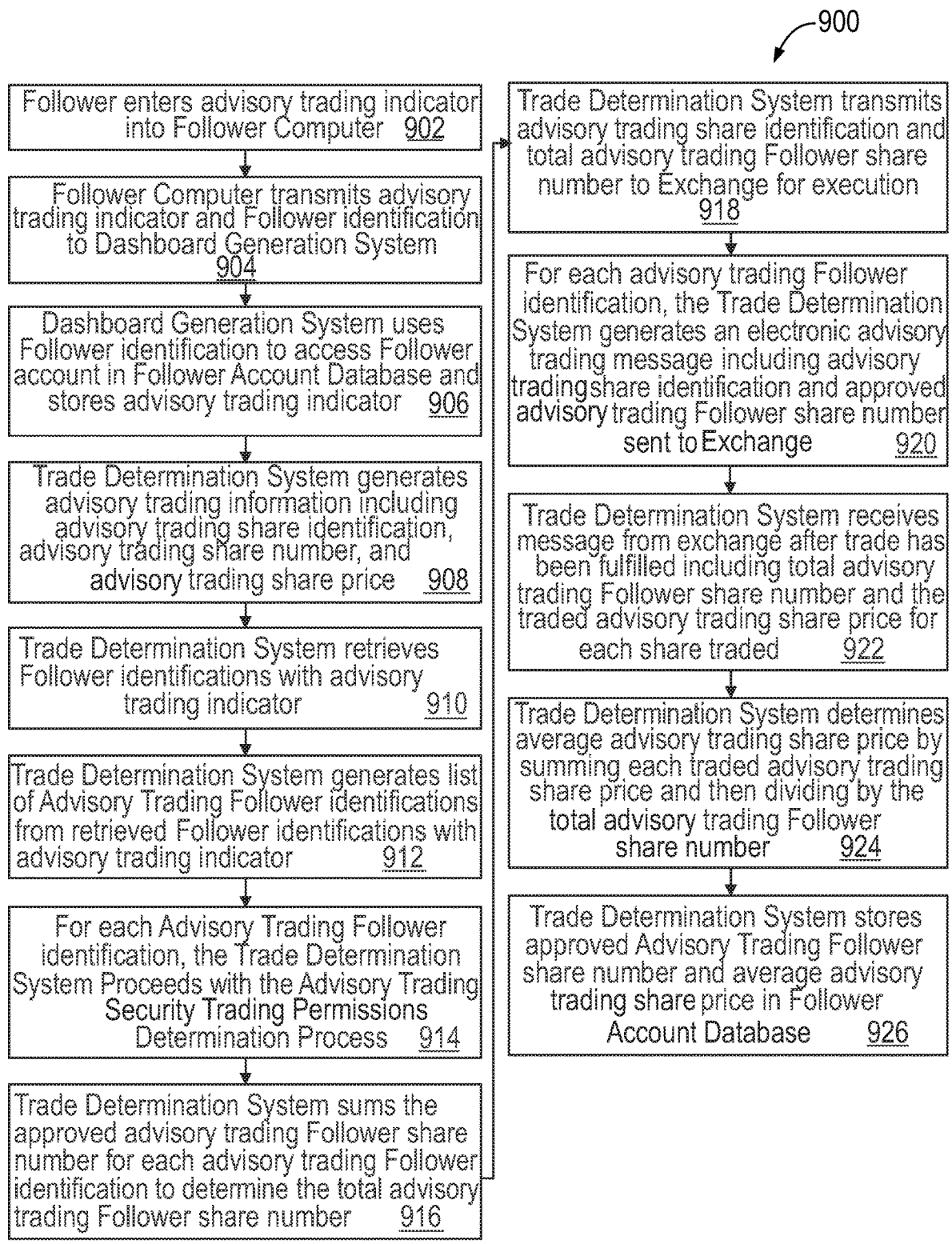
FIG. 9 is a flowchart of an Advisory Trading Process.

FIG. 9 is a flowchart of an Advisory Trading Process.

At 902, the Follower enters an advisory trading indicator into the Follower Computer.

At 904, the Follower Computer transmits the advisory trading indicator and Follower identification to the Dashboard Generation System. The Dashboard Generation System may receive the advisory trading indicator and Follower identification from the Follower Computer.

At 906, the Dashboard Generation System accesses the Follower account in the Follower Account Database using the Follower identification and stores the advisory trading indicator.

Then, at 908, the Trade Determination System generates advisory trading information including advisory trading share identification, advisory trading share number, and advisory trading share price.

At 910, the Trade Determination System accesses the Follower Account Database and retrieves Follower identifications with an advisory trading indicator.

Then at 912, the Trade Determination System generates a list of advisory trading Follower identifications from Follower identifications retrieved at 910.

At 914, for each advisory trading Follower identification, the Trade Determination System proceeds with the Advisory Trading Security Trading Permissions Determination Process (described below and with reference to FIG. 10).

At 916, the Trade Determination System sums the approved advisory trading Follower share number for each advisory trading Follower identification to determine the total advisory trading Follower share number.

At 918, the Trade Determination System transmits the advisory trading share identification and total advisory trading Follower share number to the Exchange for execution.

At 920, the Trade Determination System generates an electronic advisory trading message for each advisory trading Follower identification including the advisory trading share identification and the approved advisory trading Follower share number sent to the Exchange. After the trade is executed on the Exchange, the Exchange transmits an electronic message to the Trade Determination System including the total number of advisory trading shares traded and the traded advisory trading share price for each share traded.

After the trade has been executed at the Exchange, at 922, the Trade Determination System receives the electronic message from the Exchange including the total advisory trading Follower share number and the traded advisory trading share price for each share traded. In an alternative embodiment, the Trade Determination System may compare the total number of advisory trading shares traded to the total advisory trading Follower share number to determine if they match.

Then at 924, the Trade Determination System determines the average advisory trading share price by summing each traded advisory trading share price and then dividing by the total advisory trading Follower share number.

At 926, for each advisory trading Follower identification, the Trade Determination System stores the approved advisory trading Follower share number and average advisory trading share price in the Follower Account Database.

Figure 10:
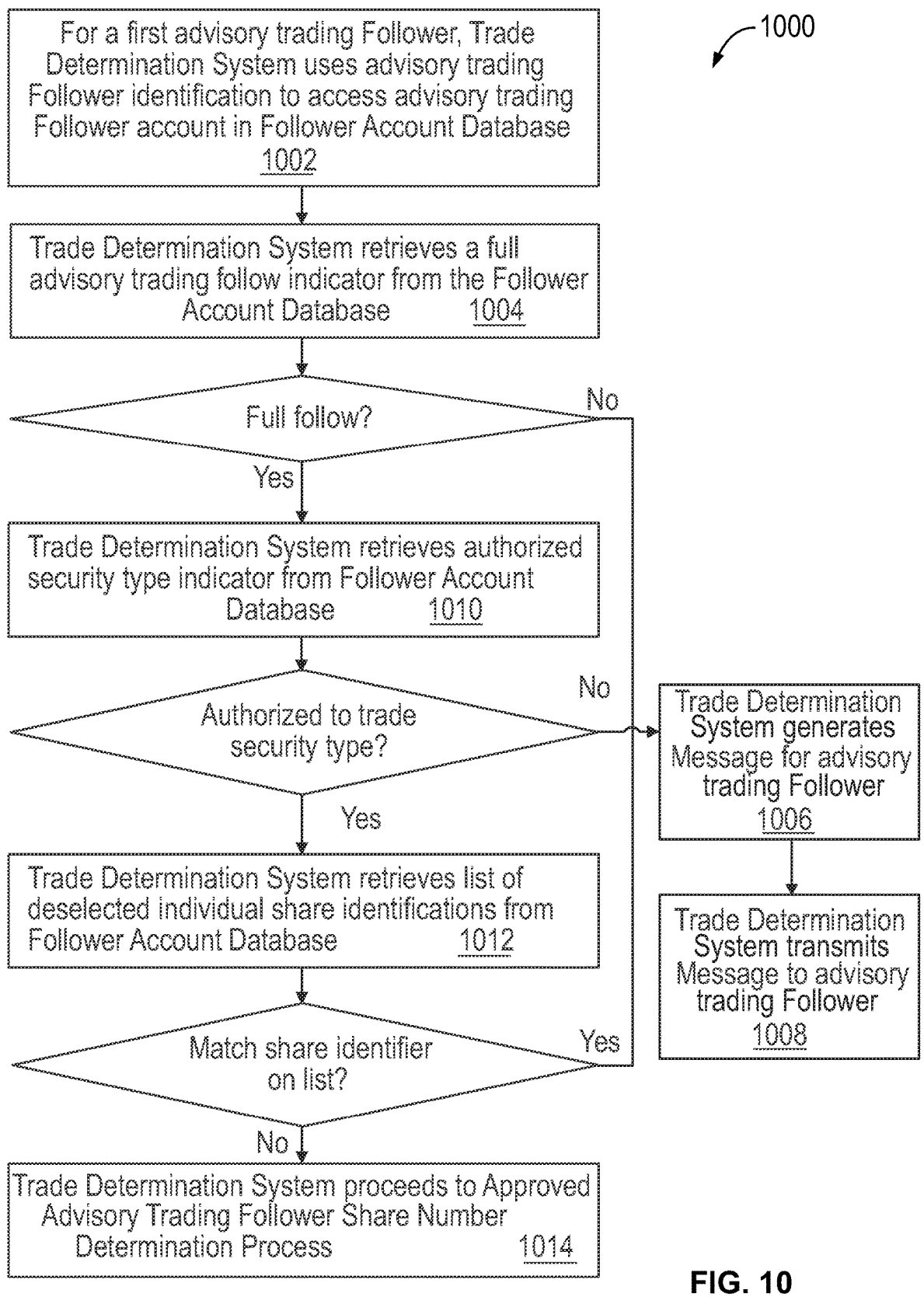
FIG. 10 is a flowchart of an Advisory Trading Security Trading Permissions Determination Process.

FIG. 10 is a flowchart of an Advisory Trading Security Trading Permissions Determination Process.

At 1002, for a first advisory trading Follower identification, the Trade Determination System accesses advisory trading Follower account in the Follower Account Database using the advisory trading Follower identification.

At 1004, the Trade Determination System retrieves a full advisory trading follow indicator from the Follower Account Database.

If the full advisory trading follow indicator indicates that the advisory trading Follower is not fully following advisory trading, then at 1006 the Trade Determination System generates an electronic message for the advisory trading Follower.

Then at 1008, the Trade Determination System transmits the electronic message to the advisory trading Follower. In an alternative embodiment the electronic message may be transmitted to the advisory trading Follower Computer.

If the full advisory trading follow indicator indicates that the advisory trading Follower is fully following advisory trading, then at 1010 the Trade Determination System retrieves the authorized security type indicator from the Follower Account Database associated with the Follower account.

If the authorized security type indicator indicates that the Follower is not authorized to participate in a trade involving the security type associated with the share identification, then at 1006 the Trade Determination System generates an electronic message for the advisory trading Follower.

Then at 1008, the Trade Determination System transmits the electronic message to the advisory trading Follower. In an alternative embodiment the electronic message may be transmitted to the advisory trading Follower Computer.

If the authorized security type indicator that the Follower is authorized to participate in a trade involving the security type associated with the share identification, then at 1012 the Trade Determination System retrieves a list of deselected individual share identifications associated with the Follower account from the Follower Account Database.

If the share identification matches any of the share identifications included in the list of deselected individual share identifications, then at 1006, the Trade Determination System generates an electronic message notifying the Follower that the Lead Trader is making a trade and that the Follower is not following that trade.

At 1008, the Trade Determination System transmits the electronic message generated at 1006 to the Follower. In one or more embodiments, the electronic message may be transmitted to the Follower Computer.

If the share identification does not match any of the share identifications included in the list of deselected individual share identification, then at 1014, the Trade Determination System proceeds to the Approved Follower Share Number Determination Process.

Figure 11:
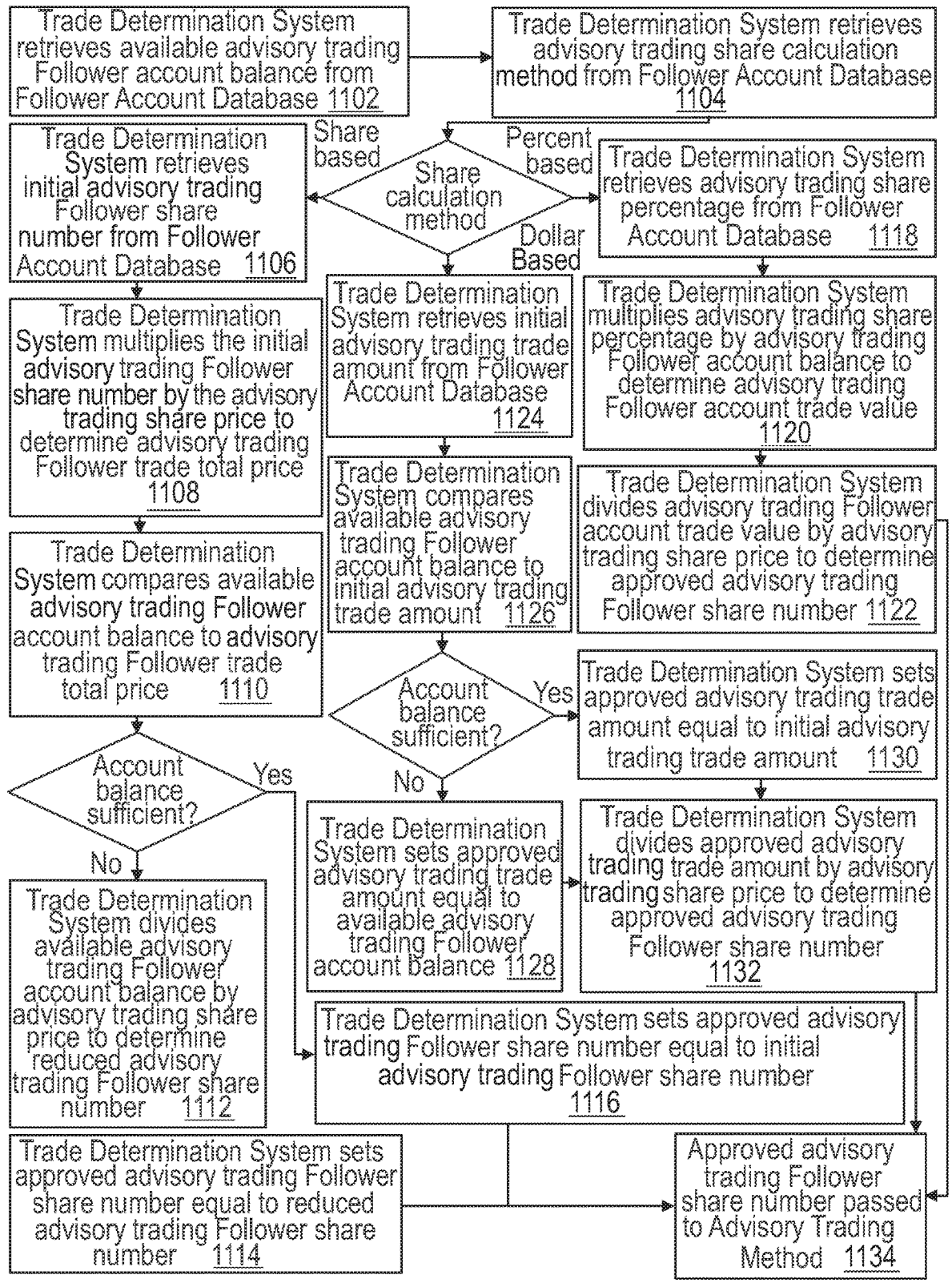
FIG. 11 is a flowchart of an Approved Advisory Trading Follower Share Number Determination Process.

FIG. 11 is a flowchart of an Approved Advisory Trading Follower Share Number Determination Process At 1102, the Trade Determination System retrieves the available advisory trading Follower account balance from the Follower Account Database.

At 1104, the Trade Determination System retrieves the advisory trading share calculation method from the Follower Account Database.

If the advisory trading share calculation method is share based, then at 1106 the Trade Determination System retrieves the initial advisory trading Follower share number from the Follower Account Database.

At 1108, the Trade Determination System multiplies the initial advisory trading Follower share number by the advisory trading share price to determine the advisory trading Follower trade total price.

At 1110, the Trade Determination System compares the available advisory trading Follower account balance to the advisory trading Follower trade total price.

If the available advisory trading Follower account balance is less than the advisory trading Follower trade total price, then the available advisory trading Follower account balance is insufficient for this trade, and at 1112, the Trade Determination System divides the available advisory trading Follower account balance by the advisory trading share price to determine the reduced advisory trading Follower share number.

At 1114, the Trade Determination System sets the approved advisory trading Follower share number equal to the reduced advisory trading Follower share number.

Then, at 1134, the approved advisory trading Follower share number is passed to the Advisory Trading Method.

If the advisory trading share calculation method is percent based, then at 1118, the Trade Determination System retrieves the advisory trading share percentage from the Follower Account Database.

At 1120, the Trade Determination System multiplies the available advisory trading Follower account balance by the advisory trading share percentage to determine the advisory trading Follower account trade value.

At 1122, the Trade Determination System divides the advisory trading Follower account trade value by the advisory trading share price to determine the approved advisory trading Follower share number.

Then, at 1134, the approved advisory trading Follower share number is passed to the Advisory Trading Method.

If the share calculation method is dollar based, then at 1124 Trade Determination System retrieves the initial advisory trading trade amount from the Follower Account Database.

At 1126, the Trade Determination System compares the available advisory trading Follower account balance to the initial advisory trading trade amount.

If the available advisory trading Follower account balance is less than the initial advisory trading trade amount, then at 1128, then the available advisory trading Follower account balance is not sufficient for this trade, and the Trade Determination System sets the approved advisory trading trade amount equal to the available advisory trading Follower account balance.

If the available advisory trading Follower account balance is greater than or equal to the initial advisory trading share amount, then the available advisory trading Follower account balance is sufficient for this trade, and at 1130, the Trade Determination System sets the approved advisory trading trade amount equal to the initial advisory trading trade amount.

At 1132, the Trade Determination System divides the approved advisory trading trade amount by the advisory trading share price to determine the approved advisory trading Follower share number.

Then at 1134 the approved advisory trading Follower share number is passed to the Advisory Trading Method.

Figure 12:
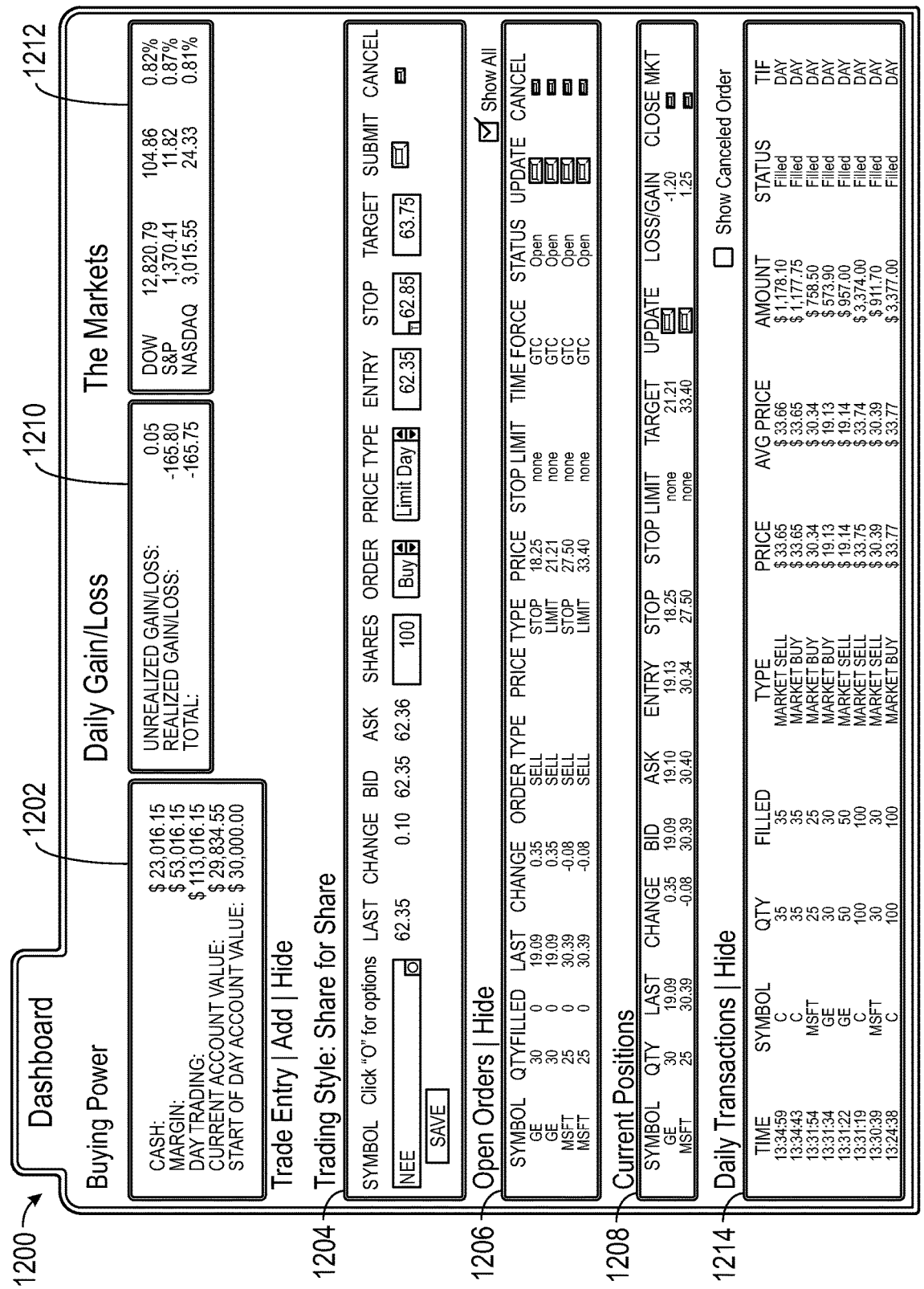
FIG. 12 is an embodiment of a Lead Trader Dashboard.

FIG. 12 is an embodiment of a Lead Trader Dashboard 1200. The Lead Trader Dashboard 1200 may include a Buying Power section 1202, a Trade Entry section 1204, an Open Orders section 1206, a Current Positions section 1208, a Daily Gain/Loss section 1210, a Markets section 1212, and a Daily Transactions section 1214.

Buying Power section 1202 includes Cash, Margin, Day Trading, Current Account Value, and Start of Day Account Value information.

Trade Entry Section 1204 includes Share Symbol, Last Price, Price Change, Bid, Ask, Share Number, Order, Price Type, Entry, Stop, Target, Submit and Cancel information. The Trade Entry Section 1204 may be used, for example, by a Lead Trader to enter a trade that may then be passed to the Dashboard Generation System 108 and trade determination system 110 as described above.

Open Orders section 1206 includes Share Symbol, Share Quantity, Last Price, Price Change, Bid, Ask, Entry, Stop, Stop Limit, Target, Update, Loss/Gain, and Close Market information.

Current Positions section 1208 includes Tim, Share Symbol, Share Quantity, Share Quantity Filled, Type, Price, Average Price, Amount, Status, and TIF information.

Daily Gain/Loss section 1210 includes Unrealized Gain/Loss, Realized Gain/Loss, and Total Gain/Loss information.

Markets section 1212 includes market information such as the Dow Jones, S&P 500, and NASDAQ market information.

Figure 13:
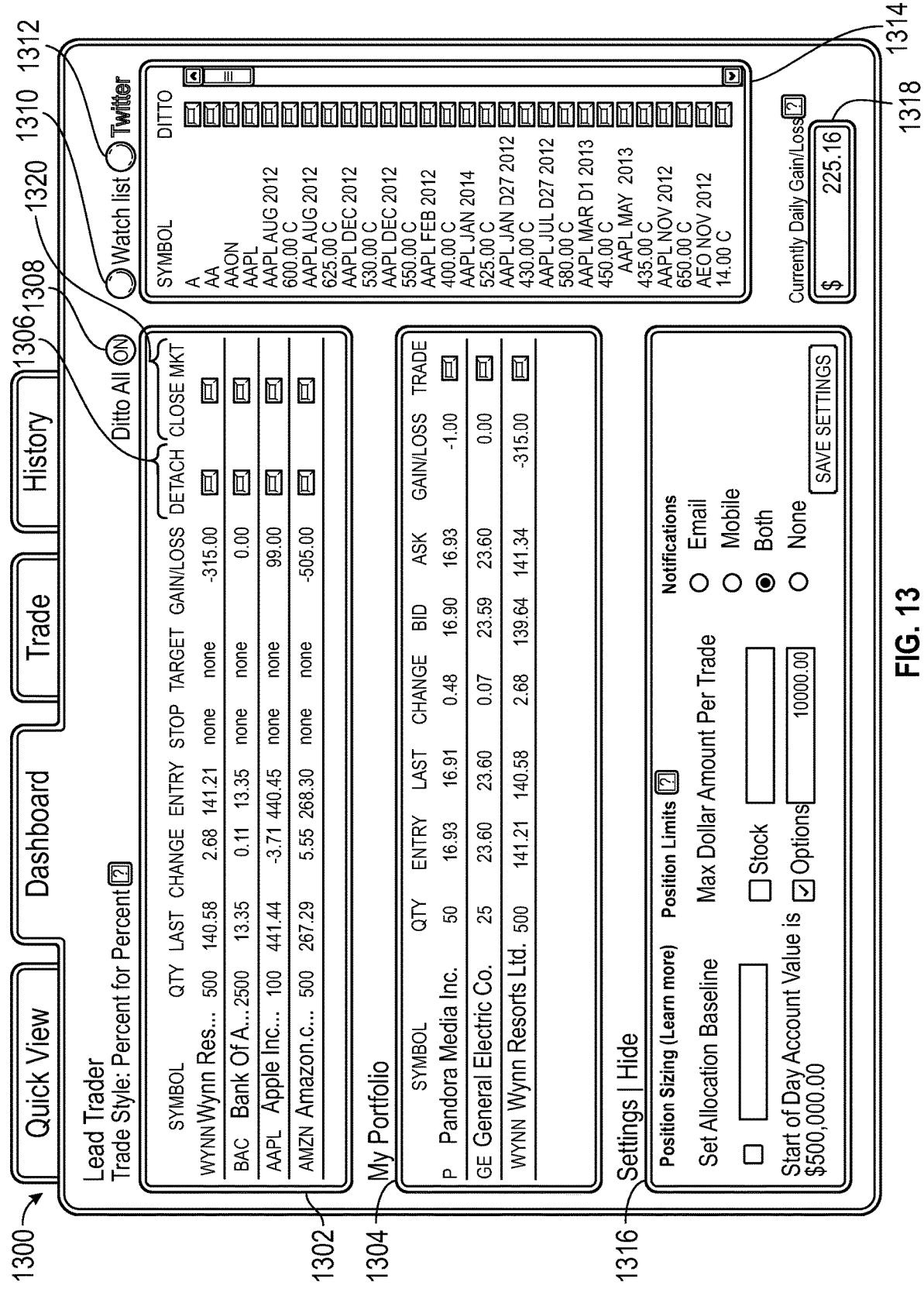
FIG. 13 is an embodiment of a Follower Dashboard.

FIG. 13 is an embodiment of a Follower Dashboard 1300. The Follower Dashboard 1300 includes a Lead Trader section 1302, a My Portfolio section 1304, a Ditto All button 1308, a Message section 1314, a Settings section 1316, and a Current Daily Gain/Loss section 1318.

The Lead Trader section 1302 includes Trade Style, Share Symbol, Share Quantity, Last Price, Price Change, Entry, Stop, and Target information, as well as a Detach button 1306 and a Close Market button 1320 for each security listed in the Lead Trader section 1302.

When the Detach button 1306 is pressed, the position is detached from automatic trading/full following. For example, although a certain position may have been opened (such as when shares are purchased), the follower may no longer want the position to be exposed to automatic trading. For example, although 500 shares of WYNN may have been purchased due to the follower following a certain Lead Trader, if the 500 shares of WYNN are detached, the 500 shares of WYNN will not be sold even if the lead trader sells the shares.

When the Close Market button 1320 is pressed, the associated position is sold.

The My Portfolio section 1304 includes Share Symbol, Share Quantity, Entry, Last Price, Price Change, Bid, Ask, and Gain/Loss information as well as a Trade button. When the Trade button is pressed, a trade window appears to allow the follower to initiate a trade as shown below.

The Ditto All button 1308 may allow the Follower to select full following for a selected Lead Trader.

The Settings section 1316 includes Portfolio Sizing, Position Limits, and Notifications. Portfolio Sizing includes Set Allocation Baseline information and Start of Day Account value information.

Position Limits includes Max Dollar Amount Per Trade for Stocks and Options. This allows the follower to set the maximum dollar amount for an acceptable automatic trade. Trades at a higher dollar amount may not be automatically performed.

Notifications includes selection of Email, Mobile, Both, or None. Notifications may be sent to the follower, for example, when a trade is automatically performed and/or when a trade is not automatically performed.

Figure 14:
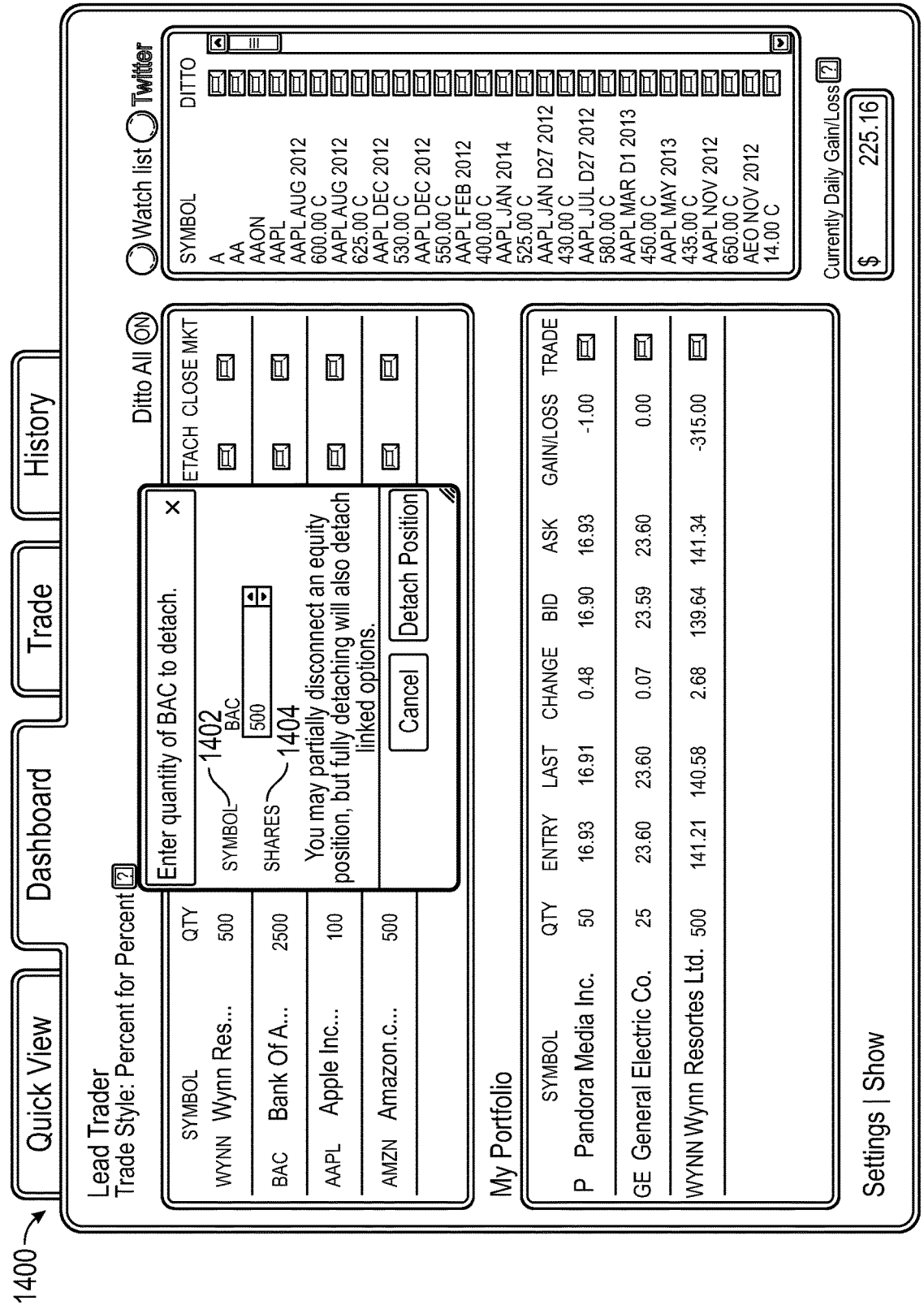
FIG. 14 is an embodiment of a Detachment Pop-Up Window.

FIG. 14 is an embodiment of a Detachment Pop-Up Window 1400. The Detachment Pop-Up Window includes a Share Symbol section 1402 and a Share Number section 1404. The Detachment Pop-Up Window 1400 may display on the Follower Dashboard after a Follower clicks the Detach button.

Figure 15:
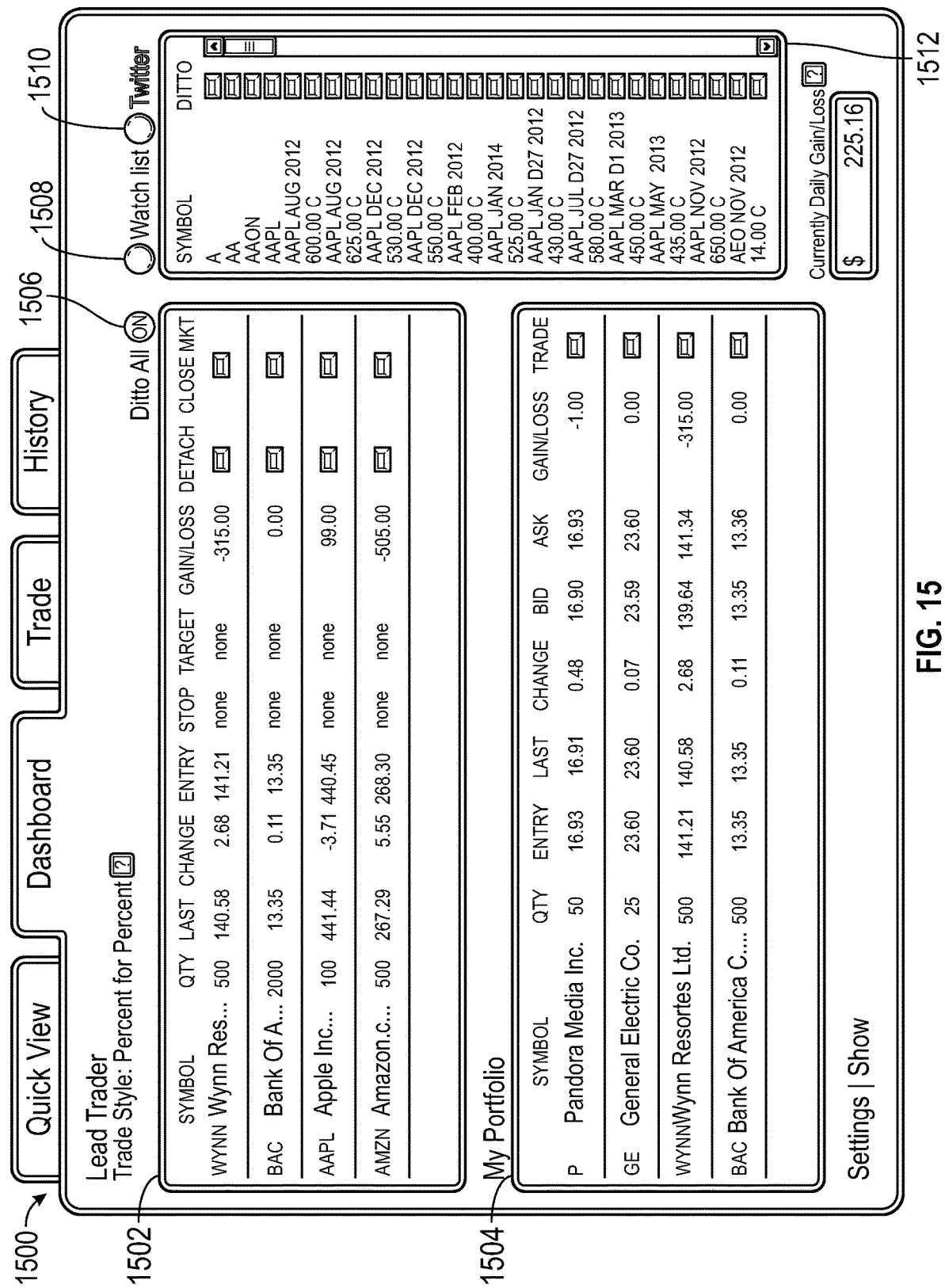
FIG. 15 is an alternative embodiment of a Follower Dashboard.

FIG. 15 is an alternative embodiment of a Follower Dashboard 1500. Follower Dashboard 1500 includes a Lead Trader section 1502, a My Portfolio section 1504, a Ditto All button 1506, and a Message Section 1512. The Follower Dashboard 1500 is generally similar to the Follower Dashboard 1300 of FIG. 13, but does not show the settings.

The Lead Trader section 1502 includes a Share Symbol, Share Quantity, Last Price, Price Change, Entry, Stop, Target, and Gain/Loss information as well as a Detach button and a Close Market button.

The My Portfolio section 1504 includes a Share Symbol, Share Quantity, Entry, Last Price, Price Change, Bid, Ask, and Gain/Loss information as well as a Trade button.

Figure 16:
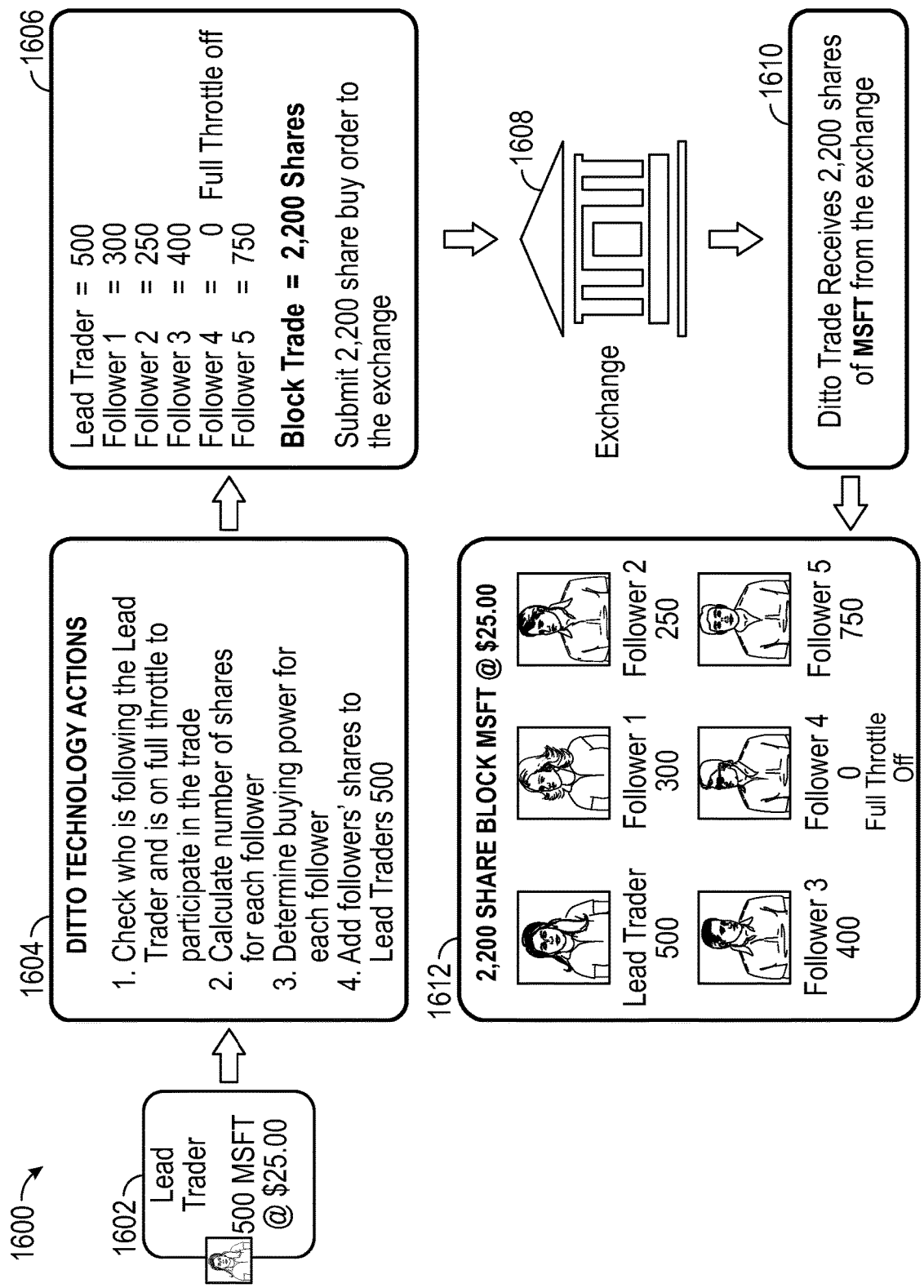
FIG. 16 is a flowchart for a method for automated trade bundling.

FIG. 16 is a flow diagram for a method for automated trade bundling 1600.

At 1602, a Lead Trader enters a share identification and a Lead Trader share number.

At 1604, the System first checks who is following the Lead Trader and is on full throttle to participate in the trade, then calculates the number of shares for each Follower, then determines the buying power for each Follower, and then adds the Follower's shares to the Lead Trader share number.

At 1606, the System then determines the total number of shares in the block trade by adding Lead Trader share number to the number of shares for each follower.

At 1608, the System then submits the block trade to an Exchange for execution.

At 1610, the System receives a message from the Exchange including the total number of shares in the block trade and the share identification and the trade price for each share or each block of shares.

At 1612, the System then allocates to the Lead Trader and to each Follower the number of shares from the total number of in the block trade and the average share price for the block trade.

Figure 17:
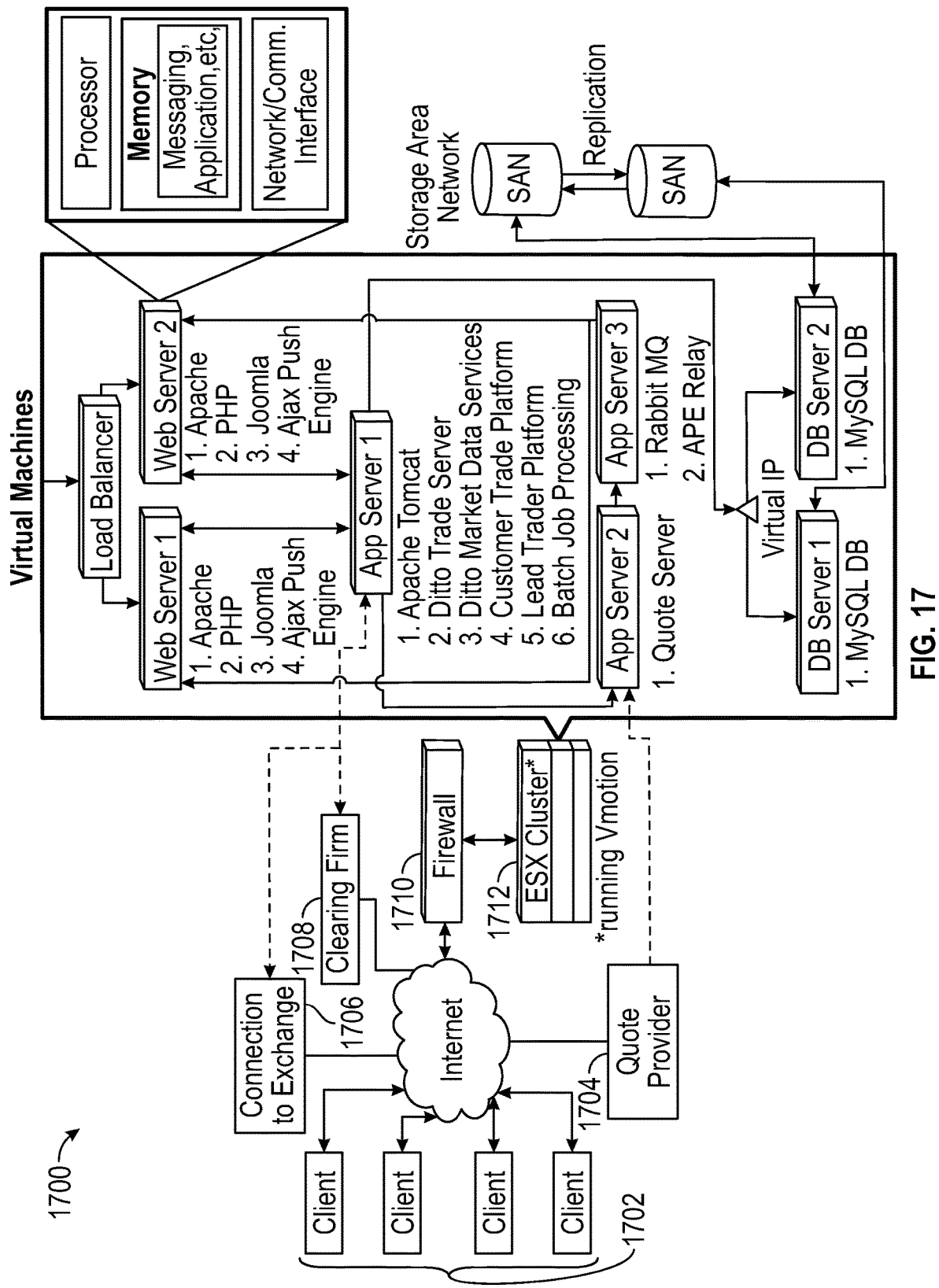
FIG. 17 is a system diagram of an embodiment of a System for Automated Trade Bundling and Detachment.

FIG. 17 is a system diagram of an embodiment of a System for Automated Trade Bundling and Detachment 1700. The System for Automated Trade Bundling and Detachment 1700 may include one or more client computers 1702, a quote provider 1704, a connection to an Exchange 1706, a clearing firm 1708, a firewall 1710, and a server cluster 1712.

The client computers 1702 may be in communication with the connection to an Exchange 1706. The clearing firm 1708 may be in communication with the connection to an Exchange 1706. The quote provider 1704 may be in communication with the connection to an Exchange 1706. The Connection to an Exchange 1706 may be in communication with the Firewall 1710. The Firewall may be in communication with the server cluster 1712.

The client computers 1702 may include any computing device with a network communication interface capable of communicating with, for example, the Connection to an Exchange 1706.

The quote provider 1704 may include any computing device with a network communication interface capable of communicating with, for example, the Connection to an Exchange 1706. In another embodiment, the quote provider 1704 may include a server with a network communication interface.

The clearing firm 1708 may include any computing device with a network communication interface capable of communicating with, for example, the Connection to an Exchange 1706. In another embodiment, the clearing firm 1708 may include a server with a network communication interface.

The server cluster 1712 may include one or more servers. In an embodiment where the server cluster 1712 includes more than one server, each server may include a network communication interface to allow the servers to be networked. In one or more embodiments, each server may be a web server, load balancer, application server, or database server. Each server may be configured to support Apache, PHP, Joomla, Ajax Push Engine, Apache Tomcat, Ditto Trade server, Ditto Market Data services, Customer Trade platform, Lead Trader platform, Batch Job processing, a quote server, Rabbit MQ, APE Relay, Virtula IP, or MySQL databases. In one or more embodiments, each server may include a processor, memory, and a network communications interface. The memory may store any of the applications that are run by the server cluster 1712.

The Connection to an Exchange 1706 may include the internet. In another embodiment the Connection to an Exchange 1706 may include local area network, wide area network, or other communications network.

FIG. 18 is an alternative embodiment of a Lead Trader Dashboard 1800. Lead Trader Dashboard 1800 includes a Buying Power section 1802, a Trade Entry section 1804, an Open Orders section 1806, a Current Positions section 1808, a Daily Transactions section 1810, a Daily Gain/Loss section 1812, and a Markets section 1814.

The Buying Power section 1802 includes Cash, Margin, Day Trading, Current Account Value, and Start of Day Account Value information.

The Trade Entry section 1804 includes Share Symbol, Last Price, Price Change, Bid, Ask, Share Number, Order, Price Type, Entry, Stop, and Target information as well as a Submit button and a Cancel button for each entry.

Open Orders section 1806 includes Share Symbol, Share Quantity, Filled Quantity, Last Price, Price Change, Order Type, Price Type, Price, Stop Limit, Tim Force, and Status information as well as an Update button and a Cancel button for each entry.

Current Positions section 1808 includes Share Symbol, Share Quantity, Last Price, Price Change, Bid, Ask, Entry, Stop, Stop Limit, Target, and Loss/Gain information as well as an Update button and Close Market button for each entry.

Daily Transactions section 1810 includes Tim, Share Symbol, Share Quantity, Type, Price, Average Price, Amount, Status, and TIF information for each entry.

Daily Gain/Loss section 1812 includes Unrealized Gain/Loss, Realized Gain/Loss, and Total Gain/Loss information.

Markets section 1814 includes Dow Jones, S&P 500, and NASDAQ information.

Figure 19:
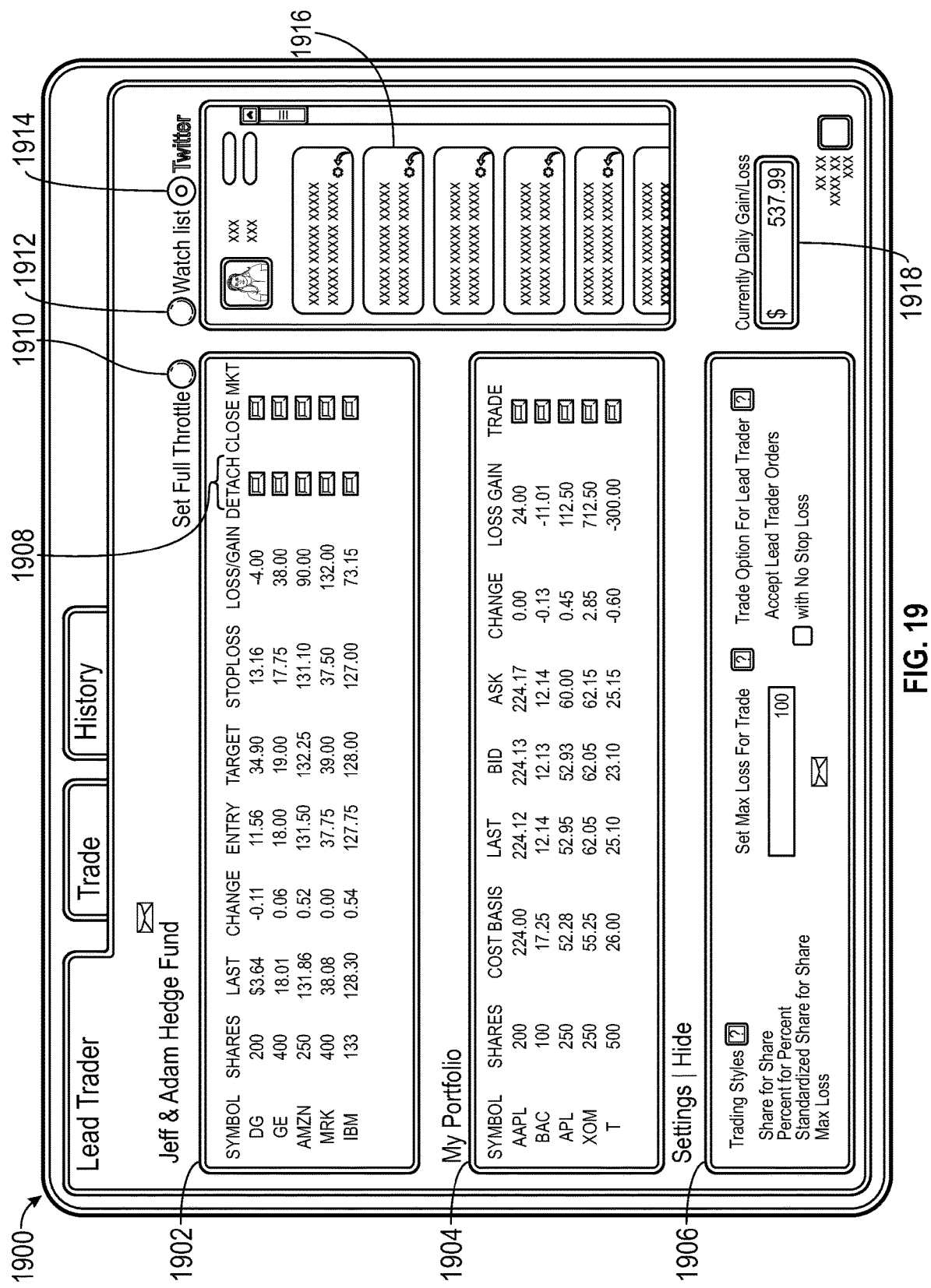
FIG. 19 is an alternative embodiment of a Follower Dashboard.

FIG. 19 is an alternative embodiment of a Follower Dashboard 1900.

Follower Dashboard 1900 includes a Lead Trader section 1902, a My Portfolio section 1904, a Settings section 1906, a Detach button 1908, a Set Full Throttle button 1910, a Message section 1916, and a Currently Daily Gain/Loss section 1918.

Lead Trader section 1902 includes Share Symbol, Share Number, Last Price, Price Change, Entry, Target, Stop/Loss, and Loss/Gain information as well as a Detach button 1908 and close market button for each entry.

My Portfolio section 1904 includes Share Symbol, Share Number, Cost Basis, Last, Bid, Ask, Change, and Loss/Gain information as well as a Trade button for each entry.

Settings section 1906 includes Trading Style, which may be share for share, percent for percent, standardized share for share, and max loss, Set Max Loss Per Trade, and Trade Options for Lead Trader which may include an Accept Lead Trader Orders with No Stop Loss button.

Set Full Throttle button 1910 allows the Follower to fully follow the Lead Trader.

Figure 21:
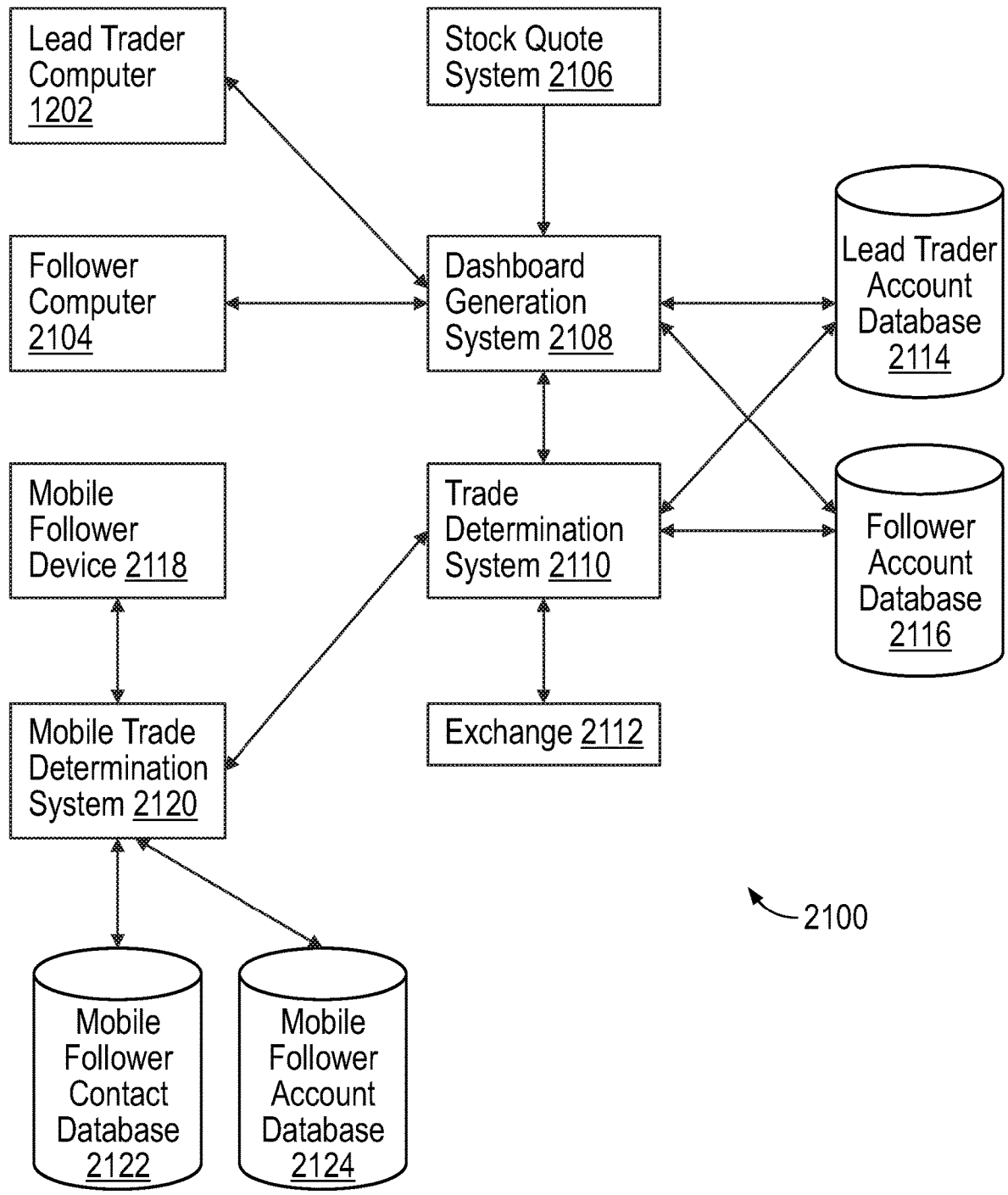
FIG. 21 is an embodiment of a system for automated trade bundling with a mobile trading platform.

FIG. 21 illustrates a system for automated trading with a mobile trading platform 2100. The system for automated trading with mobile trading platform 2100 may include a Lead Trader Computer 2102, a Follower Computer 2104, a Stock Quote System 2106, a Dashboard Generation System 2108, a Trade Determination System 2110, an Exchange 2112, a Lead Trader Account Database 2114, a Follower Account Database 2116, a Mobile Follower Device 2118, a Mobile Trade Determination System 2120, a Mobile Follower Contact Database 2122, and a Mobile Follower Account Database 2124.

The Lead Trader Computer 2102 may be in communication with the Dashboard Generation System 2108. The Follower Computer 2104 may be in communication with the Dashboard Generation System 2108. The Stock Quote System 2106 may be in communication with the Dashboard Generation System 2108. The Trade Determination System 2110 may be in communication with the Dashboard Generation System 2108. The Exchange 2112 may be in communication with the Trade Determination System 2110. The Lead Trader Account Database 2114 may be in communication with the Dashboard Generation System 2108. The Follower Account Database 2116 may be in communication with the Dashboard Generation System 2108. The Lead Trader Account Database 2114 may be in communication with the Trade Determination System 2110. The Follower Account Database 2116 may be in communication with the Trade Determination System 2110. The Follower Mobile Device 2118 may be in communication with the Mobile Trade Determination System 2120. The Mobile Trade Determination System 2120 may be in communication with the Trade Determination System 2110. The Mobile Trade Determination System 2120 may be in communication with the Mobile Follower Contact Database 2122. The Mobile Trade Determination System 2120 may be in communication with the Mobile Follower Account Database 2124.

In operation, after the Trade Determination System 2110 has received the message from an Exchange 2112 that a trade has been fulfilled, the Trade Determination System 2110 may retrieve the Non-Following Follower identification list that was previously generated (described above and with reference to FIG. 6).

For a first Non-Following Follower identification on the Non-Following Follower identification list, the Trade Determination System 2110 may retrieve a Mobile Following indicator from the Follower Account Database associated with the Non-Following Follower identification to determine if the Non-Following Follower is a Mobile Follower.

For each Mobile Follower identification on the Mobile Follower list, the Trade Determination System 2110 may retrieve the available Mobile Follower account balance for the Mobile Follower associated with the Mobile Follower identification in the Follower Account Database 2116.

The Trade Determination System 2110 may also retrieve the share calculation method associated with the Mobile Follower identification in the Follower Account Database 2116. The Trade Determination System 2110 may then determine if the share calculation method for each Mobile Follower is share-for-share or percent-for-percent.

If the share calculation method is share-for-share, the Trade Determination System 2110 may set an initial Mobile Follower share number equal to the Lead Trader share number.

The Trade Determination System 2110 may then multiply the initial Mobile Follower share number by the Lead Trader share price to determine the Mobile Follower trade total price.

The Trade Determination System 2110 may then compare the available Mobile Follower account balance to the Mobile Follower trade total price to determine if the Mobile Follower has a sufficient account balance to participate in this trade.

If the available Mobile Follower account balance is greater than or equal to the Mobile Follower trade total price, then the Trade Determination System 2110 sets the approved Mobile Follower share number equal to the initial Mobile Follower share number.

If the available Mobile Follower account balance is less than the Mobile Follower trade total price, then the Trade Determination System 2110 may divide the available Mobile Follower account balance by the share price to determine the reduced Mobile Follower share number. The Trade Determination System 2110 may then set the approved Mobile Follower share number equal to the reduced Mobile Follower share number.

If the share calculation method is percent-for-percent, the Trade Determination System 2110 may retrieve the available Lead Trader account balance from the Lead Trader Account Database 2114.

The Trade Determination System 2110 may then multiply the Lead Trader share number by the Lead Trader share price to determine the Lead Trader trade value. The Trade Determination System 2110 may then the Lead Trader trade value by the available Lead Trader account balance to determine the Lead Trader trade percentage.

The Trade Determination System 2110 may then multiply the available Mobile Follower account balance by the Lead Trader trade percentage to determine the Mobile Follower account trade value. The Trade Determination System 2110 may then divide the Mobile Follower account trade value by the Lead Trader share price to determine the approved Mobile Follower share number.

The Trade Determination System 2110 may then transmit the approved Mobile Follower share number, Mobile Follower identification, share identification, and Lead Trader share price to the Mobile Trade Determination System 2120. The Mobile Trade Determination System 2120 may receive the message from the Trade Determination System 2110 including the approved Mobile Follower share number, the Mobile Follower identification, share identification, and Lead Trader share price.

The Mobile Trade Determination System 2120 may then access the Mobile Follower account in the Mobile Follower Contact Database 2122 using the Mobile Follower identification. The Mobile Trade Determination System 2120 may then retrieve the Mobile Follower contact information associated with the Mobile Follower identification from the Mobile Follower Contact Database 2122.

The Mobile Trade Determination System 2120 may generate a mobile message for the Mobile Follower including the share identification, Lead Trader share price, and approved Mobile Follower share number and may transmit the mobile message to the Mobile Follower Device 2118.

In another embodiment, the Mobile Trade Determination System 2120 may generate a Mobile Trade Interface that may be transmitted to the Mobile Follower Device 2118 that may include the mobile message.

The Mobile Follower Device 2118 may receive mobile message or Mobile Trade Interface with mobile message from the Mobile Trade Determination System 2120 and may display the Mobile Trade Interface or mobile message on the Mobile Follower Device 2118.

The Mobile Follower may review the message and may select a trading action on the Mobile Follower Device 2118. In one or more embodiments, the Mobile Follower may choose to ignore the trade, participate in the trade, or modify the trade.

If the Mobile Follower chooses to ignore the trade, the Mobile Follower enters a mobile trade action indicator indicating to ignore the trade into the Mobile Follower Device 2118. The Mobile Follower Device 2118 may then transmit the mobile trade action indicator to the Mobile Trade Determination System 2120. At that point, the Follower will not participate in the trade.

If the Mobile Follower chooses to modify the trade, the Mobile Follower may enter a mobile trade action indicator indicating to modify the trade into the Mobile Follower Device 2118. The Mobile Follower Device 2118 may then display a new interface to allow the Mobile Follower to input modified trade parameters. In one or more embodiments, the Mobile Follower may update the share identification, approved Mobile Follower share number, and/or Mobile trade settings in the Mobile Follower Device. In an embodiment, the Mobile Follower may update Mobile trade settings including buy type, price type, timing, or the Mobile Follower may set a trade limit.

After the Mobile Follower has finished modifying the trade parameters, the Mobile Follower Device 2118 may set the updated share identification equal to the Mobile share identification and may set the updated approved Mobile Follower share number equal to the Mobile Follower share number.

If the Mobile Follower chooses to accept the trade, the Mobile Follower may enter a mobile trade action indicator accepting the trade into the Mobile Follower Device 2118. The Mobile Follower Device 2118 may set the share identification equal to the Mobile share identification and may set the approved Mobile Follower share number equal to the Mobile Follower share number.

The Mobile Follower Device 2118 may then transmit the Mobile share identification, Mobile Follower share number, and/or updated Mobile trade settings to the Mobile Trade Determination System 2120. The Mobile Trade Determination System 2120 may receive the Mobile share identification, Mobile Follower share number, and/or Mobile trade settings from the Mobile Follower Device 2118.

In one or more embodiments, the Mobile Trade Determination System 2120 may retrieve mobile trade settings associated with the Mobile Follower identification from the Mobile Follower Account Database 2124. The Mobile Trade Determination System 2120 may access the Mobile Follower account in the Mobile Follower Account Database 2124 using the Mobile Follower identification.

The Mobile Trade Determination System 2120 may then transmit the Mobile share identification and Mobile Follower share number to the Trade Determination System 2110. In one or more embodiments, the Mobile Trade Determination System 2120 may also transmit the mobile trade settings for the Mobile Follower. The Trade Determination System 2110 may receive the Mobile share identification and Mobile Follower share number from the Mobile Trade Determination System 2120. In one or more embodiments, the Trade Determination System 2110 may receive the mobile trade settings for the Mobile Follower from the Mobile Trade Determination System 2120.

The Trade Determination System 2110 may then transmit the Mobile share identification and Mobile Follower share number to the Exchange 2112 for execution. After the trade is executed on the Exchange 2112, the Exchange 2112 may generate a message for the Trade Determination System 2110 including the Mobile share identification, Mobile Follower total shares traded, and Mobile Follower traded share price.

The Trade Determination System 2110 may receive the message from the Exchange 2112 including the Mobile share identification, Mobile Follower total shares traded, and Mobile Follower traded share price.

The Trade Determination System 2110 may then access the Mobile Follower account in the Follower Account Database 2116 using the Mobile Follower identification. The Trade Determination System 2110 may then store the Mobile share identification, Mobile Follower total shares traded, and Mobile Follower traded share price in the Follower Account Database 2116.

In one or more embodiments, a Mobile Follower may set mobile account settings using a Mobile Follower Device 2118. In an embodiment, a Mobile Follower may enter mobile account settings including a market order, limit, limit plus, or limit fill or kill into the Mobile Follower Device 2118. The Mobile Follower Device 2118 may receive the mobile account settings entered by the Mobile Follower.

After the Mobile Follower Device 2118 has received the mobile account settings, the Mobile Follower Device may transmit the mobile account settings along with the Mobile Follower identification to the Mobile Trade Determination System 2120. The Mobile Trade Determination System 2120 may receive the mobile account settings and Mobile Follower identification from the Mobile Follower Device 2118.

The Mobile Trade Determination System 2120 may then access the Mobile Follower account in the Mobile Follower Account Database 2124 using the Mobile Follower identification. The Mobile Trade Determination System 2120 may then transmit the mobile account settings to the Mobile Follower Account Database 2124 and associate them with the Mobile Follower identification in the Mobile Follower Account Database 2124.

In another embodiment, after a trade has been executed for a Lead Trader, the Lead Trader identification and trade information may be passed to the Mobile Follower Account Database 2124. A the Mobile Follower Account Database 2124, one or more stored mobile follower indicators may be associated with the Lead Trader identification. The Mobile Follower Account Database 2124 may retrieve the associated mobile follower indicators and proceed with offering them opportunity to purchase securities as outlined above.

Figure 22:
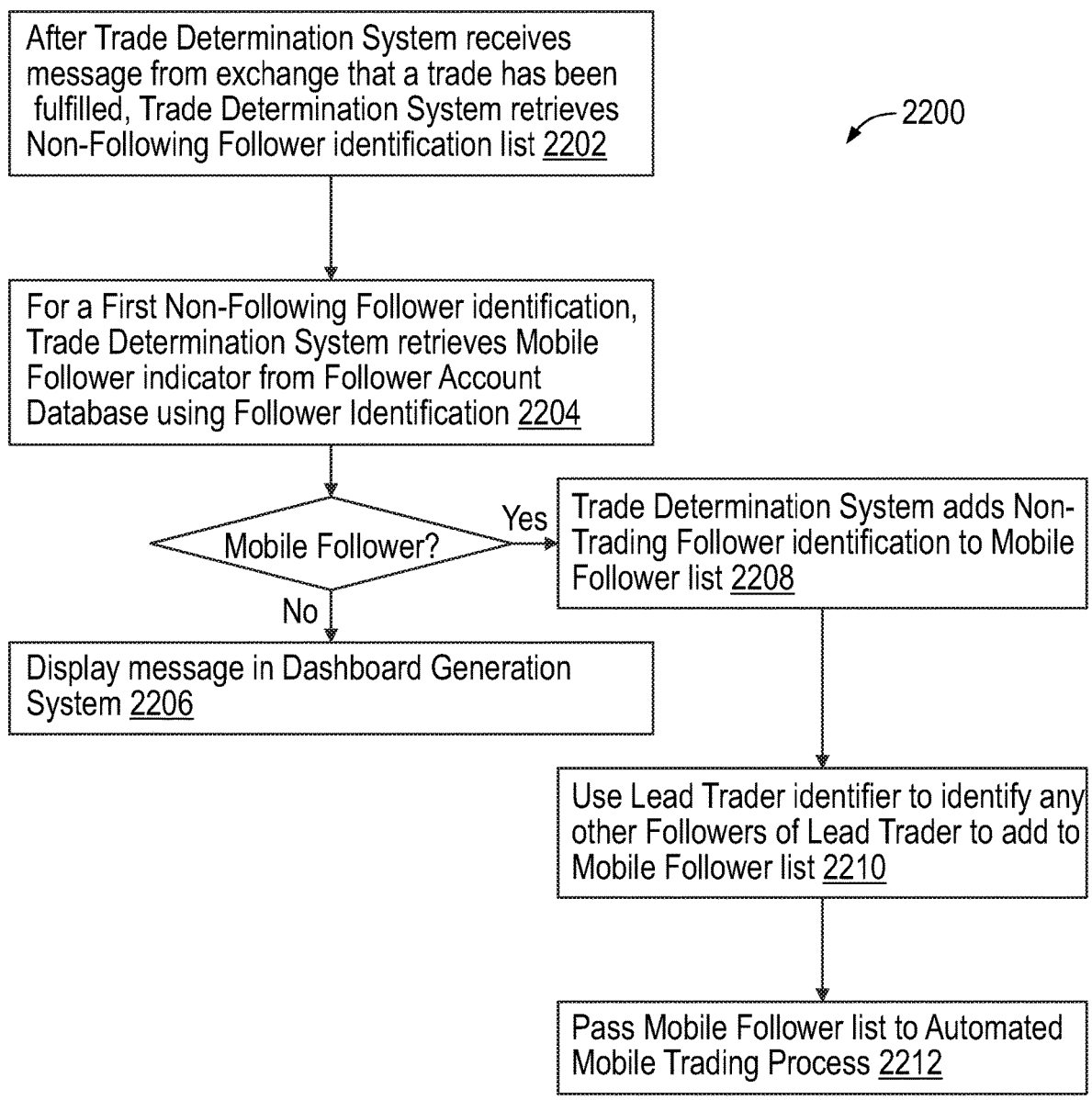
FIG. 22 is a flowchart of a Mobile Follower Identification Process.

FIG. 22 is a flowchart of a Mobile Follower Identification Process.

At 2202, after the Trade Determination System receives a message from an Exchange that a trade has been fulfilled, the Trade Determination System retrieves the Non-Following Follower identification list.

Then at 2204, for a first Non-Following Follower identification, the Trade Determination System retrieves a Mobile Following indicator from the Follower Account Database using the Non-Following Follower identification to determine if the Non-Following Follower is a Mobile Follower.

If the Mobile Following indicator indicates that the Non-Following Follower is not a Mobile Follower, then at 2206, the Trade Determination System may send a message for the Non-Following Follower to the Dashboard Generation System for display.

If the Mobile Following indicator indicates that the Non-Following Follower is a Mobile Follower, then at 2208 the Trade Determination System adds the Non-Following Follower identification to a Mobile Follower list.

At 2212, the Trade Determination System proceeds to the Automated Mobile Trading Process.

Figure 23:
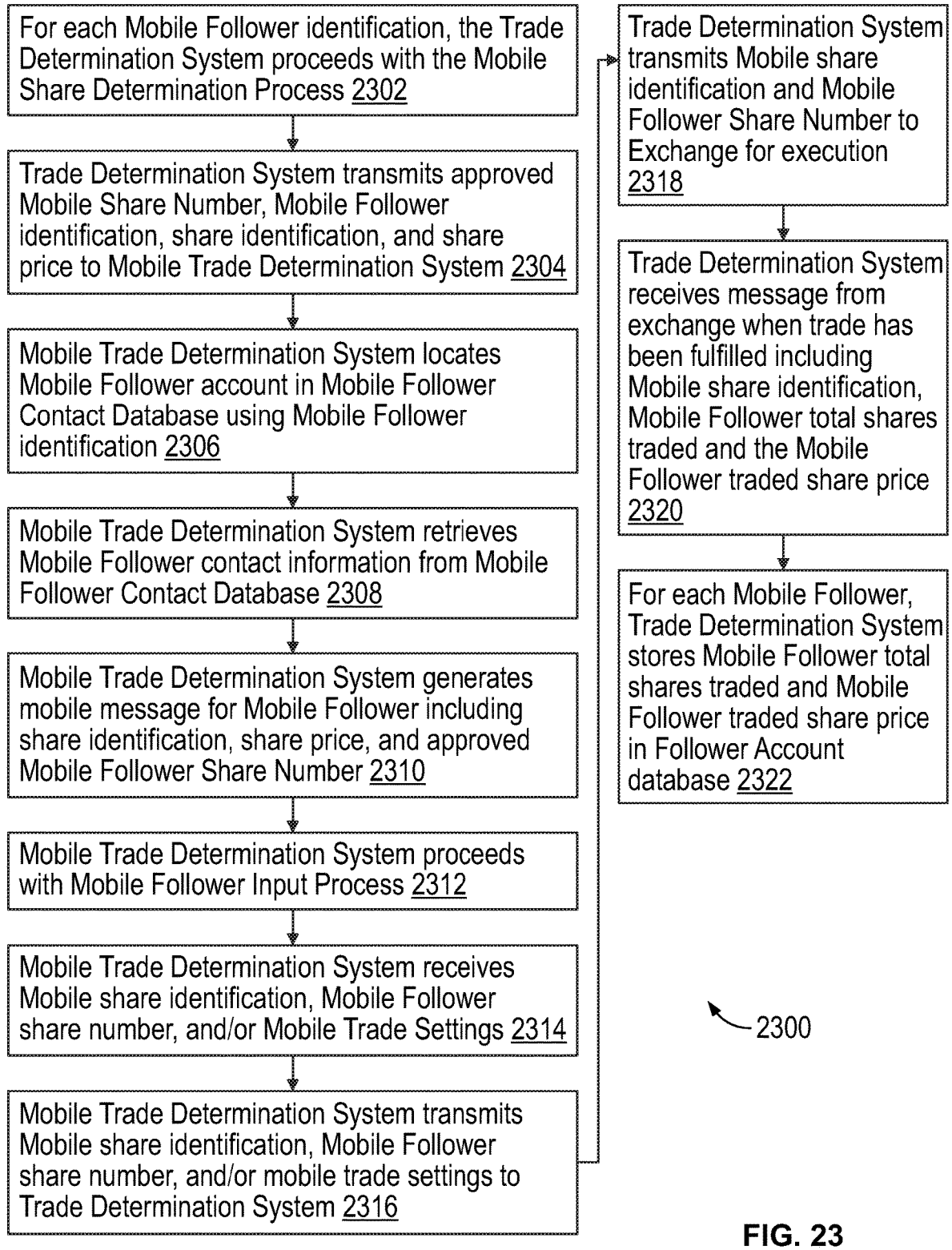
FIG. 23 is a flowchart of an Automated Mobile Trading Process.

FIG. 23 is a flowchart of an Automated Mobile Trading Process.

At 2302, for each Mobile Follower identification, the Trade Determination System proceeds with the Mobile Follower Share Determination Process.

At 2304, the Trade Determination System transmits the approved Mobile Follower share number, Mobile Follower identification, share identification, and share price to the Mobile Trade Determination System.

At 2306, the Mobile Trade Determination System locates the Mobile Follower account in the Mobile Follower Contact Database using the Mobile Follower identification.

At 2308, the Mobile Trade Determination System retrieves the Mobile Follower contact information from the Mobile Follower Contact Database.

Then at 2310, the Mobile Trade Determination System generates a mobile message for the Mobile Follower including the share identification, share price, and approved Mobile Follower share number.

At 2312, the Mobile Trade Determination System proceeds with the Mobile Follower Input Process.

At 2314, the Mobile Trade Determination System receives the mobile share identification, approved Mobile Follower share number, and/or mobile trade settings. In one or more embodiments, the Mobile Trade Determination System may retrieve mobile account settings from the Mobile Follower Account Database.

At 2316, the Mobile Trade Determination System transmits the mobile share identification, approved Mobile Follower share number, and mobile trade settings to the Trade Determination System. In one or more embodiments, the Mobile Trade Determination System may also transmit mobile account settings for the Mobile Follower.

At 2318, the Trade Determination System transmits the mobile share identification and approved Mobile Follower share number to the Exchange for execution. After the trade is executed on the Exchange, the Exchange generates a message for the Trade Determination System including the mobile share identification, Mobile Follower total shares traded, and Mobile Follower traded share price.

At 2320, the Trade Determination System receives the message from the Exchange including the mobile share identification, Mobile Follower total shares traded, and Mobile Follower traded share price.

At 2322, for each Mobile Follower, the Trade Determination System stores the mobile share identification, approved Mobile Follower share number, and Mobile Follower traded share price in the Follower Account Database.

Figure 24:
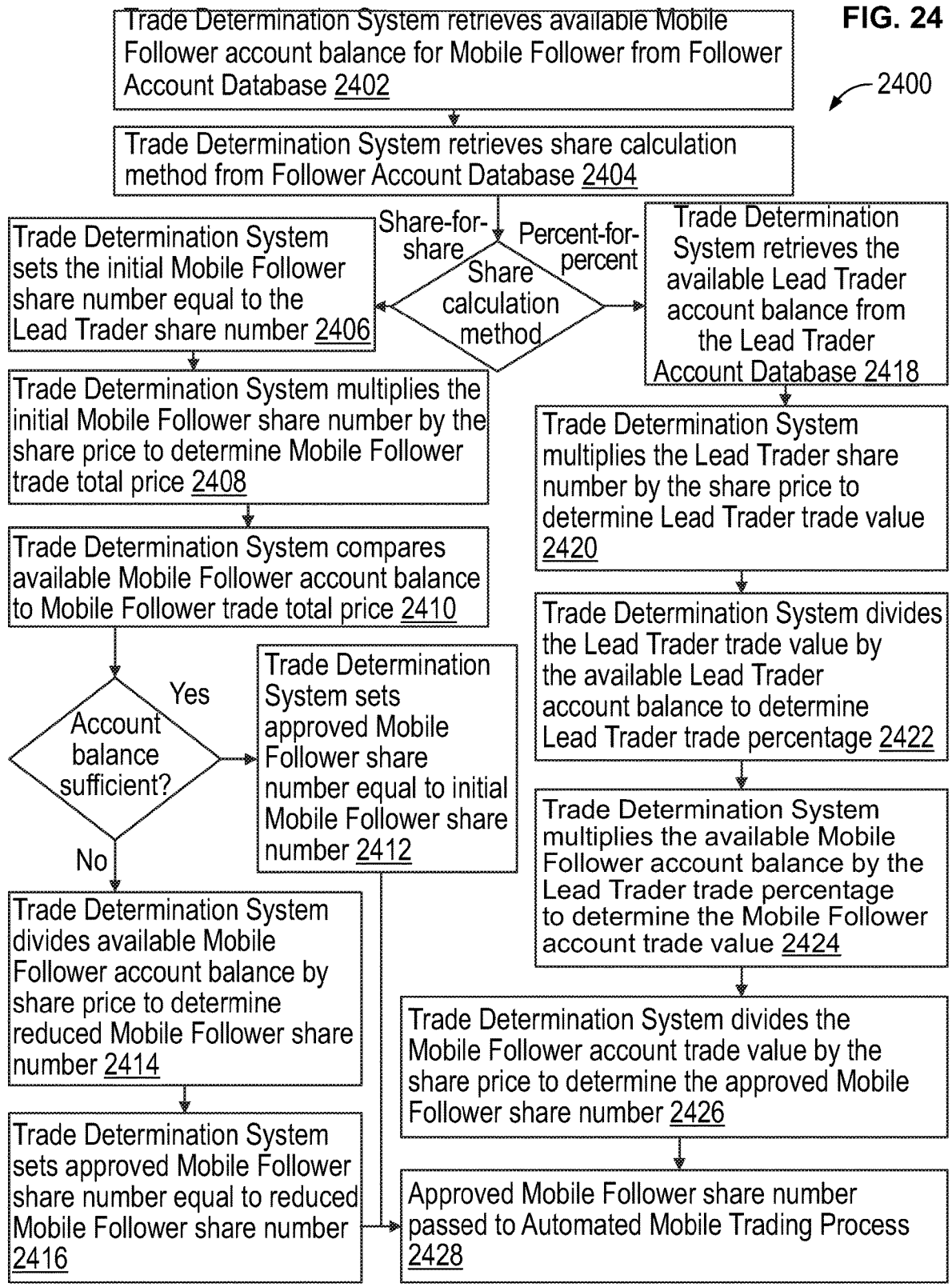
FIG. 24 is a flowchart of a Mobile Share Determination Process.

FIG. 24 is a flowchart of a Mobile Share Determination Process.

At 2402, the Trade Determination System retrieves the available Mobile Follower account balance for the Mobile Follower from the Follower Account Database.

At 2404, the Trade Determination System retrieves the share calculation method from the Follower Account Database.

If the share calculation method is share-for-share, then at 2406 the Trade Determination System sets the initial Mobile Follower share number equal to the Lead Trader share number.

At 2408, the Trade Determination System multiplies the initial Mobile Follower share number by the share price to determine the Mobile Follower trade total price.

At 2410, the Trade Determination System compares the available Mobile Follower account balance to the Mobile Follower trade total price.

If the available Mobile Follower account balance is greater than or equal to the Mobile Follower trade total price, then the Mobile Follower has sufficient account balance to participate in this trade, and at 2412 the Trade Determination System sets the approved Mobile Follower share number equal to the initial Mobile Follower share number.

Then at 2428, the approved Mobile Follower share number is passed to the Automated Mobile Trading Process.

If the available Mobile Follower account balance is less than the Mobile Follower trade total price, then the Mobile Follower has insufficient account balance to participate in this trade, and at 2414, the Trade Determination System divides the available Mobile Follower account balance by the share price to determine the reduced Mobile Follower share number.

At 2416, the Trade Determination System then sets the approved Mobile Follower share number equal to the reduced Mobile Follower share number.

Then at 2428, the approved Mobile Follower share number is passed to the Automated Mobile Trading Process.

If the share calculation method is percent-for-percent, the Trade Determination System retrieves the available Lead Trader account balance from the Lead Trader Account Database.

Then at 2420, the Trade Determination System multiplies the Lead Trader share number by the share price to determine the Lead Trader trade value.

At 2422, the Trade Determination System then divides the Lead Trader trade value by the available Lead Trader account balance to determine the Lead Trader trade percentage.

At 2424, the Trade Determination System multiplies the available Mobile Follower account balance by the Lead Trader trade percentage to determine the Mobile Follower account trade value.

At 2426, the Trade Determination System divides the Mobile Follower account trade value by the share price to determine the approved Mobile Follower share number.

Then at 2428, the approve Mobile Follower share number is passed to the Automated Mobile Trading Process.

Figure 25:
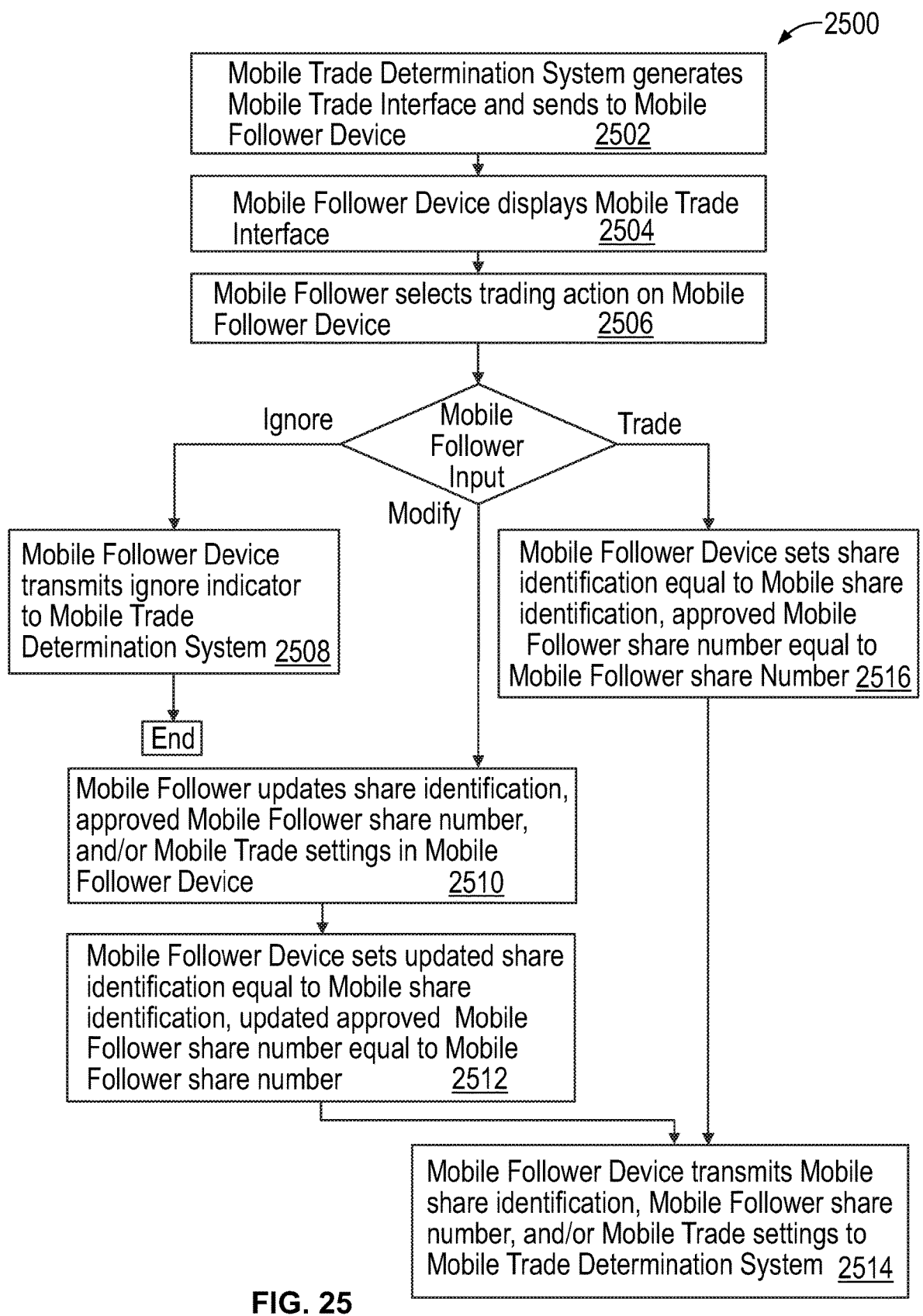
FIG. 25 is a flowchart of a Mobile Follower Input Process.

FIG. 25 is a flowchart of a Mobile Follower Input Process.

At 2502, the Mobile Trade Determination System generates a Mobile Trade Interface and sends it to the Mobile Follower Device.

At 2504, the Mobile Follower Device displays the Mobile Trade Interface.

At 2506, the Mobile Follower selects a trading action on the Mobile Follower Device. The Mobile Follower enters a mobile trade action indicator into the Mobile Follower Device indicating to ignore, modify, or accept the trade.

If the Mobile Follower elects to ignore the trade, then at 2508, the Mobile Follower enters a mobile trade action indicator indicating to ignore the trade into the Mobile Follower Device The Mobile Follower Device transmits the ignore indicator to the Mobile Trade Determination System. At that point, the Follower will not participate in the trade.

If the Mobile Follower elects to modify the trade, at 2510 the Mobile Follower enters a mobile trading action indicator indicating to modify the trade into the Mobile Follower Device. The Mobile Follower then updates share identification, approved Mobile Follower share number, and/or Mobile trade settings in the Mobile Follower Device. In an embodiment, the Mobile Follower may update trade settings including the buy type, price type, timing, or the Mobile Follower may set a trade limit, such as the maximum dollar amount for a trade or the maximum share number for a trade.

Then at 2512, the Mobile Follower Device sets the updated share identification equal to the Mobile share identification and the updated approved Mobile Follower share number equal to the Mobile Follower share number.

If the Mobile Follower elects to accept the trade, then at 2516 the Mobile Follower enters a mobile trading action indicator to accept the trade into the Mobile Follower Device. The Mobile Follower Device sets the share identification equal to the Mobile share identification and the approved Mobile Follower share number equal to the Mobile Follower share number.

Then at 2514, the Mobile Follower Device transmits the Mobile share identification, the Mobile Follower share number, mobile account settings, and/or the mobile trade settings to the Mobile Trade Determination System.

FIG. 26 is an embodiment of a Mobile Watch List Dashboard 2600. The Mobile Watch List Dashboard 2600 may include a Mobile Share Information section 2602, and a Mobile Market Information section 2604.

Mobile Share Information section 2602 may include Share Symbol, Last Price, Price Change, Bid, Ask, and Volume information as well as a Trade button 2606 for each security entry displayed. In an embodiment, a Mobile Follower may tap the Trade button 2602 for any security the Mobile Follower wants to trade and the system proceeds to trade the security.

FIG. 27 is an embodiment of a Mobile Order Status Dashboard 2700. Mobile Order Status Dashboard 2700 may include an Order Status Information section 2702. Order Status Information Section 2702 may include Order Status, Share Symbol, Trade Type, Quantity, Price, Time force, and Date and Time information as well as a Cancel button 2704 for each security entry displayed. In an embodiment, a Mobile Follower may tap the Cancel button 2704 to cancel any open trade listed in the Order Status Information section 2702.

FIG. 28 is an embodiment of a Mobile Alert History Dashboard 2800. Mobile Alert History Dashboard 2800 may include an Alert History section 2702. Alert History section 2702 may display Company, Share Symbol, Order Type, Alert Type, and Date information for each entry in the Alert History section for the Mobile Follower. For example, each time a trade alert is sent to the mobile follower, a record of the trade alert may be later viewable in the alert history.

Figure 29:
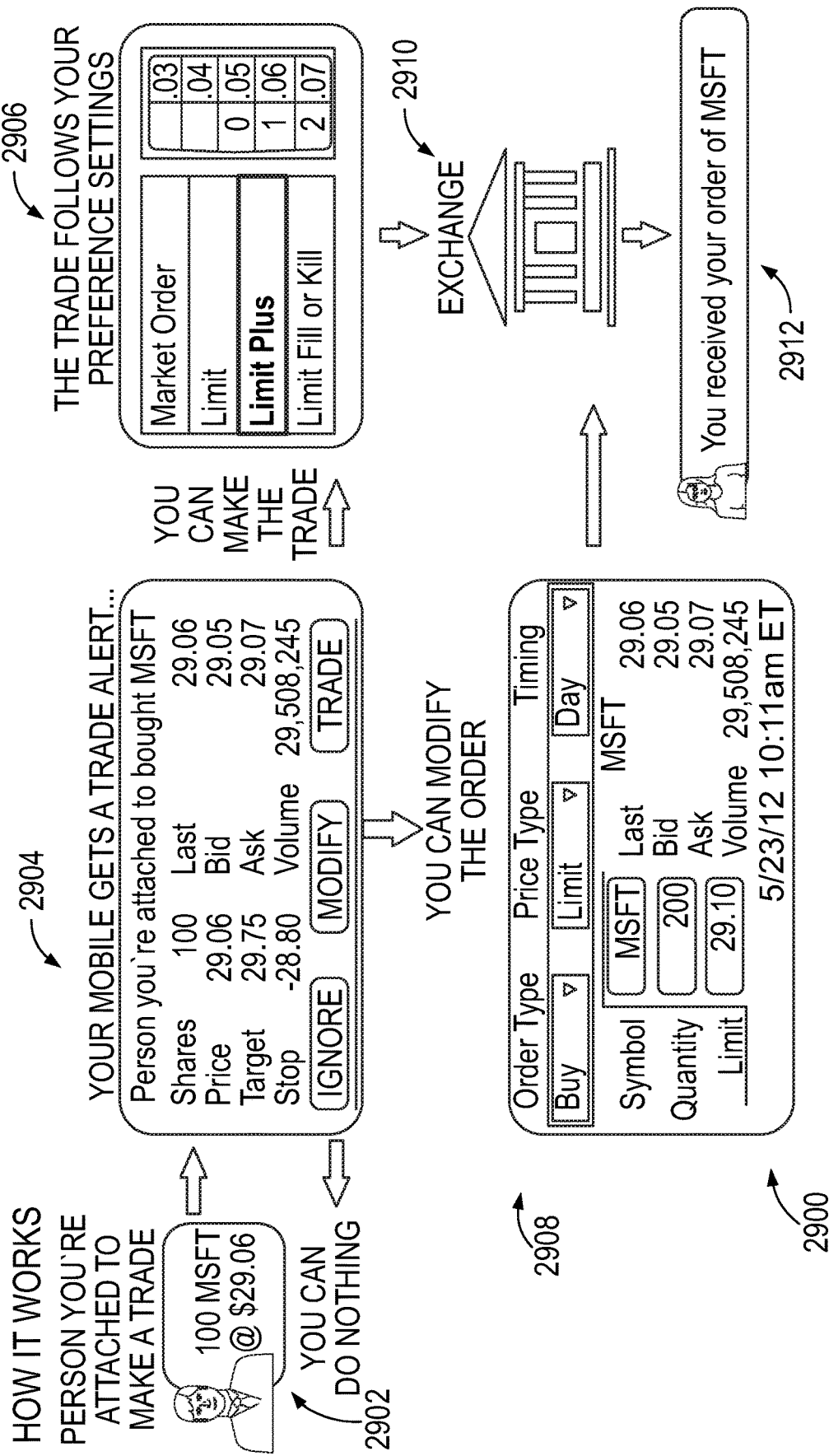
FIG. 29 is a flowchart of an alternative Automated Mobile Trading Process.

FIG. 29 is an alternative embodiment of an Automated Mobile Trading Process.

At 2902, a Lead Trader makes a trade.

At 2904, a Mobile Alert is generated for the Mobile Follower and sent to the Mobile Follower Device in response to the Lead Trader's trade. The Mobile Alert may include Mobile Share Number, Current Price, Target Price, Stop Price, Last Price, Last trade price, Bid, Ask, and Volume information as well as Ignore, Modify, and Trade buttons.

As described above, if the Mobile Follower presses the Ignore button, the trade is not made and an indication of the selection of Ignore is sent to the Mobile Trade Determination system.

As further described above, if the Mobile Follower presses the Trade button, an indication of the selection of Trade is sent to the Mobile Trade Determination System and then to the Trade Determination System for execution.

As also further described above, if the Mobile Follower pressed the Modify button, the Mobile Follower is then presented with the Modify Interface 2908. The Modify Interface 2908 is initially populated with the current trade symbol, quantity, and limit and also shows the last trade price, bid price, ask price, and volume. Additionally, the Modify Interface 2908 includes drop down menus allowing the user to select an order type of buy or sell, a price type of market, limit, stop, or stop-limit, and a timing of day, fill-or-kill, and good til canceled. The Mobile Follower may then modify the trade using and of the drop down menus and other aspects of the Modify Interface. Once the Mobile Follower has completed their modifications, the modified trade is sent to the Mobile Trade Determination System and then to the Trade Determination System for execution.

Additionally, the Mobile Follower may adjust their trade preference settings using the Trade Preference Setting Interface 2906. The Trade Preference Setting Interface 2906 allows the Mobile Follower to adjust the default that is applied to the standard trade that is performed when the Trade button is pressed. The Trade Preference Setting Interface 2906 allows the Mobile Follower to select from Market Order, Limit Order, Limit Plus, and Limit Fill or Kill. The Trade Preference Setting Interface 2906 also includes a scrollable sub-interface allowing the Mobil Follower to set the dollar amount for the limit-type orders.

In one or more embodiments, a Mobile Follower Device may be a cellular phone, smart phone, tablet computer, or other mobile computing device configured to send and receive data over a cellular or mobile communication network.

In one or more embodiments described above, the communication between a Mobile Follower Device and a Mobile Trade Determination System may be through a network connection, Ethernet connection, internet connection, file transfer protocol connection, RF connection, infrared connection, wireless connection, mobile or cellular communication network connection, or other electronic connection.

In one or more embodiments described above, the communication between a Mobile Trade Determination System and a Mobile Follower Account Database may be through a network connection, SQL connection, Ethernet connection, internet connection, file transfer protocol connection, RF connection, infrared connection, wireless connection, or other electronic connection.

In one or more embodiments described above, the communication between a Mobile Trade Determination System and a Mobile Follower Contact Database may be through a network connection, SQL connection, Ethernet connection, internet connection, file transfer protocol connection, RF connection, infrared connection, wireless connection, or other electronic connection.

In one or more embodiments described above, a Lead Trader Computer and/or a Follower Computer each may include a laptop computer, desktop computer, workstation, multiprocessor, or other computing device including at least a monitor, an input device such as a keyboard, at least one processor, at least one memory, a communications network interface for sending and receiving communications from a network, an input interface for receiving communications from an input device such as a keyboard or mouse, and an output interface for communications with an output device such as a monitor.

In one or more embodiments described above, a Dashboard Generation System may include a set of instructions stored in a memory in communication with a processor that, when executed by the processor, instructs the processor to perform the instructions. In one or more embodiments, a Dashboard Generation System may be stored on a server, a plurality of servers, a mobile server, a desktop computer, a workstation, a laptop computer, in a cloud computing network, or other similar computing device with a communications network interface.

In one or more embodiments described above, a Trade Determination System may include a set of instructions stored in a memory in communication with a processor that, when executed by the processor, instructs the processor to perform the instructions. In one or more embodiments, a Trade Determination System may be stored on a server, a plurality of servers, a mobile server, a desktop computer, a workstation, a laptop computer, in a cloud computing network, or other similar computing device with a communications network interface.

In one or more embodiments described above, an Exchange may include a set of instructions stored in a memory in communication with a processor that, when executed by the processor, instructs the processor to perform the instructions. In one or more embodiments, an Exchange may be stored on a server, a plurality of servers, a mobile server, a desktop computer, a workstation, a laptop computer, in a cloud computing network, or other similar computing device with a communications network interface.

In one or more embodiments described above, a Messaging System may include a set of instructions stored in a memory in communication with a processor that, when executed by the processor, instructs the processor to perform the instructions. In one or more embodiments, a Messaging System may be stored on a server, a plurality of servers, a mobile server, a desktop computer, a workstation, a laptop computer, in a cloud computing network, or other similar computing device with a communications network interface.

In one or more embodiments described above, a Lead Trader-Follower Management System may include a set of instructions stored in a memory in communication with a processor that, when executed by the processor, instructs the processor to perform the instructions. In one or more embodiments, a Lead Trader-Follower Management System may be stored on a server, a plurality of servers, a mobile server, a desktop computer, a workstation, a laptop computer, in a cloud computing network, or other similar computing device with a communications network interface.

In one or more embodiments described above, a Stock Quote System may include a set of instructions stored in a memory in communication with a processor that, when executed by the processor, instructs the processor to perform the instructions. In one or more embodiments, a Lead Trader-Follower Management System may be stored on a server, a plurality of servers, a mobile server, a desktop computer, a workstation, a laptop computer, in a cloud computing network, or other similar computing device with a communications network interface.

In one or more embodiments described above, a Lead Trader Account Database, Follower Account Database and/or Follower Contact Database each may be an electronic database.

In one or more embodiments described above, the communication between a Lead Trader Computer and a Dashboard Generation System may be through a network connection, Ethernet connection, internet connection, file transfer protocol connection, RF connection, infrared connection, wireless connection, or other electronic connection.

In one or more embodiments described above, the communication between a Follower Computer and a Dashboard Generation System may be through a network connection, Ethernet connection, internet connection, file transfer protocol connection, RF connection, infrared connection, wireless connection, or other electronic connection.

In one or more embodiments described above, the communication between a Stock Quote System and a Dashboard Generation System may be through a network connection, Ethernet connection, internet connection, file transfer protocol connection, RF connection, infrared connection, wireless connection, or other electronic connection.

In one or more embodiments described above, the communication between a Trade Determination System and a Dashboard Generation System may be through a network connection, Ethernet connection, internet connection, file transfer protocol connection, RF connection, infrared connection, wireless connection, or other electronic connection.

In one or more embodiments described above, the communication between a Trade Determination System and an Exchange may be through a network connection, Ethernet connection, internet connection, file transfer protocol connection, RF connection, infrared connection, wireless connection, or other electronic connection.

In one or more embodiments described above, the communication between a Lead Trader Computer and a Lead Trader-Follower Management System may be through a network connection, Ethernet connection, internet connection, file transfer protocol connection, RF connection, infrared connection, wireless connection, or other electronic connection.

In one or more embodiments described above, the communication between a Follower Computer and a Lead Trader-Follower Management System may be through a network connection, Ethernet connection, internet connection, file transfer protocol connection, RF connection, infrared connection, wireless connection, or other electronic connection.

In one or more embodiments described above, the communication between a Lead Trader-Follower Management System and a Dashboard Generation System may be through a network connection, Ethernet connection, internet connection, file transfer protocol connection, RF connection, infrared connection, wireless connection, or other electronic connection.

In one or more embodiments described above, the communication between a Trade Determination System and a Messaging System may be through a network connection, Ethernet connection, internet connection, file transfer protocol connection, RF connection, infrared connection, wireless connection, or other electronic connection.

In one or more embodiments described above, the communication between a Follower Computer and a Messaging System may be through a network connection, Ethernet connection, internet connection, file transfer protocol connection, RF connection, infrared connection, wireless connection, or other electronic connection.

In one or more embodiments described above, the communication between a Dashboard Generation System and a Lead Trader Account Database may be through a network connection, SQL connection, Ethernet connection, internet connection, file transfer protocol connection, RF connection, infrared connection, wireless connection, or other electronic connection.

In one or more embodiments described above, the communication between a Dashboard Generation System and a Follower Account Database may be through a network connection, SQL connection, Ethernet connection, internet connection, file transfer protocol connection, RF connection, infrared connection, wireless connection, or other electronic connection.

In one or more embodiments described above, the communication between a Trade Determination System and a Lead Trader Account Database may be through a network connection, SQL connection, Ethernet connection, internet connection, file transfer protocol connection, RF connection, infrared connection, wireless connection, or other electronic connection.

In one or more embodiments described above, the communication between a Trade Determination System and a Follower Account Database may be through a network connection, SQL connection, Ethernet connection, internet connection, file transfer protocol connection, RF connection, infrared connection, wireless connection, or other electronic connection.

In one or more embodiments described above, the communication between a Messaging System and a Follower Contact Database may be through a network connection, SQL connection, Ethernet connection, internet connection, file transfer protocol connection, RF connection, infrared connection, wireless connection, or other electronic connection.

Any references to specific stock, share, or security identifiers in the drawings or in the specification are not limiting to the stock, share, or security identified. Any security can be traded using the system and methods described above.

As discussed above, one or more embodiments of the present invention allows customers ("Followers") for the first time to take part in the actual equity or option trade of any other individual or trading/alert service—while maintaining control and transparency. These other traders ("Lead Trader") may be, for example, a professional trader, Investment Advisor, money manager, managed portfolios, alert/trading service, newsletter author, friend or family member.

A user of one or more embodiments of the present invention may select to either participate in their actual block trades or receive real-time trade alerts from the service which the Follower then has the ability to instantly act upon.

When the Lead Trader initiates a new trade on their Dashboard, or submits a trade signal to the Trade Determination System, the Trade Determination System queries the database to determine a number of factors, including who is attached to that Lead Trader, qualification for the type of trade (e.g., buying on margin), buying power, and how many shares each Follower needs to satisfy their position, as further discussed above.

These position sizes may be determined by user-defined settings and by the style in which the Lead Trader chooses to offer their service. So for example, a Lead Trader may choose "Share for Share" where the number of shares they trade will be replicated in each Follower's account. Another option is "Percent for Percent" where a Lead Trader's position, in percentage terms, is replicated in each Follower's account, relative to each Follower's account value. In both of these examples Followers have additional settings they may choose to modify the initial position sizing set by the Lead Trader, for example, by selecting a different share number, share percentage, dollar cost, or cost percentage.

Followers also have the ability to automatically exclude participation in specific equities with the Lead Trader by putting the symbol for that security on their "Do Not Ditto" or "Do not Duplicate/Synchronize" list as described herein.

Once the Trade Determination System determines the number of shares needed to satisfy both the Lead Trader and their follower's positions the Trade Determination System creates a block order which is sent to the market using a smart order routing process.

Once the block trade has been executed, the details of the execution are virtually instantly reported back to the Trade Determination System. The Trade Determination System takes the information and virtually instantly transmits the price and quantity to each Follower using the system described above. The Lead Trader and all of the Followers thus get the same price at the same time. If the trade is not executed in its entirety, both the Lead Trader and Followers receive a pro-rata portion (Follower shares divided by the block size times the number of shares executed).

At this point the system may be holding all the shares as one block on the back end database, but displaying them individually and privately to each participant. Neither the Lead Trader nor any Follower need ever know how big the block size is or who is participating.

Followers then have three options they may choose from.

The first is to do nothing and let the Lead Trader manage the trade to conclusion as described above.

The second option is that the Follower may "detach" their position from the Lead Trader, and thus the block trade. This may be done on either the browser based Follower Dashboard or the mobile application. In one embodiment, the system does this by instructing the database that the specific shares in question no longer are part of the block, but are now assigned solely to the individual wishing to detach. The remaining block is resized after the reduction of the individual's shares and the reduction in block size does not affect either the Lead Trader of the other subscribers.

The third option for the Follower is to "detach" and close their position instantly. They may do this by clicking a button on their dashboard or mobile application which "detaches" the order from the original block and initiates a market order to close the position. In one embodiment, the system sells only the portion from the block that relates to that specific individual's close order. The block is then resized once the order is executed. This does not affect the Lead Trader or any other individuals participating in the block trade.

Portfolio Synchronization

FIGS. 30-34 illustrate a portfolio synchronization system and method. The portfolio synchronization system allows a Follower to automatically buy-in to the same positions that the Lead Trader is already holding. However, the portfolio synchronization system provides greater Follower control than the portfolio duplication described above with regard to FIGS. 2 and 8 and thus represents an improvement over portfolio duplication.

Figure 30:
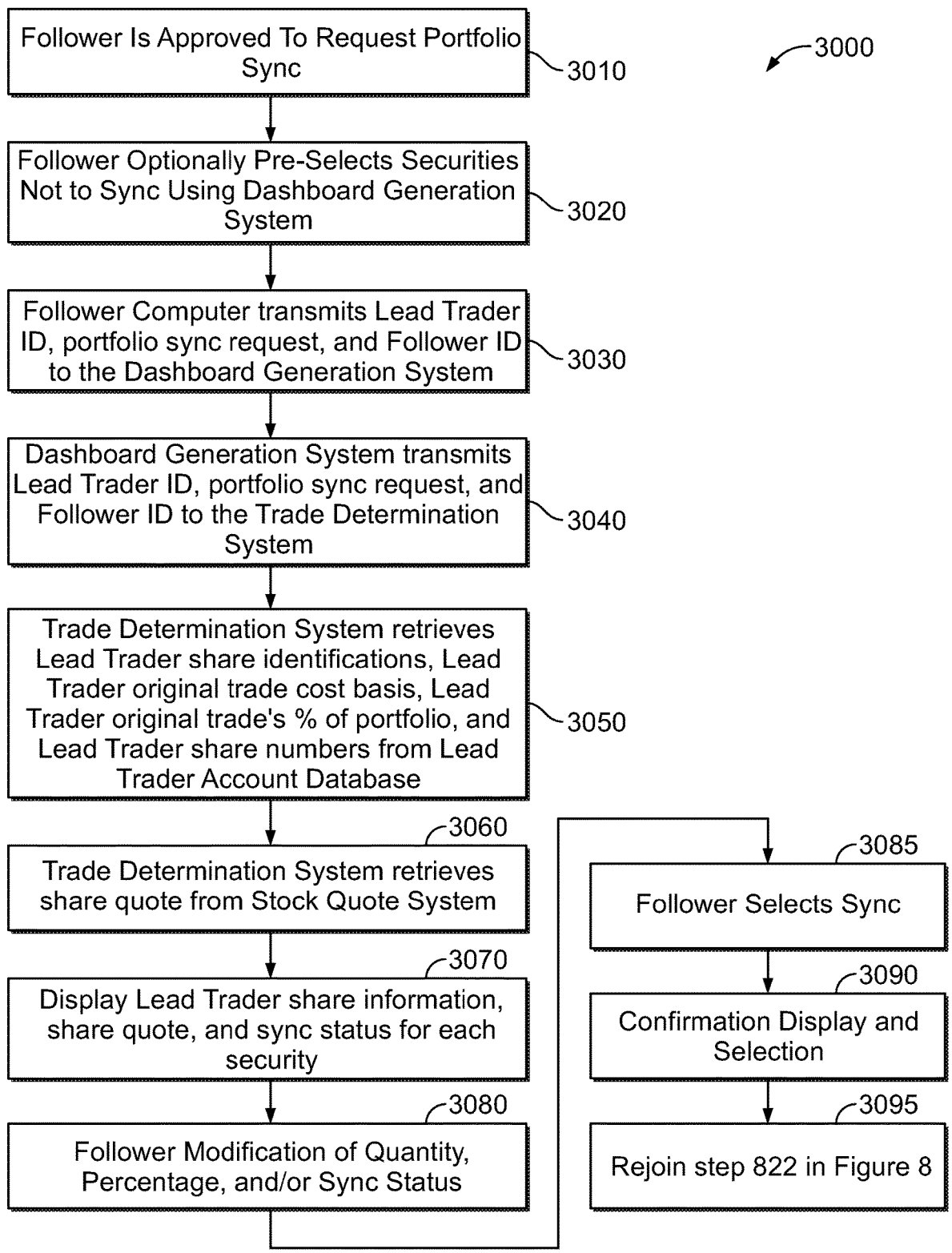
FIG. 30 illustrates a flowchart of the portfolio synchronization system according to one embodiment of the present invention.

FIG. 30 illustrates a flowchart 3000 of the portfolio synchronization system according to one embodiment of the present invention. In FIG. 30, at a first step 3010, a Follower is approved to request a portfolio synchronization. This process may proceed generally similarly to that described above with regard to portfolio duplication and/or other access to information about the portfolio of a Lead Trader.

Next, at step 3020, the follower may optionally pre-select one or more securities that the Follower does not wish to acquire as part of the synchronization operation. These securities may have been selected with the present synchronization operation in mind, or may be a stored listing of securities that the Follower has generally selected to not acquire. The pre-selection of one or more securities may be accomplished using the Follower's Dashboard and the result may be stored in the Follower Account Database. Additionally, on one embodiment, when the Follower's Dashboard is displayed, the Follower's prior selection of securities not to synchronize is displayed for the Follower.

Then, at step 3030, the Follower computer transmits the Lead Trader ID, the portfolio synchronization request, and the Follower ID to the Dashboard Generation System, which in turn passes them on to the Trade Determination System in step 3040.

At step 3050, the Trade Determination System retrieves the Lead Trader share identifications, Lead Trader original trade cost basis, Lead Trader original trade percentage of portfolio, and Lead Trader share numbers from the Lead Trader Account Database.

At step 3060, the Trade Determination System retrieves share quotes from the Stock Quote System for all of the Lead Trader Share identification.

Then, at step 3070, the Dashboard Generation System displays the Lead Trader share identifications, Lead Trader original trade cost basis, Lead Trader original trade percentage of portfolio, share quotes, Lead Trader share number and the sync status. In one embodiment, the sync status is indicated as "Not Syncable" if the share appears on the Follower's list of securities not to sync, and is indicated as "Synced" if the Follower already owns the number of shares of a specific security listed in the Lead Trader Portfolio. Finally, if the security is neither "Not Syncable" nor "Synced", then the security is listed as "Syncable" to indicate to the Follower that execution of the present synchronization will result in acquisition of the security.

Next, at step 3080, the Follower may modify any of the quantity, percentage, and/or sync status of any security in the Lead Trader portfolio. Once the Follower is satisfied with the portfolio to be synchronized, the Follower may initiate the synchronization operation by selecting the "Sync Portfolio" button in step 3085.

Selection of the "Sync Portfolio" button causes the display of a confirmation screen in step 3090. When the Follower confirms the synchronization by selecting a "Confirm" button, the synchronization operation executes and the present synchronization operation generally proceeds as described in FIG. 8, step 822 and subsequent.

Figure 31:
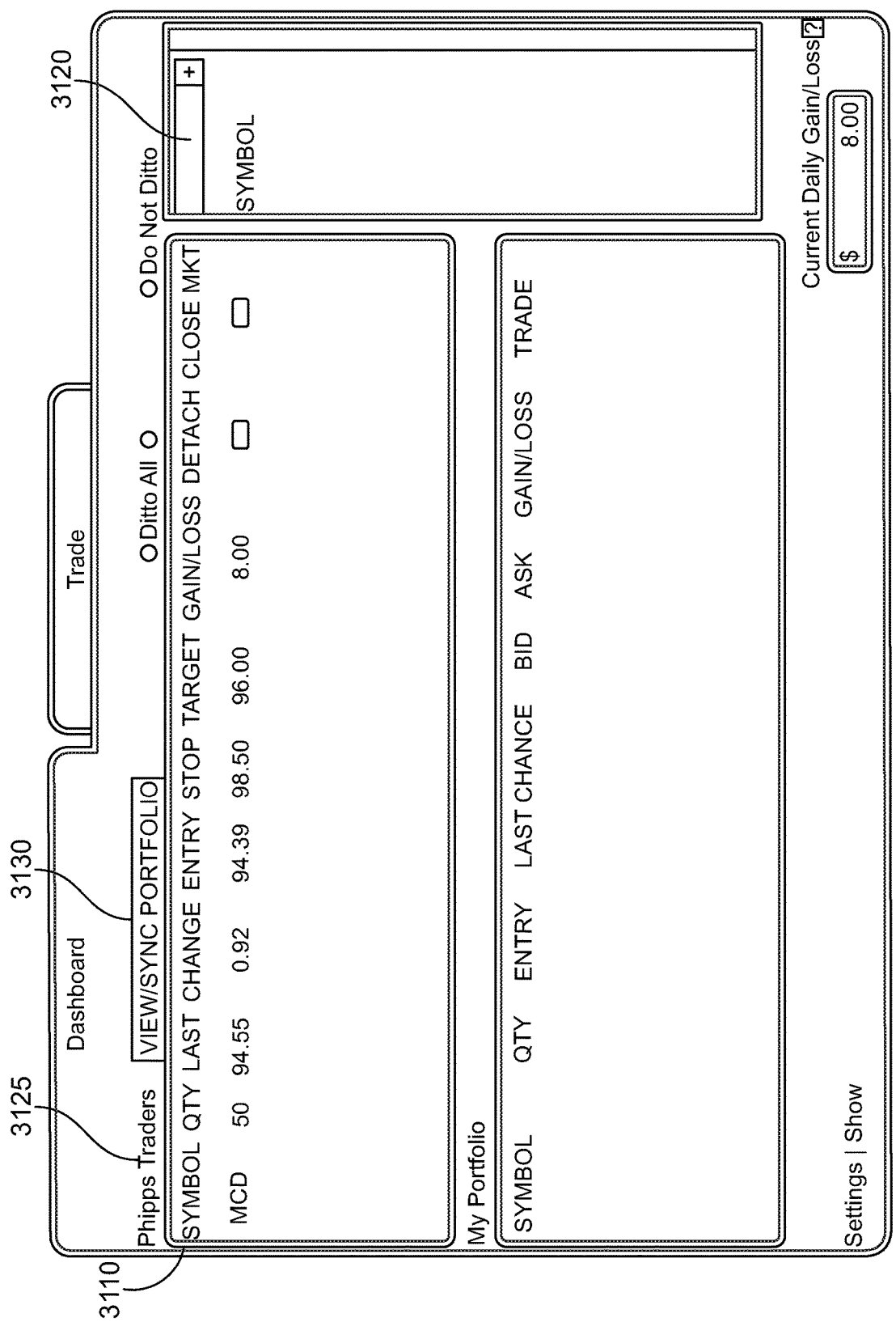
FIG. 31 illustrates an embodiment of a Synchronization Screen Dashboard prior to synchronization.

FIG. 31 illustrates an embodiment of a Synchronization Screen Dashboard prior to synchronization 3100. As shown in FIG. 31 and described above, the Synchronization Screen Dashboard 3100 displays a security 3110 currently owned by a Follower, as well as a Do Not Sync box 3120 for entering one or more identifiers of securities not to be acquired by the Follower during s synchronization operation. A Lead Trader Identification 3125 is also displayed. Also, a View/Sync Portfolio button 3130 will, upon initiation, cause the Lead Trader's portfolio to be displayed as shown in FIG. 32 below.

Figure 32:
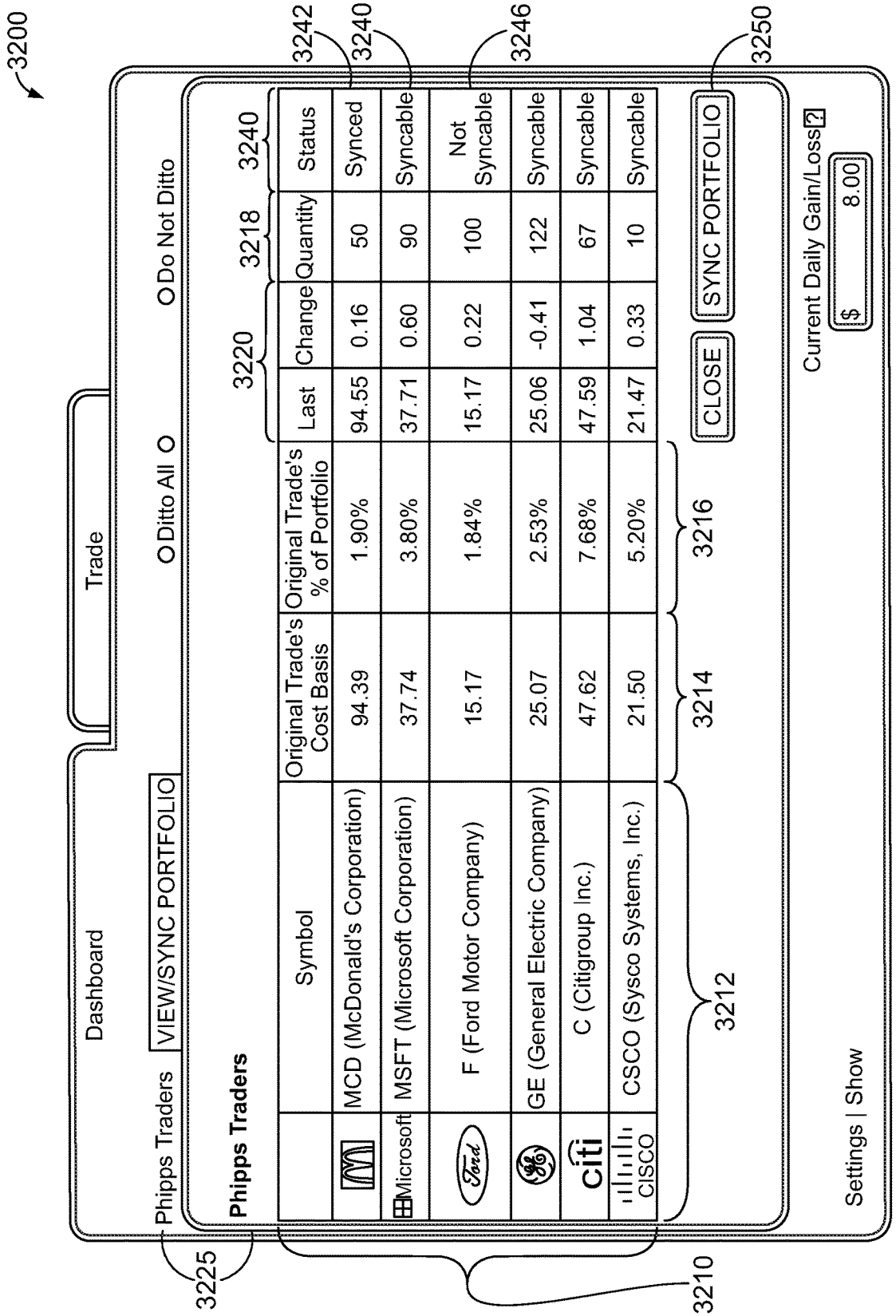
FIG. 32 illustrates an embodiment of a Lead Trader Portfolio Synchronization Screen.

FIG. 32 illustrates an embodiment of a Lead Trader Portfolio Synchronization Screen 3200. The Lead Trader Portfolio Synchronization Screen 3200 includes Lead Trader Indicators 3225 and Lead Trader share information 3210 including Lead Trader share identification 3212, Lead Trader original trade cost basis 3214, Lead Trader original trade percentage of portfolio 3216, and Lead Trader share numbers 3218. Also shown in the Lead Trader Portfolio Synchronization Screen 3200 is the share information 3230 for each security. Additionally, the synchronization status 3240 is displayed for each security. As described above, the synchronization status 3240 may be Synced 3242, Syncable 3244, or Not Syncable 3246. Finally, the Lead Trader Portfolio Synchronization Screen 3200 includes the portfolio synchronization initiation button 3250 which, when activated, causes the Dashboard Generation System to display the Synchronization Confirmation Screen shown in FIG. 33 below.

Figure 33:
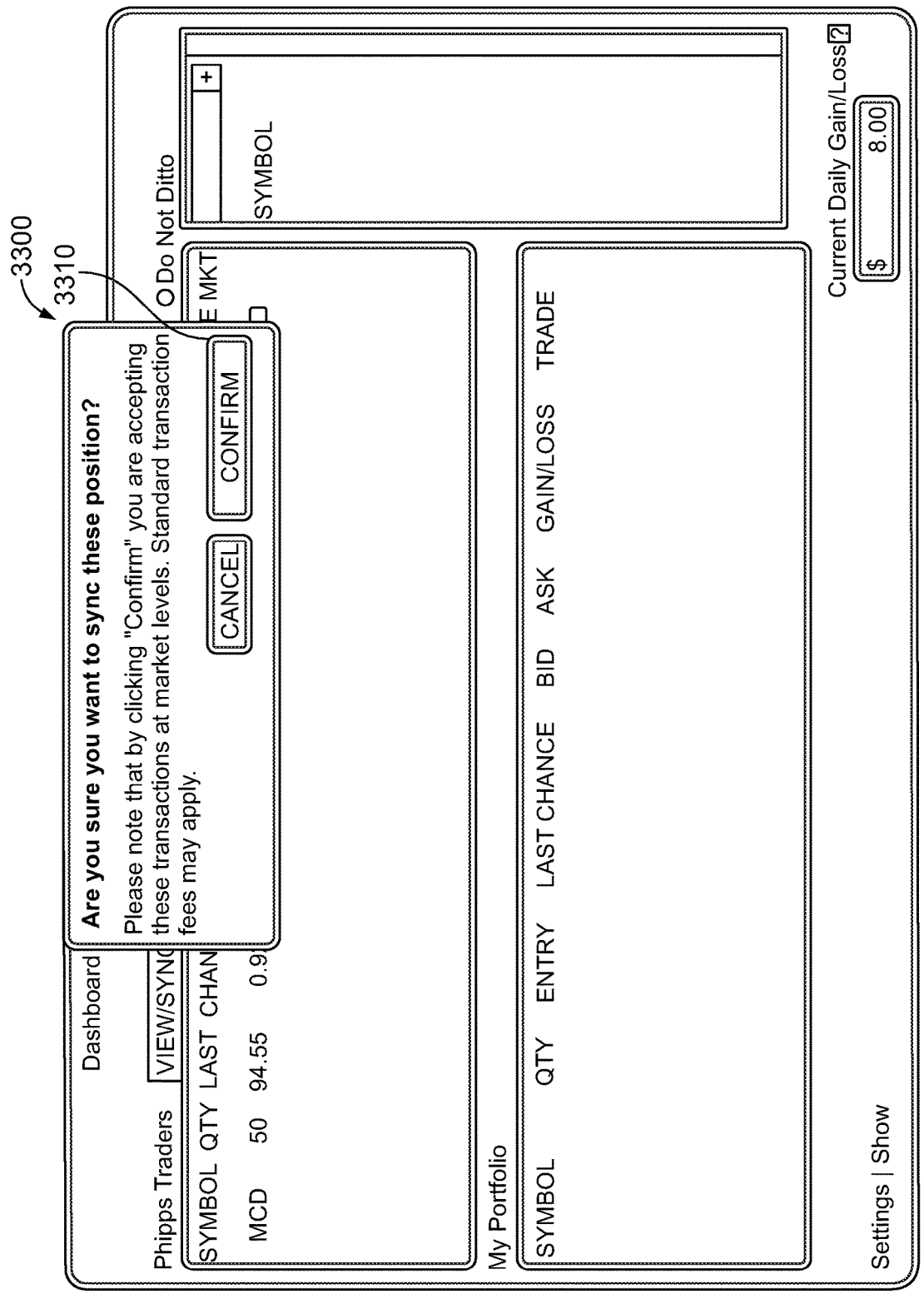
FIG. 33 illustrates an embodiment of a Synchronization Confirmation Screen.

FIG. 33 illustrates an embodiment of a Synchronization Confirmation Screen 3300. The Synchronization Confirmation Screen 3300 displays a notice asking the Follower to confirm that the synchronization operation should comments by selecting the synchronization confirmation button 3310. Once the synchronization confirmation button 3310 is initiated, the synchronization operation takes place and Post-Synchronization Dashboard Screen is displayed as shown in FIG. 34 below.

Figure 34:
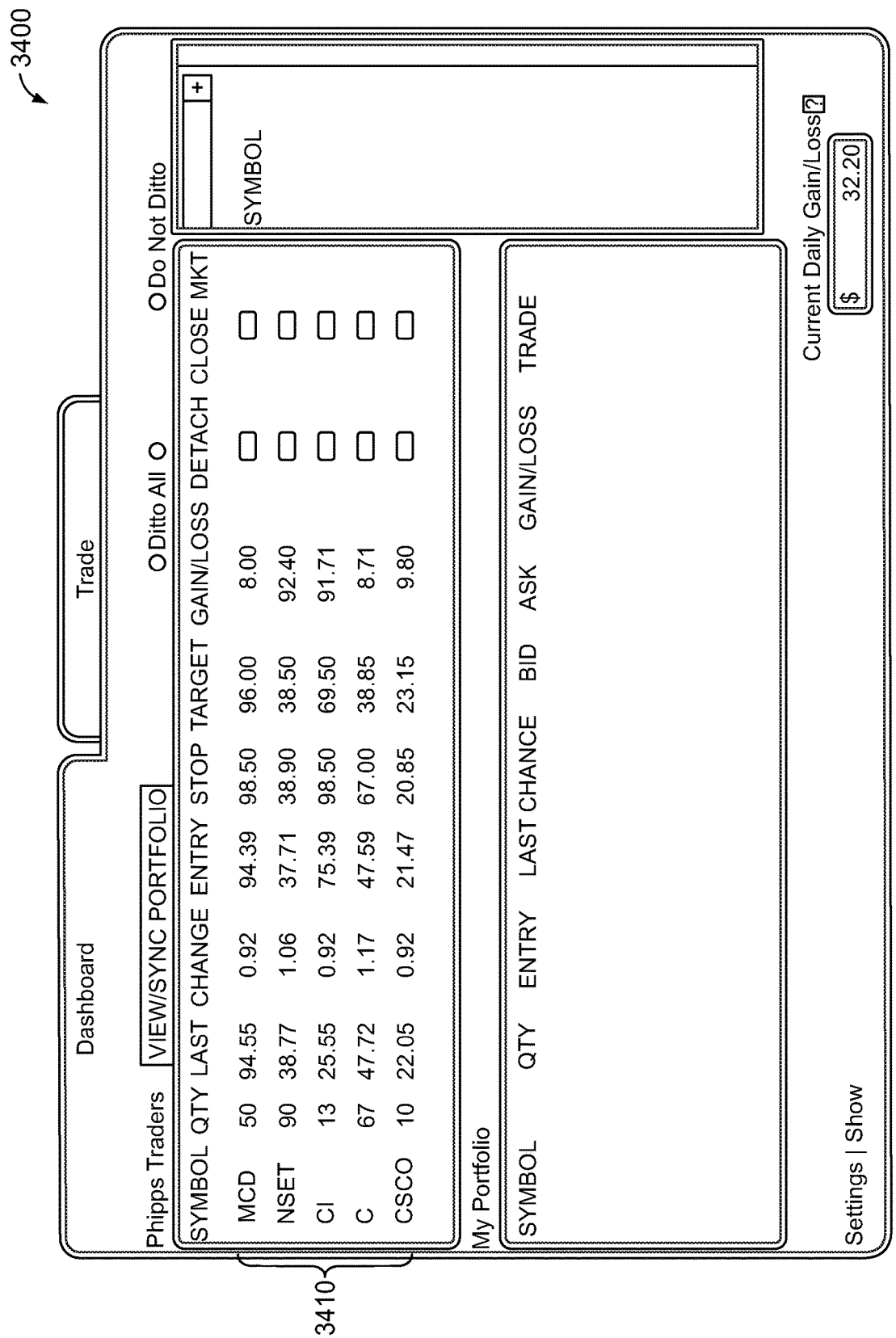
FIG. 34 illustrates an embodiment of the Post-Synchronization Dashboard screen.

FIG. 34 illustrates an embodiment of the Post-Synchronization Dashboard screen 3400. As shown in the Post-Synchronization Dashboard screen 3400, the Follower has now acquired all of the securities indicated as Syncable in FIG. 32 and also displayed is the Follower's previously owned security that was indicated as Synced in FIG. 32.

Once the Follower has synced to the portfolio of the Lead Trader, the Follower may perform any of the operations discussed above including without limitation detaching individual securities, and closing out market positions. Further, if at some point in the future, the Follower desires to re-synchronize to the Lead Trader's portfolio (for example in the event of the Follower removing a security in the Lead Trader's portfolio from the Followers list of securities not to synchronize) the Follower may again perform the above synchronization operation. The securities in the Lead Trader's portfolio that have already been acquired by the Follower will simply be displayed as "Synced" in the Synchronization Screen and not re-acquired.

Thus, one or more embodiments of the present synchronization system represent an improvement over the duplication system discussed above for several reasons. First, the duplication system may have merely duplicated the Lead Trader's portfolio, regardless of whether the Follower already owned one or more of the securities in the Lead Trader's portfolio. Although this may be desirable for some Followers, other Followers may wish to obtain ownership of the securities listed in the Lead Trader's portfolio by only acquiring those securities that they do not already own through the present synchronization system.

In one embodiment, the portfolio synchronization system may allow the Follower to buy-in to the same positions of the Lead Trader in the same percentage of the Follower's portfolio that the Lead Trader holds in his own portfolio.

In one embodiment, once the trades are executed, the shares are attached to the original block of each syncable position in the current portfolio of the Lead Trader.

In one embodiment, when a Follower connects to an existing Lead Trader service, in most cases the service already holds positions they have purchased previously. Without the synchronization function, the new subscriber would have to wait until a new position was initiated by the Lead Trader before the Follower would start their participation in the service.

In one embodiment, if there are any issues in the Lead Trader's portfolio that the Follower does not wish to "sync" with, they may enter the security's symbols into the "Do Not Ditto" box on the Dashboard.

In one embodiment, the Follower clicks a button on their Dashboard and a pop-up box is presented to them. In that box is a listing of all the current positions that their Lead Trader is holding, along with the Lead Trader's cost basis, the percentage allocation that each position represents in the Lead Trader's account, as well as the number of shares that the Follower would purchase of each position once synced. The subscriber has the ability to modify the amount to be synced, up to the subscriber's then available buying power.

In one embodiment, once the Follower decides they are comfortable with the trades they are about to make, they press a confirmation button, and an order, or multiple orders, are placed to buy the individual equities or options.

In one embodiment, once the Follower's positions are executed, the system then adds those positions to pre-existing blocks being held by the Lead Trader, so from the perspective of the system there is no longer any distinction between the individual Follower's positions and the Lead Trader block.

In one embodiment, once the synchronization process is complete, the subscriber has the same three options as mentioned above with regard to duplication.

In one embodiment, a Follower may perform a synchronization whenever there is a position the Lead Traders has opened that the Follower is not attached to.

Additionally, the Follower may perform a "partial sync" wherein less than all of the specific securities that would have been purchased with a regular synchronization (called a "total sync" in this example to differentiate from a "partial sync") are purchased. The partial sync may be selectable by the user. In one embodiment, a Follower may put any securities and/or options that they do not wish to sync into their "Do Not Ditto" list right on their Dashboard. Those items are excluded when they sync their portfolio. Conversely, Followers may remove those securities and/or options from the "Do Not Ditto" list at any time, and "re-sync" to include them in their portfolio.

Also, in a broader sense, the sync process may be used for more extensive portfolio management than just the initial sync—such as a periodic "re-sync" if Followers have the "do not ditto" turned on and later want to buy the securities that they did not acquire at first. In one embodiment, a Follower may sync as often as they desire. This is particularly useful, for example, in situations where Follower are following a Lead Trader who uses a model, based on allocation, sectors, asset classes, etc. Those models are generally re-balanced on a quarterly basis, and by using synchronization operation, a Follower following them may "sync" up with the Lead Trader's portfolio even if they have had "Do Not Ditto" enabled for any time period during the quarter.

Also, in one embodiment, the system may allow independent duplication of the purchases and of the sales. For example, a user Follower may select "Duplicate purchase", and purchases made by the Lead Trader may then automatically be replicated for the Follower—but sales made by the Lead Trader may not be automatically replicated. This may be useful for Followers desiring to manage their sales timing such as for tax reasons, for example. Alternatively, some Follower might wish to use the sync process instead of the duplication process to initiate a position, but may be OK with duplicating the lead trader's sale of the position In one embodiment, this feature may be used when courting new Lead Traders. A Follower has three different options after they have taken a position initiated by their Lead Trader. The first is to do nothing, and allow the Lead Trader to manage a position to its conclusion. The second is that the Follower may close a position initiated by a Lead Trader at any time they choose, independent and regardless of the Lead Trader's actions. And finally, a Follower may detach a position from a Lead Trader, taking over management, and disconnecting any more discretion over the position from the Lead Trader. This allows the Follower to use the Lead Trader, and their expertise, as an "idea generation machine," which allows Follower entry into the Lead Trader's positions (ideally at optimal times), but allows the Follower to decide if and when to sell the positions.

While particular elements, embodiments, and applications of the present invention have been shown and described, it is understood that the invention is not limited to the elements, embodiments, and applications described because modifications may be made by those skilled in the art, particularly in light of the teachings of this disclosure. It is therefore contemplated by the appended claims to cover such modifications and incorporate those features which come within the spirit and scope of the invention.

The invention claimed is:

1. A system for automated securities portfolio synchronization, said system including:
   a trade follower contact database including trade follower identity data representing a plurality of trade followers associated with a lead trader;
   a trade follower account database including, for each of said plurality of trade followers, trade follower identity data and electronically associated trade follower account data including a trade follower available account balance; and
   an automated computerized trade determination system receiving an electronic trade initiation command from a lead trader computer, wherein said electronic trade initiation command includes lead trader identification data identifying said lead trader, lead trader share identification data identifying a security to be traded, and lead trader share number data identifying a number of shares of said security to be traded,
   wherein said automated computerized trading system retrieves electronic price quote data representing a current price for said security identified in said lead trader share identification data, wherein said automated computerized trading system multiplies said current price for said security with said lead trader share number to determine a lead trader total share price, wherein said computerized trade determination system retrieves from said trade follower contact database said trade follower identity data representing a plurality of trade followers associated with said lead trader identified in said lead trader identification data, wherein, for each of said plurality of trade followers, said computerized trade determination system retrieves from said trade follower account database the trade follower account balance associated with said trade follower, wherein, for each of said plurality of trade followers, said computerized trade determination system compares said trade follower account balance with said lead trader total share price, and when said trade follower account balance exceeds said lead trader total share price, said computerized trade determination system determines an approved follower share number for said trade follower, wherein said approved follower share number is equal to said lead trader share number, wherein said computerized trade determination system combines the number of shares represented by said approved trade follower share number for said plurality of trade followers with the number of shares represented by said lead trader share number data to determine a combined trade share number and automatically initiates execution of a combined trade of said security for the number of shares represented by said combined trade share number.

\* \* \* \* \*